(12) United States Patent
Shao et al.

(10) Patent No.: US 10,917,208 B2
(45) Date of Patent: Feb. 9, 2021

(54) DATA TRANSMISSION METHOD AND RELATED APPARATUS

(71) Applicant: Huawei Technologies Co., Ltd., Shenzhen (CN)

(72) Inventors: Jiafeng Shao, Beijing (CN); Lei Guan, Beijing (CN); Chaojun Li, Beijing (CN); Sha Ma, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 57 days.

(21) Appl. No.: 16/506,898

(22) Filed: Jul. 9, 2019

(65) Prior Publication Data

US 2019/0334670 A1     Oct. 31, 2019

Related U.S. Application Data

(63) Continuation of application No. PCT/CN2018/072804, filed on Jan. 16, 2018.

(30) Foreign Application Priority Data

Jan. 20, 2017 (CN) .......................... 2017 1 0048561

(51) Int. Cl.
*H04W 72/12* (2009.01)
*H04L 5/00* (2006.01)
*H04W 72/04* (2009.01)

(52) U.S. Cl.
CPC .......... *H04L 5/0044* (2013.01); *H04L 5/0092* (2013.01); *H04W 72/0446* (2013.01); *H04W 72/1284* (2013.01)

(58) Field of Classification Search
CPC . H04W 72/12; H04W 72/04; H04W 72/0446; H04W 72/1284; H04L 5/00; H04L 5/0044; H04L 5/0092
See application file for complete search history.

(56) References Cited

U.S. PATENT DOCUMENTS

2002/0159411 A1   10/2002   Airy et al.
2007/0121542 A1    5/2007   Lohr et al.
(Continued)

FOREIGN PATENT DOCUMENTS

CN   101048982 A   10/2007
CN   101873704 A   10/2010
(Continued)

*Primary Examiner* — Chi Ho A Lee
(74) *Attorney, Agent, or Firm* — Slater Matsil, LLP

(57) ABSTRACT

Embodiments disclose a data transmission method and a related apparatus, to enable a network device to schedule uplink transmission and a time resource on which the uplink transmission is located. One method includes transmitting, by a terminal device, a scheduling request, where the scheduling request includes information about at least one first transport block. The method also includes receiving, by the terminal device, scheduling information on a first time resource, and determining, by the terminal device, a target time resource, where the target time resource includes a second time resource or a third time resource, and a time interval between the second time resource and the first time resource is greater than a time interval between the third time resource and the first time resource. The method further includes transmitting, by the terminal device, a second transport block on the target time resource based on the scheduling information.

20 Claims, 24 Drawing Sheets

(56) References Cited

U.S. PATENT DOCUMENTS

| | | | | |
|---|---|---|---|---|
| 2011/0274059 A1* | 11/2011 | Brown | ............... | H04L 5/0092 |
| | | | | 370/329 |
| 2013/0039347 A1* | 2/2013 | Moqvist | ............ | H04W 72/1268 |
| | | | | 370/335 |
| 2013/0107835 A1* | 5/2013 | Aiba | ................... | H04L 5/0053 |
| | | | | 370/329 |
| 2014/0269629 A1* | 9/2014 | Yang | .................... | H04L 1/1896 |
| | | | | 370/336 |
| 2014/0369312 A1* | 12/2014 | Yang | ................ | H04W 52/221 |
| | | | | 370/331 |
| 2015/0016432 A1* | 1/2015 | Meyer | ................. | H04L 1/1887 |
| | | | | 370/336 |
| 2015/0223232 A1* | 8/2015 | Eriksson | ......... | H04W 72/0446 |
| | | | | 370/329 |
| 2015/0382284 A1 | 12/2015 | Brismar et al. | | |
| 2017/0078126 A1* | 3/2017 | Einhaus | ............. | H04W 72/042 |
| 2019/0357224 A1* | 11/2019 | Li | ........................ | H04W 72/04 |
| 2020/0022112 A1* | 1/2020 | Yasukawa | ......... | H04W 72/0413 |
| 2020/0128576 A1* | 4/2020 | Jung | .................... | H04L 1/1861 |
| 2020/0245257 A1* | 7/2020 | Pelletier | ............. | H04W 52/365 |

FOREIGN PATENT DOCUMENTS

CN            102685895 A     9/2012
EP             2675081 B1    12/2013

* cited by examiner

DATA TRANSMISSION METHOD AND RELATED APPARATUS

CROSS-REFERENCE TO RELATED APPLICATIONS

This application is a continuation of International Application No. PCT/CN2018/072804, filed on Jan. 16, 2018, which claims priority to Chinese Patent Application No. 201710048561.2, filed on Jan. 20, 2017. The disclosures of the aforementioned applications are hereby incorporated by reference in their entireties.

TECHNICAL FIELD

This application relates to the mobile communications field, and in particular, to a data transmission method and a related apparatus.

BACKGROUND

In an LTE-A system, a process of transmitting an uplink channel to a network device by a terminal device generally includes: the terminal device transmits a Scheduling Request (SR) to the network device; after the network device receives the SR, the network device generates uplink scheduling information, and transmits the uplink scheduling information; and after the terminal device receives the uplink scheduling information, the terminal device prepares information to be carried in uplink transmission, and transmits the uplink transmission.

In the prior art, a time interval between a time resource on which the uplink scheduling information is located and a time resource on which the uplink transmission is located is fixed. Therefore, after the network device receives the SR, scheduling flexibility is low, and network transmission efficiency is reduced.

SUMMARY

Embodiments of this application provide a data transmission method and a related device, to enable a network device to flexibly schedule uplink transmission and a time resource on which the uplink transmission is located.

A first aspect of the embodiments of this application provides a data transmission method, including first transmitting, by a terminal device, a scheduling request including information about at least one first transport block. Then after transmitting the scheduling request, receiving, by the terminal device, scheduling information on a first time resource, where the scheduling information indicates information about a target time resource. The method includes obtaining, by the terminal device, the target time resource from the scheduling information, where the target time resource includes a second time resource and a third time resource, and a time interval between the second time resource and the first time resource is greater than a time interval between the third time resource and the first time resource. The method further includes finally, transmitting, by the terminal device, a second transport block on the target time resource, where the second transport block is at least one transport block in the at least one first transport block or is at least one transport block other than the at least one first transport block.

As can be seen from the foregoing technical solution, the embodiments of this application have the following advantages.

In a scheduling process, the terminal device may report the information about the at least one first transport block; and after receiving the scheduling information, the terminal device transmits the second transport block on the target time resource indicated in the scheduling information, where when the second transport block is the at least one transport block in the at least one first transport block, the terminal device transmits the second transport block on the third time resource, or when the second transport block is the at least one transport block other than the at least one first transport block, the terminal device transmits the second transport block on the second time resource. Therefore, in the data transmission method in the embodiments of this application, the terminal device can use different time resources to transmit different transport blocks, and scheduling is relatively flexible.

With reference to the first aspect of the embodiments of this application, in a first possible implementation of the first aspect of the embodiments of this application, the information about the at least one first transport block indicates one or more first transport blocks and that a size of the at least one first transport block is not greater than a first threshold, where the first threshold is a value corresponding to a preset transport block size, or a preset value, or a value corresponding to a transport block size configured by using higher layer signaling.

The transport block indicated in the information about the at least one first transport block is refined. It indicates that the first transport block represents a transport block whose transport block size is less than or equal to the first threshold. Therefore, the first transport block is relatively small, and a transmission time is short.

With reference to the first aspect of the embodiments of this application or the first possible implementation of the first aspect of the embodiments of this application, in a second possible implementation of the first aspect of the embodiments of this application, the determining, by the terminal device, a target time resource includes: decoding, by the terminal device, the scheduling information to obtain information about the second transport block, thereby determining that the second transport block is one or more transport blocks, and determining whether the second transport block is in the at least one first transport block or is not in the at least one first transport block. When or after the terminal device determines the second transport block, if the second transport block is a transport block in the at least one first transport block, determining, by the terminal device, that the target time resource is the third time resource; or if the second transport block is a transport block other than the at least one first transport block, determining, by the terminal device, that the target time resource is the second time resource.

The target time resource is determined as the second time resource or the third time resource. Therefore, the terminal device can perform transmission by using one time resource that is not limited.

With reference to the second possible implementation of the first aspect of the embodiments of this application, in a third possible implementation of the first aspect of the embodiments of this application, the determining, by the terminal device, the second transport block based on the scheduling information includes: determining, by the terminal device, the second transport block based on some bits or a bit status of a modulation and coding scheme information field in the scheduling information; or determining the second transport block based on one of a modulation and coding scheme and resource allocation information in the scheduling information.

Two manners of determining the second transport block based on the scheduling information are provided, so that scheduling flexibility is relatively high. An appropriate manner may be selected based on an actual situation to determine the second transport block With reference to the first aspect of the embodiments of this application or the first possible implementation of the fifth aspect of the embodiments of this application, in a fourth possible implementation of the first aspect of the embodiments of this application, before the transmitting, by the terminal device, a second transport block on the target time resource based on the scheduling information, the method further includes: determining, by the terminal device, the second transport block based on first indication information in the scheduling information, where the scheduling information may further include the first indication information, the first indication information indicates the target time resource or indicates a scheduling mode, the target time resource includes the second time resource or the third time resource, the scheduling mode includes a first mode or a second mode, the first mode corresponds to the third time resource, and the second mode corresponds to the second time resource.

A direct indication manner is provided. The target time resource can be directly determined, and there is no need to determine the second transport block. Therefore, a determining speed can be increased.

With reference to the fourth possible implementation of the first aspect of the embodiments of this application, in a fifth possible implementation of the first aspect of the embodiments of this application, the determining, by the terminal device, the second transport block based on first indication information in the scheduling information includes: when the first indication information indicates the first mode or the third time resource, determining, by the terminal device, that the second transport block is the at least one transport block in the at least one first transport block; or when the first indication information indicates the second mode or the second time resource, determining, by the terminal device, that the second transport block is the at least one transport block other than the at least one first transport block.

Specific indication content in the first indication information is described in detail, so that determining the second transport block by using the first indication information becomes clearer and more specific.

With reference to the fifth possible implementation of the first aspect of the embodiments of this application, in a sixth possible implementation of the first aspect of the embodiments of this application, the determining, by the terminal device, that the second transport block is the at least one transport block in the at least one first transport block includes: when the at least one first transport block includes one transport block, determining, by the terminal device, that the second transport block is the transport block in the at least one first transport block; or when the at least one first transport block includes at least two transport blocks, determining, by the terminal device, the second transport block based on second indication information in the scheduling information.

The specific second transport block is determined based on a quantity of transport blocks in the at least one transport block, so that the determining process has higher feasibility.

With reference to the first aspect of the embodiments of this application or the first possible implementation of the first aspect of the embodiments of this application, in a seventh possible implementation of the first aspect of the embodiments of this application, before the receiving, by the terminal device, scheduling information on a first time resource, the method further includes: transmitting, by the terminal device, first notification information, where the first notification information is used to notify a network device that the terminal device has at least one of the following capability information: 1. the terminal device has a capability of supporting the time interval between the third time resource and the first time resource; 2. the terminal device has a capability of transmitting the at least one first transport block on the third time resource; and 3. the terminal device has a capability of fast transmitting the at least one first transport block.

The terminal device reports a fast transmission capability of the terminal device before transmitting the scheduling request. Therefore, the terminal device can be scheduled better, and scheduling failure caused by generation of scheduling not complying with a coding processing capability of the terminal device is avoided.

With reference to the first aspect of the embodiments of this application or the first possible implementation of the first aspect of the embodiments of this application, in an eighth possible implementation of the first aspect of the embodiments of this application, before the receiving, by the terminal device, scheduling information on a first time resource, the method further includes: starting, by the terminal device, to perform coding processing on the at least one first transport block.

Coding processing is performed in advance on a transport block requested to be reported in the scheduling request. Therefore, time can be saved, and the terminal device makes preparations in advance.

With reference to the first aspect of the embodiments of this application or the first possible implementation of the first aspect of the embodiments of this application, in a ninth possible implementation of the first aspect of the embodiments of this application, the transmitting, by a terminal device, a scheduling request includes: setting a second threshold, where the second threshold is a value corresponding to a preset transport block size, or a preset value, or a value corresponding to a transport block size configured by using higher layer signaling; and if a size of information in a buffer of the terminal device is greater than the second threshold, transmitting, by the terminal device, the scheduling request, or else, skipping, by the terminal device, transmitting the scheduling request.

A second aspect of the embodiments of this application provides a data transmission method, including first receiving, by a network device, a scheduling request, where the scheduling request includes information about at least one first transport block; then transmitting, by the network device, scheduling information on a first time resource. The method also includes, after a time interval, receiving, by the network device, a second transport block on a target time resource, where the target time resource includes a first time resource or a third time resource, a time interval between the second time resource and the first time resource is greater than a time interval between the third time resource and the first time resource, the second transport block is at least one transport block in the at least one first transport block or is at least one transport block other than the at least one first transport block, the third time resource corresponds to the at least one transport block in the at least one first transport block, and the second time resource corresponds to the at least one transport block other than the at least one first transport block.

As can be seen from the foregoing technical solution, the embodiments of this application have the following advantages.

The scheduling request received by the network device includes the information about the at least one transport block. After the network device transmits the scheduling request, when the network device receives the second transport block on the target time resource, the network device may receive the at least one transport block in the at least one first transport block on the third time resource, or may receive the at least one transport block other than the at least one first transport block on the second time resource. Scheduling is relatively flexible, and different time resources can be selected for scheduling based on different transport blocks. In addition, scheduling is more flexible and controllable because one of the third time resource and the second time resource is fast and the other is slow.

With reference to the second aspect of the embodiments of this application, in a first possible implementation of the second aspect of the embodiments of this application, the information about the at least one first transport block is used to indicate the at least one first transport block and that a size of the transport block is less than or equal to a first threshold, where the first threshold is a value corresponding to a preset transport block size, or a preset value, or a value corresponding to a transport block size configured by using higher layer signaling; or the information about the at least one first transport block is used to indicate a size of one or more first transport blocks.

The transport block indicated in the information about the at least one first transport block is refined. It indicates that the first transport block represents a transport block whose transport block size is less than or equal to the first threshold. Therefore, the first transport block is relatively small, and a transmission time is short.

With reference to the second aspect of the embodiments of this application or the first possible implementation of the second aspect of the embodiments of this application, in a second possible implementation of the second aspect of the embodiments of this application, the scheduling information includes a modulation and coding scheme information field, or includes a modulation and coding scheme and resource allocation information; and when the scheduling information includes the modulation and coding scheme information field, some bits or a bit status of the modulation and coding scheme information field are/is used to indicate the second transport block; or when the scheduling information includes the modulation and coding scheme and the resource allocation information, the modulation and coding scheme and the resource allocation information are used to indicate the second transport block.

Two methods for indicating the second transport block by using the scheduling information are provided, so that two implementation possibilities exist in the possible implementation.

With reference to the second aspect of the embodiments of this application or the first possible implementation of the second aspect of the embodiments of this application, in a third possible implementation of the second aspect of the embodiments of this application, first indication information exists in the scheduling information, the first indication information may be used to indicate that the target time resource is one of the second time resource or the third time resource, or may be used to indicate that a scheduling mode is a first mode or a second mode, the first mode corresponds to the third time resource, and the second mode corresponds to the second time resource.

A direct indication manner is provided. The target time resource can be directly determined, and there is no need to determine the second transport block. Therefore, a determining speed can be increased.

With reference to the third possible implementation of the second aspect of the embodiments of this application, in a fourth possible implementation of the second aspect of the embodiments of this application, when the at least one first transport block includes two or more transport blocks, which first transport block or which several first transport blocks in the at least one first transport block may be further learned from second indication information in the scheduling information.

When the first indication information indicates a lot of first transport blocks, specific first transport blocks may be indicated clearly by using the second indication information.

With reference to the second aspect of the embodiments of this application or the first possible implementation of the second aspect of the embodiments of this application, in a fifth possible implementation of the second aspect of the embodiments of this application, before the transmitting, by the network device, a scheduling request on a first time resource, the method further includes: receiving, by the network device, first notification information, where the first notification information is used to notify the network device that a terminal device has at least one of the following capability information: 1. the terminal device has a capability of supporting the time interval between the third time resource and the first time resource; 2. the terminal device has a capability of transmitting the at least one first transport block on the third time resource; and 3. the terminal device has a capability of fast transmitting the at least one first transport block.

The network device receives fast transmission capability information of the terminal device, and therefore can perform better scheduling based on the fast transmission capability of the terminal device.

A third aspect of the embodiments of this application provides a data transmission method, including: first transmitting, by a terminal device, a scheduling request when the terminal device requires scheduling, where the scheduling request includes information about at least one third transport block; then receiving, by the terminal device on a fourth time resource, scheduling information indicating how the terminal device is scheduled; and finally transmitting, by the terminal device, a fourth transport block on a fifth time resource indicated in the scheduling information, where the fourth transport block is at least one transport block in the at least one third transport block, the at least one transport block in the at least one third transport block corresponds to the fifth time resource, at least one transport block other than the at least one third transport block corresponds to a sixth time resource, and a time interval between the fifth time resource and the fourth time resource is greater than a time interval between the sixth time resource and the fourth time resource.

As can be seen from the foregoing technical solution, the embodiments of this application have the following advantages.

The terminal device transmits the scheduling request including the information about the at least one third transport block; and after the terminal device receives the scheduling information on the fourth time resource, the terminal device transmits the fourth transport block on the fifth time resource indicated in the scheduling information, where the fourth transport block is one or more transport blocks in the at least one third transport block. It may be understood that, the scheduling information indicates the fifth time resource and does not indicate the sixth time resource, the fifth time resource corresponds to the at least one transport block in the at least one third transport block, and the scheduling request includes the information about the at least one third transport block. Therefore, in the data transmission method in the embodiments of this application, a scheduling mode with a relatively fixed time resource is provided.

With reference to the third aspect of the embodiments of this application, in a first possible implementation of the third aspect of the embodiments of this application, the information about the at least one third transport block is used to indicate the at least one third transport block and that a size of the transport block is greater than or equal to a first threshold, where the first threshold is a value corresponding to a preset transport block size, or a preset value, or a value corresponding to a transport block size configured by using higher layer signaling; or the information about the at least one third transport block is used to indicate a size of one or more first transport blocks.

The transport block indicated in the information about the at least one third transport block is refined. It indicates that the third transport block represents a transport block whose transport block size is greater than or equal to the first threshold. Therefore, the first transport block is relatively large, a transmission time is long, and scheduling flexibility is poor.

With reference to the third aspect of the embodiments of this application or the first possible implementation of the third aspect of the embodiments of this application, in a second possible implementation of the third aspect of the embodiments of this application, the determining, by the terminal device, a fifth time resource includes: decoding, by the terminal device, the scheduling information to obtain information about the fourth transport block, thereby determining the fourth transport block; and determining, by the terminal device, the fifth time resource based on a relationship between the fourth transport block and the at least one third transport block; or determining, by the terminal device, the fifth time resource based on a relationship between the fourth transport block and the at least one transport block other than the at least one third transport block.

The target time resource is determined as the fifth time resource rather than the sixth time resource, and this indicates that a preparation time required for transmitting the fourth transport block is relatively long.

With reference to the second possible implementation of the third aspect of the embodiments of this application, in a third possible implementation of the third aspect of the embodiments of this application, the determining, by the terminal device, the fourth transport block based on the scheduling information includes: determining, by the terminal device, the fourth transport block based on some bits or a bit status of a modulation and coding scheme information field in the scheduling information; or determining the fourth transport block based on one of a modulation and coding scheme and resource allocation information in the scheduling information.

Two manners of determining the fourth transport block based on the scheduling information are provided, so that scheduling flexibility is relatively high. An appropriate manner may be selected based on an actual situation to determine the fourth transport block.

With reference to the third aspect of the embodiments of this application or the first possible implementation of the third aspect of the embodiments of this application, in a fourth possible implementation of the third aspect of the embodiments of this application, before the transmitting a fourth transport block on the target time resource, the method further includes: the scheduling information may further include first indication information, where the first indication information is used to indicate the fifth time resource or a first mode, and the first mode corresponds to the fifth time resource.

A direct indication manner is provided. A time resource can be directly determined as the fifth time resource, and there is no need to determine the fourth transport block. Therefore, a determining speed can be increased.

With reference to the third aspect of the embodiments of this application or the first possible implementation of the third aspect of the embodiments of this application, in a fifth possible implementation of the third aspect of the embodiments of this application, before the transmitting, by a terminal device, a scheduling request, the method further includes: transmitting, by the terminal device, second notification information, where the second notification information is used to notify a network device that the terminal device has at least one of the following capability information: 1. the terminal device has a capability of supporting the time interval between the fifth time resource and the fourth time resource; 2. the terminal device has a capability of transmitting the at least one third transport block on the fifth time resource; and 3. the terminal device has a capability of transmitting the at least one third transport block.

The terminal device reports a fast transmission capability of the terminal device before transmitting the scheduling request. Therefore, the terminal device can be scheduled better, and scheduling failure caused by generation of scheduling not complying with a coding processing capability of the terminal device is avoided.

With reference to the third aspect of the embodiments of this application or the first possible implementation of the third aspect of the embodiments of this application, in a sixth possible implementation of the third aspect of the embodiments of this application, before the receiving, by the terminal device, scheduling information on a fourth time resource, the method further includes: starting, by the terminal device, to perform coding processing on the at least one first transport block.

Coding processing is performed in advance on a transport block requested to be reported in the scheduling request. Therefore, time can be saved, and the terminal device makes preparations in advance.

With reference to the third aspect of the embodiments of this application or the first possible implementation of the third aspect of the embodiments of this application, in a seventh possible implementation of the third aspect of the embodiments of this application, the transmitting, by a terminal device, a scheduling request includes: setting a second threshold, where the second threshold is a value corresponding to a preset transport block size, or a preset value, or a value corresponding to a transport block size configured by using higher layer signaling; and if a size of information in a buffer of the terminal device is greater than the second threshold, transmitting, by the terminal device, the scheduling request, or else, skipping, by the terminal device, transmitting the scheduling request.

A preset scheduling request trigger is set, so that trigger requests transmitted by the terminal device are effectively reduced.

A fourth aspect of the embodiments of this application provides a data transmission method, including: first receiving, by a network device, a scheduling request, where the scheduling request includes information about at least one third transport block; then transmitting, by the network device, scheduling information on a fourth time resource; and after a time interval, receiving, by the network device, a fourth transport block on a fifth time resource, where the fourth transport block is at least one transport block in the at least one third transport block, the at least one transport block in the at least one third transport block corresponds to the fifth time resource, at least one transport block other than the at least one third transport block corresponds to a sixth time resource, and a time interval between the fifth time resource and the fourth time resource is greater than a time interval between the sixth time resource and the fourth time resource.

As can be seen from the foregoing technical solution, the embodiments of this application have the following advantages.

The network device receives the scheduling request including the information about the at least one third transport block; and after the network device transmits the scheduling information on the fourth time resource, the network device receives the fourth transport block on the fifth time resource, where the fourth transport block is one or more transport blocks in the at least one third transport block. It may be understood that, the scheduling information indicates the fifth time resource and does not indicate the sixth time resource, the fifth time resource corresponds to the at least one transport block in the at least one third transport block, and the scheduling request includes the information about the at least one third transport block. Therefore, in the data transmission method in the embodiments of this application, a scheduling mode with a relatively fixed time resource is provided.

With reference to the fourth aspect of the embodiments of this application, in a first possible implementation of the fourth aspect of the embodiments of this application, the information about the at least one third transport block is used to indicate the at least one third transport block and that a size of the transport block is greater than or equal to a first threshold, where the first threshold is a value corresponding to a preset transport block size, or a preset value, or a value corresponding to a transport block size configured by using higher layer signaling; or the information about the at least one third transport block is used to indicate a size of one or more third transport blocks.

The transport block indicated in the information about the at least one third transport block is refined. It indicates that the first transport block represents a transport block whose transport block size is less than or equal to the first threshold. Therefore, the first transport block is relatively large, a transmission time is long, and scheduling flexibility is poor.

With reference to the fourth aspect of the embodiments of this application or the first possible implementation of the fourth aspect of the embodiments of this application, in a second possible implementation of the fourth aspect of the embodiments of this application, the scheduling information includes a modulation and coding scheme information field, or includes a modulation and coding scheme and resource allocation information; and when the scheduling information includes the modulation and coding scheme information field, some bits or a bit status of the modulation and coding scheme information field are/is used to indicate the fourth transport block; or when the scheduling information includes the modulation and coding scheme and the resource allocation information, the modulation and coding scheme and the resource allocation information are used to indicate the fourth transport block.

Two methods for indicating the fourth transport block by using the scheduling information are provided, so that two implementation possibilities exist in the possible implementation.

With reference to the fourth aspect of the embodiments of this application or the first possible implementation of the fourth aspect of the embodiments of this application, in a third possible implementation of the fourth aspect of the embodiments of this application, the scheduling information may further include first indication information, the first indication information is used to indicate the fifth time resource or a first mode, and the first mode corresponds to the fifth time resource.

A direct indication manner is provided. A time resource can be directly determined as the fifth time resource, and there is no need to determine the fourth transport block. Therefore, a determining speed can be increased.

With reference to the fourth aspect of the embodiments of this application or the first possible implementation of the fourth aspect of the embodiments of this application, in a fourth possible implementation of the fourth aspect of the embodiments of this application, before the transmitting, by the network device, scheduling information on a fourth time resource, the method further includes: receiving, by the network device, second notification information, where the second notification information is used to notify the network device that a terminal device has at least one of the following capability information: 1. the terminal device has a capability of supporting the time interval between the fifth time resource and the fourth time resource; 2. the terminal device has a capability of transmitting the at least one third transport block on the fifth time resource; and 3. the terminal device has a capability of transmitting the at least one third transport block.

The network device receives information about a size of the at least one third transport block that the terminal device can transmit, and/or information about a quantity of the at least one third transport block that the terminal device can transmit.

The terminal device reports capability information of the terminal device before transmitting the scheduling request. Therefore, the terminal device can be scheduled better, and scheduling failure caused by generation of scheduling not complying with a coding processing capability of the terminal device is avoided.

A fifth aspect of the embodiments of this application provides a data transmission method, including: first transmitting, by a terminal device, a scheduling request including information about a quantity M of fifth transport blocks, where M is a positive integer; then after transmitting the scheduling request, receiving, by the terminal device, scheduling information on a seventh time resource; determining, by the terminal device, J target time resources based on the received scheduling information, where J is a positive integer not greater than M; and finally transmitting, by the terminal device, X sixth transport blocks on the J target time resources, where X is a positive integer.

As can be seen from the foregoing technical solution, the embodiments of this application have the following advantages.

When the scheduling request may include the information about the quantity M of the fifth transport blocks, the terminal device obtains the J target time resources based on the scheduling information. Therefore, the terminal device transmits the J sixth transport blocks on the J target time resources. Therefore, in the data transmission method in the embodiments of this application, a scheduling method capable of scheduling one or more fifth transport blocks at a time is provided.

With reference to the fifth aspect of the embodiments of this application, in a first possible implementation of the fifth aspect of the embodiments of this application, the J target time resources are J eighth time resources or J ninth time resources, and a time interval between an earliest time resource in the J eighth time resources and the seventh time resource is greater than a time interval between an earliest time resource in the J ninth time resources and the seventh time resource.

The time interval between the earliest time resource in the ninth time resources and the seventh time resource is different from the time interval between the earliest time resource in the eighth time resources and the seventh time resource. Because one is fast and the other is slow, fast scheduling and slow scheduling are implemented in this implementation.

With reference to the fifth aspect of the embodiments of this application, in a second possible implementation of the fifth aspect of the embodiments of this application, the sixth transport blocks are the fifth transport blocks or are at least one transport block other than the fifth transport blocks, the fifth transport blocks correspond to the J ninth time resources, and the at least one transport block other than the fifth transport blocks corresponds to the J eighth time resources.

A mutual correspondence between transport blocks and time resources is provided. It indicates that fast time resources and slow time resources are used to transmit different transport blocks.

With reference to the fifth aspect of the embodiments of this application or the first possible implementation of the fifth aspect of the embodiments of this application or the second possible implementation of the fifth aspect of the embodiments of this application, in a third possible implementation of the fifth aspect of the embodiments of this application, before the receiving, by the terminal device, scheduling information on a seventh time resource, the method further includes transmitting, by the terminal device, third notification information, where the third notification information is used to notify a network device that the terminal device has at least one of the following capability information: 1. the terminal device has a capability of supporting the quantity M of the fifth transport blocks; and 2. the terminal device has a capability of fast transmitting at least one fifth transport block.

The terminal device reports fast transmission capability information of the terminal device, so that better scheduling can be performed based on the fast transmission capability of the terminal device.

With reference to the fifth aspect of the embodiments of this application or the first possible implementation of the fifth aspect of the embodiments of this application or the second possible implementation of the fifth aspect of the embodiments of this application, in a fourth possible implementation of the fifth aspect of the embodiments of this application, before the receiving, by the terminal device, scheduling information on a seventh time resource, the method further includes: starting, by the terminal device, to perform coding processing on the M fifth transport blocks.

Coding processing is performed in advance on a transport block requested to be reported in the scheduling request. Therefore, time can be saved, and the terminal device makes preparations in advance.

A sixth aspect of the embodiments of this application provides a data transmission method, including: first receiving, by a network device, a scheduling request, where the scheduling request includes information about a quantity M of fifth transport blocks, and M is a positive integer; then transmitting, by the network device, scheduling information on a seventh time resource; and after a time interval, receiving, by the network device, X sixth transport blocks on J target time resources, where J is a positive integer not greater than M, and X is a positive integer.

As can be seen from the foregoing technical solution, the embodiments of this application have the following advantages.

When the scheduling request may include the information about the quantity M of the fifth transport blocks, the network device performs corresponding scheduling. Therefore, the network device receives the J sixth transport blocks on the J target time resources. Therefore, in the data transmission method in the embodiments of this application, a scheduling method capable of scheduling one or more fifth transport blocks at a time is provided.

With reference to the sixth aspect of the embodiments of this application, in a first possible implementation of the sixth aspect of the embodiments of this application, the J target time resources are J eighth time resources or J ninth time resources, and a time interval between an earliest time resource in the J eighth time resources and the seventh time resource is greater than a time interval between an earliest time resource in the J ninth time resources and the seventh time resource.

The time interval between the earliest time resource in the ninth time resources and the seventh time resource is different from the time interval between the earliest time resource in the eighth time resources and the seventh time resource. Because one is fast and the other is slow, fast scheduling and slow scheduling are implemented in this implementation.

With reference to the sixth aspect of the embodiments of this application, in a second possible implementation of the sixth aspect of the embodiments of this application, the sixth transport blocks are the fifth transport blocks or are at least one transport block other than the fifth transport blocks, the fifth transport blocks correspond to the J ninth time resources, and the at least one transport block other than the fifth transport blocks corresponds to the J eighth time resources.

A mutual correspondence between transport blocks and time resources is provided. It indicates that fast time resources and slow time resources are used to transmit different transport blocks.

With reference to the sixth aspect of the embodiments of this application, the first possible implementation of the sixth aspect of the embodiments of this application, or the second possible implementation of the sixth aspect of the embodiments of this application, in a third possible implementation of the sixth aspect of the embodiments of this application, before the transmitting, by the network device, scheduling information on a seventh time resource, the method further includes: receiving, by the terminal device, third notification information, where the third notification information is used to notify the network device that a terminal device has at least one of the following capability information: 1. the terminal device has a capability of supporting the quantity M of the fifth transport blocks; and 2. the terminal device has a capability of fast transmitting at least one fifth transport block.

The terminal device reports fast transmission capability information of the terminal device, so that better scheduling can be performed based on the fast transmission capability of the terminal device.

A seventh aspect of the embodiments of this application provides a data transmission method, including: first transmitting, by a terminal device, a scheduling request when the terminal device requires scheduling, where the scheduling request includes a duration of a tenth time resource; then receiving, by the terminal device, scheduling information on an eleventh time resource, and determining a target time resource based on the scheduling information, where a duration of the target time resource is not shorter than the duration of the tenth time resource; and finally transmitting, by the terminal device, a seventh transport block on the target time resource.

As can be seen from the foregoing technical solution, the embodiments of this application have the following advantages.

When the scheduling request includes the duration of the tenth time resource, the terminal device obtains the target time resource based on the scheduling information. Therefore, the terminal device transmits the seventh transport block on the target time resource. Therefore, in the data transmission method in the embodiments of this application, a scheduling method for performing scheduling based on the duration of the time resource requested in the scheduling request is provided.

With reference to the seventh aspect of the embodiments of this application, in a first possible implementation of the seventh aspect of the embodiments of this application, the target time resource is a twelfth time resource or a thirteenth time resource, and a time interval between the twelfth time resource and the eleventh time resource is greater than a time interval between the thirteenth time resource and the eleventh time resource.

In the target time resource, the time interval between the twelfth time resource and the eleventh time resource is greater than the time interval between the thirteenth time resource and the eleventh time resource. Because one is fast and the other is slow, fast scheduling and slow scheduling are implemented in this implementation.

With reference to the first possible implementation of the seventh aspect of the embodiments of this application, in a second possible implementation of the seventh aspect of the embodiments of this application, a duration of the twelfth time resource is not shorter than the duration of the tenth time resource, and a duration of the thirteenth time resource is equal to the duration of the tenth time resource.

Because the duration of the target time resource is greater than or equal to the duration of the tenth time resource, it can be ensured that the terminal device has a sufficient duration for transmitting a transport block.

With reference to the seventh aspect of the embodiments of this application, the first possible implementation of the seventh aspect of the embodiments of this application, or the second possible implementation of the seventh aspect of the embodiments of this application, in a third possible implementation of the seventh aspect of the embodiments of this application, before the receiving, by the terminal device, scheduling information on an eleventh time resource, the method further includes: transmitting, by the terminal device, fourth notification information, where the fourth notification information is used to notify a network device that the terminal device has at least one of the following capability information: 1. the terminal device has a capability of supporting a duration greater than or equal to the duration of the tenth time resource; and 2. the terminal device has a capability of fast transmission for a duration greater than or equal to the duration of the tenth time resource.

The terminal device reports fast transmission capability information of the terminal device, so that better scheduling can be performed based on the fast transmission capability of the terminal device.

An eighth aspect of the embodiments of this application provides a data transmission method, including: first receiving, by a network device, a scheduling request, where the scheduling request includes a duration of a tenth time resource; then transmitting, by the network device, scheduling information on an eleventh time resource; and after a time interval, receiving, by the network device, a seventh transport block on a target time resource.

As can be seen from the foregoing technical solution, the embodiments of this application have the following advantages.

When the scheduling request includes the duration of the tenth time resource, the network device transmits the scheduling information based on the duration of the tenth time resource in the scheduling request. Therefore, the network device receives the seventh transport block on the target time resource. Therefore, in the data transmission method in the embodiments of this application, a scheduling method for performing scheduling based on the duration of the time resource requested in the scheduling request is provided.

With reference to the eighth aspect of the embodiments of this application, in a first possible implementation of the eighth aspect of the embodiments of this application, the target time resource is a twelfth time resource or a thirteenth time resource, and a time interval between the twelfth time resource and the eleventh time resource is greater than a time interval between the thirteenth time resource and the eleventh time resource.

In the target time resource, the time interval between the twelfth time resource and the eleventh time resource is greater than the time interval between the thirteenth time resource and the eleventh time resource. Because one is fast and the other is slow, fast scheduling and slow scheduling are implemented in this implementation.

With reference to the first possible implementation of the eighth aspect of the embodiments of this application, in a second possible implementation of the eighth aspect of the embodiments of this application, a duration of the twelfth time resource is not shorter than the duration of the tenth time resource, and a duration of the thirteenth time resource is equal to the duration of the tenth time resource.

Because the duration of the target time resource is greater than or equal to the duration of the tenth time resource, it can be ensured that the terminal device has a sufficient duration for transmitting a transport block.

With reference to the eighth aspect of the embodiments of this application, the first possible implementation of the eighth aspect of the embodiments of this application, or the second possible implementation of the eighth aspect of the embodiments of this application, in a third possible implementation of the eighth aspect of the embodiments of this application, before the transmitting, by the network device, scheduling information on an eleventh time resource, the method further includes: receiving, by the network device, fourth notification information, where the fourth notification information is used to notify the network device that a terminal device has at least one of the following capability information: 1. the terminal device has a capability of supporting a duration greater than or equal to the duration of the tenth time resource; and 2. the terminal device has a capability of fast transmission for a duration greater than or equal to the duration of the tenth time resource.

The network device receives fast transmission capability information of the terminal device, and therefore can perform better scheduling based on the fast transmission capability of the terminal device.

A ninth aspect of the embodiments of this application provides a data transmission method, including: first transmitting, by a terminal device, a scheduling request; then after transmitting the scheduling request, receiving, by the terminal device, scheduling information on a fourteenth time resource, where the scheduling information indicates information about a target time resource; obtaining, by the terminal device, the target time resource from the scheduling information, where the target time resource includes a fifteenth time resource and a sixteenth time resource, and a time interval between the fifteenth time resource and the fourteenth time resource is greater than a time interval between the sixteenth time resource and the fourteenth time resource; and finally, transmitting, by the terminal device, an eighth transport block on the target time resource, where the eighth transport block is at least one transport block in at least one ninth transport block or is at least one transport block other than at least one ninth transport block, and the at least one ninth transport block corresponds to information about a transport block that is preset or is configured by using higher layer signaling.

As can be seen from the foregoing technical solution, the embodiments of this application have the following advantages.

After the terminal device transmits the scheduling request, the terminal device receives the scheduling information on the fourteenth time resource; and then the terminal device obtains the target time resource from the scheduling information, and finally transmits the eighth transport block on the target time resource. The at least one ninth transport block corresponds to the information about the transport block that is preset or is configured by using higher layer signaling. Therefore, the embodiments of this application provide a method for performing scheduling based on the information about the transport block that is preset or is configured by using higher layer signaling. The information may be information included in the scheduling request, or may be information determined by the terminal device and the network device before the terminal device transmits the scheduling request.

With reference to the ninth aspect of the embodiments of this application, in a possible implementation of the embodiments of this application, first, the at least one transport block in the at least one ninth transport block is preset, or is configured by using higher layer signaling for the terminal device; before the terminal device receives the scheduling information, the terminal device starts to perform coding processing on the at least one transport block in the at least one ninth transport block; the step of the at least one transport block in the at least one ninth transport block is similar to the step of the at least one transport block in the at least one first transport block in the first aspect of the embodiments of this application, and is not described again herein; and the eighth transport block in the ninth aspect is similar to the second transport block, and is not described again herein.

In a possible implementation of the ninth aspect of the embodiments of this application, the terminal device transmits fifth notification information, where a function of the fifth notification information is similar to the function of the first notification information in the first aspect of the embodiments of this application, and is not described again herein.

Other possible implementations of the ninth aspect of the embodiments of this application are similar to the implementations of the first aspect of the embodiments of this application, and are not described again herein.

A tenth aspect of the embodiments of this application provides a data transmission method, including: first receiving, by a network device, a scheduling request; then transmitting, by the network device, scheduling information on a fourteenth time resource; and after a time interval, receiving, by the network device, an eighth transport block on a target time resource, where the target time resource includes a fifteenth time resource or a sixteenth time resource, a time interval between the fifteenth time resource and the fourteenth time resource is greater than a time interval between the sixteenth time resource and the fourteenth time resource, the eighth transport block is at least one transport block in at least one ninth transport block or is at least one transport block other than at least one ninth transport block, the sixteenth time resource corresponds to the at least one transport block in the at least one first transport block, and the fifteenth time resource corresponds to the at least one transport block other than the at least one ninth transport block, and the at least one ninth transport block corresponds to information about a transport block that is preset or is configured by using higher layer signaling.

As can be seen from the foregoing technical solution, the embodiments of this application have the following advantages.

After the network device receives the scheduling request, the network device transmits the scheduling information on the fourteenth time resource, and finally the network device receives the eighth transport block on the target time resource. Therefore, the embodiments of this application provide a method for performing scheduling based on the information about the transport block that is preset or is configured by using higher layer signaling.

The information may be included in the scheduling request, or may be information determined by the terminal device and the network device before the terminal device transmits the scheduling request.

With reference to the tenth aspect of the embodiments of this application, in a possible embodiment of the tenth aspect of the embodiments of this application, the at least one transport block in the at least one ninth transport block is preset, or is configured by using higher layer signaling for the terminal device; when the network device receives the scheduling request, the network device determines that the terminal device can perform coding processing on the at least one transport block in the at least one ninth transport block, where the processing may be performed in advance or may not be performed in advance; it may be understood that, the scheduling request does not include an identifier that can identify the at least one transport block in the at least one ninth transport block; and the at least one transport block in the at least one ninth transport block is similar to the at least one transport block in the at least one first transport block, the fourteenth time resource is similar to the first time resource, the fifteenth time resource is similar to the second time resource, and the sixteenth time resource is similar to the fifth time resource, and therefore details are not described again herein. In a possible implementation of the tenth aspect of the embodiments of this application, the network device receives fifth notification information, where a function of the fifth notification information is similar to the function of the first notification information in the second aspect of the embodiments of this application, and is not described again herein.

Other possible implementations of the tenth aspect of the embodiments of this application are similar to the implementations of the second aspect of the embodiments of this application, and are not described again herein.

An eleventh aspect of the embodiments of this application provides a data transmission method, including: first transmitting, by a terminal device, a scheduling request including information about a quantity G of seventeenth time resources, where G is a positive integer; then after transmitting the scheduling request, receiving, by the terminal device, scheduling information on an eighteenth time resource; determining, by the terminal device, H target time resources based on the received scheduling information, where H is a positive integer not greater than G; and finally, transmitting, by the terminal device, Y tenth transport blocks on the H target time resources, where Y is a positive integer.

As can be seen from the foregoing technical solution, the embodiments of this application have the following advantages.

When the scheduling request may include the information about the quantity G of the seventeenth time resources, the terminal device obtains the H target time resources based on the scheduling information. Therefore, the terminal device transmits the Y tenth transport blocks on the H target time resources. Therefore, in the data transmission method in the embodiments of this application, a method for flexibly scheduling one or more target time resources at a time is provided, where the target time resource is a time resource on which uplink transmission is located.

With reference to the eleventh aspect of the embodiments of this application, in a possible implementation of the eleventh aspect of the embodiments of this application, before the transmitting, by a terminal device, a scheduling request, the method further includes: transmitting, by the terminal device, sixth notification information, where the sixth notification information is used to notify a network device that the terminal device has at least one of the following capability information: 1. the terminal device has a capability of supporting the quantity G of the seventeenth time resources; and 2. the terminal device has a capability of fast transmitting at least one tenth transport block.

With reference to the eleventh aspect of the embodiments of this application, other possible implementations of the eleventh aspect of the embodiments of this application are similar to the possible implementations of the fifth aspect of the embodiments of this application, and are not describe again herein, where the target time resources include nineteenth time resources and twentieth time resources, an earliest time resource in the twentieth time resources is earlier than an earliest time resource in the nineteenth time resources, and a function of the tenth transport block is similar to a function of the sixth transport block, and is not described again herein.

A twelfth aspect of the embodiments of this application provides a data transmission method, including: first receiving, by a network device, a scheduling request, where the scheduling request includes information about a quantity G of seventeenth time resources, and G is a positive integer; then transmitting, by the network device, scheduling information on an eighteenth time resource; and after a time interval, receiving, by the network device, Y tenth transport blocks on H target time resources, where H is a positive integer not greater than G, and Y is a positive integer.

As can be seen from the foregoing technical solution, the embodiments of this application have the following advantages.

When the scheduling request may include the information about the quantity G of the seventeenth time resources, the network device performs corresponding scheduling; and the network device receives the Y sixth transport blocks on the H target time resources. Therefore, in the data transmission method in the embodiments of this application, a method for flexibly scheduling one or more target time resources at a time is provided, where the target time resource is a time resource on which uplink transmission is located.

With reference to the twelfth aspect of the embodiments of this application, in a possible implementation of the twelfth aspect of the embodiments of this application, before the receiving, by a network device, a scheduling request, the method further includes: receiving, by the terminal device, sixth notification information, where the sixth notification information is used to notify the network device that a terminal device has at least one of the following capability information: 1. the terminal device has a capability of supporting the quantity G of the seventeenth time resources; and 2. the terminal device has a capability of fast transmitting at least one tenth transport block.

With reference to the twelfth aspect of the embodiments of this application, other possible implementations of the twelfth aspect of the embodiments of this application are similar to the possible implementations of the sixth aspect of the embodiments of this application, and are not describe again herein, where the target time resources include nineteenth time resources and twentieth time resources, an earliest time resource in the twentieth time resources is earlier than an earliest time resource in the nineteenth time resources, and a function of the tenth transport block is similar to a function of the sixth transport block, and is not described again herein.

A thirteenth aspect of the embodiments of this application provides a terminal device, where the terminal device has a function for implementing an action of the terminal device in the first aspect. The function may be implemented by hardware, or may be implemented by corresponding software executed by hardware. The hardware or software includes one or more modules corresponding to the foregoing function.

A fourteenth aspect of the embodiments of this application provides a network device, where the network device has a function for implementing an action of the network device in the second aspect. The function may be implemented by hardware, or may be implemented by corresponding software executed by hardware. The hardware or software includes one or more modules corresponding to the foregoing function.

A fifteenth aspect of the embodiments of this application provides a terminal device, where the terminal device has a function for implementing an action of the terminal device in the third aspect. The function may be implemented by hardware, or may be implemented by corresponding software executed by hardware. The hardware or software includes one or more modules corresponding to the foregoing function.

A sixteenth aspect of the embodiments of this application provides a network device, where the network device has a function for implementing an action of the network device in the fourth aspect. The function may be implemented by hardware, or may be implemented by corresponding software executed by hardware. The hardware or software includes one or more modules corresponding to the foregoing function.

A seventeenth aspect of the embodiments of this application provides a terminal device, where the terminal device has a function for implementing an action of the terminal device in the fifth aspect. The function may be implemented by hardware, or may be implemented by corresponding software executed by hardware. The hardware or software includes one or more modules corresponding to the foregoing function.

An eighteenth aspect of the embodiments of this application provides a network device, where the network device has a function for implementing an action of the network device in the sixth aspect. The function may be implemented by hardware, or may be implemented by corresponding software executed by hardware. The hardware or software includes one or more modules corresponding to the foregoing function.

A nineteenth aspect of the embodiments of this application provides a terminal device, where the terminal device has a function for implementing an action of the terminal device in the seventh aspect. The function may be implemented by hardware, or may be implemented by corresponding software executed by hardware. The hardware or software includes one or more modules corresponding to the foregoing function.

A twentieth aspect of the embodiments of this application provides a network device, where the network device has a function for implementing an action of the network device in the eighth aspect. The function may be implemented by hardware, or may be implemented by corresponding software executed by hardware. The hardware or software includes one or more modules corresponding to the foregoing function.

A twenty-first aspect of the embodiments of this application provides a terminal device, where the terminal device has a function for implementing an action of the terminal device in the ninth aspect. The function may be implemented by hardware, or may be implemented by corresponding software executed by hardware. The hardware or software includes one or more modules corresponding to the foregoing function.

A twenty-second aspect of the embodiments of this application provides a network device, where the network device has a function for implementing an action of the terminal device in the tenth aspect. The function may be implemented by hardware, or may be implemented by corresponding software executed by hardware. The hardware or software includes one or more modules corresponding to the foregoing function.

A twenty-third aspect of the embodiments of this application provides a terminal device, where the terminal device has a function for implementing an action of the terminal device in the eleventh aspect. The function may be implemented by hardware, or may be implemented by corresponding software executed by hardware. The hardware or software includes one or more modules corresponding to the foregoing function.

A twenty-fourth aspect of the embodiments of this application provides a network device, where the network device has a function for implementing an action of the terminal device in the twelfth aspect. The function may be implemented by hardware, or may be implemented by corresponding software executed by hardware. The hardware or software includes one or more modules corresponding to the foregoing function.

A twenty-fifth aspect of the embodiments of this application provides a communications apparatus. For example, the communications apparatus is a chip. Optionally, the communications apparatus may be applied to a terminal device, and the communications apparatus includes at least one processor, a memory, and an interface circuit, where the memory is communicatively connected to the at least one processor, the memory stores an instruction, and the processor executes the instruction to perform an operation of the terminal device in the method according to any one of the first aspect, the third aspect, the fifth aspect, the seventh aspect, the ninth aspect, and the eleventh aspect.

A twenty-sixth aspect of the embodiments of this application provides a communications apparatus. For example, the communications apparatus is a chip. Optionally, the communications apparatus may be applied to a network device, and the chip system includes at least one processor, a memory, and an interface circuit, where the memory is communicatively connected to the at least one processor, the memory stores an instruction, and the processor executes the instruction to perform an operation of the network device in the method according to any one of the second aspect, the fourth aspect, the sixth aspect, the eighth aspect, the tenth aspect, and the twelfth aspect.

DESCRIPTION OF EMBODIMENTS

Figure 1:
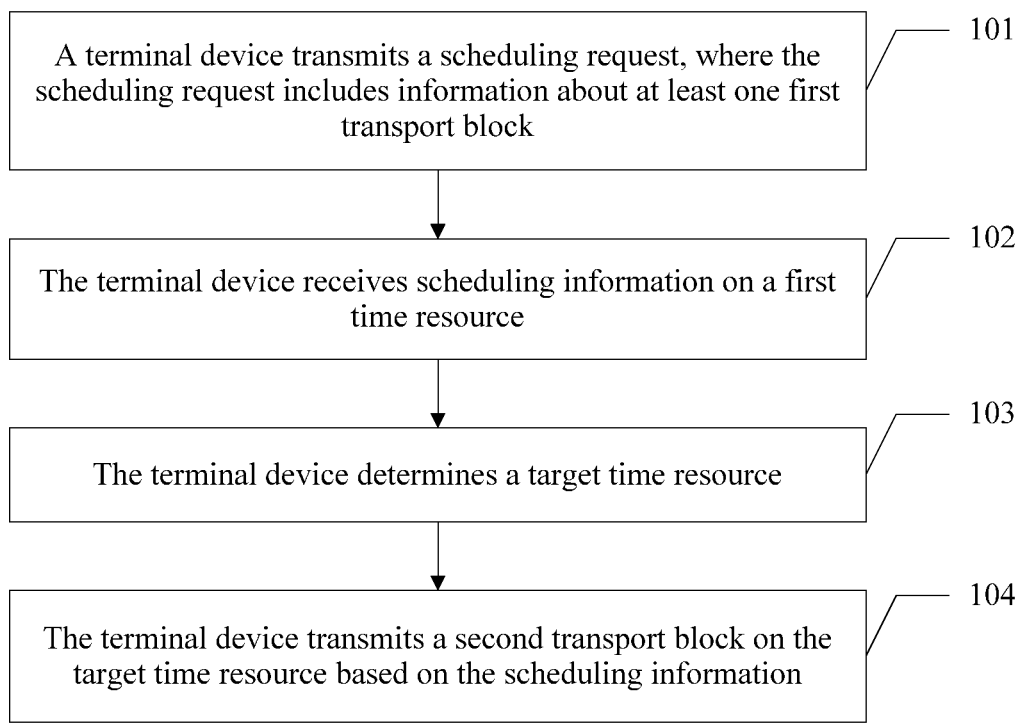
FIG. 1 is a schematic diagram of an embodiment of a data transmission method according to an embodiment of this application.

Embodiments of this application provide a data transmission method and a related apparatus to enable a network device to flexibly schedule, based on a scheduling request of a terminal device, uplink transmission and a time resource on which the uplink transmission is located.

In the specification, claims, and accompanying drawings of this application, the terms "first", "second", "third", "fourth", and so on (if existent) are intended to distinguish between similar objects but do not necessarily indicate a specific order or sequence. It should be understood that the data used in such a way are interchangeable in proper circumstances so that the embodiments described herein can be implemented in other orders than the order illustrated or described herein. Moreover, the terms "include", "contain", and any other variants mean to cover the non-exclusive inclusion. For example, a process, method, system, product, or device that includes a list of steps or units is not necessarily limited to those units, but may include other units not expressly listed or inherent to such a process, method, system, product, or device With fast development of modern mobile communications technologies, a network transmission rate gradually becomes more important. When a network device performs data transmission with a terminal device, generally the terminal device transmits a request message; after the network device receives the request message, the network device transmits a request response message; and then after the terminal device receives the request response message, the terminal device performs data transmission according to an instruction of the request response message.

The embodiments of this application may be applied to a wireless communications system, for example, a Global System for Mobile Communications (GSM) system, a Code Division Multiple Access (CDMA) system, a Wideband Code Division Multiple Access Wireless (WCDMA) system, a General Packet Radio Service (GPRS) system, a Universal Mobile Telecommunications System (UMTS), in particular, an LTE system and a system evolved therefrom, or a new generation (NR) wireless communications system.

Each embodiment is described with reference to a terminal device in this application. The terminal device may be referred to as user equipment (UE), a mobile station (MS), a mobile terminal, an intelligent terminal, or the like. The terminal device may communicate with one or more core networks by using a Radio Access Network (RAN). For example, the terminal device may be a mobile phone (or referred to as a "cellular" phone) or a computer with a mobile terminal. The terminal device may be a portable, pocket-size, handheld, computer built-in, or in-vehicle mobile apparatus, and a terminal device in a future 5G network. The terminal device exchanges voice and/or data with the radio access network. Descriptions about the terminal device: In the embodiments of this application, the terminal device may further include a relay, and any device that can perform data communication with a base station may be considered as a terminal device. The embodiments of this application are described with reference to UE in a general sense.

In addition, each embodiment is described with reference to a network device in this application. The network device may be an evolved base station (Evolutional NodeB, eNB or eNodeB for short) in a Long Term Evolution (LTE) system or a licensed-assisted access long term evolution (Authorized auxiliary access long-term evolution, LAA-LTE) system, a macro base station, a micro base station (or referred to as a "small cell"), a pico base station, an Access Point (AP), a Transmission Point (TP), a gNodeB (new generation NodeB, new generation base station), or the like.

It should be noted that, a first time resource to a twentieth time resource occur in the embodiments of this application, where durations of different time resources may be the same or may be different. A duration of a time resource may be one or more symbols, or may be one or more symbol groups, or may be one or more mini-slots, or may be one or more subframes. The symbol may be a symbol with a subcarrier spacing of 15 kHz in frequency domain, or may be a symbol in a communications system with a subcarrier spacing larger than 15 kHz in frequency domain. The slot is a slot with a subcarrier spacing of 15 kHz in frequency domain, or is a slot in a communications system with a subcarrier spacing larger than 15 kHz in frequency domain, and a duration thereof may be shorter than 0.5 ms. The mini-slot is a mini-slot with a subcarrier spacing of 60 kHz in frequency domain, or is a slot in a communications system with another subcarrier spacing in frequency domain, and a duration thereof may be shorter than that of the slot. The subframe is a subframe with a subcarrier spacing of 15 kHz in frequency domain, or is a subframe in a communications system with a subcarrier spacing larger than 15 kHz in frequency domain, and a duration thereof may be shorter than 1 ms. This is not limited in the embodiments. For example, a subcarrier spacing that is larger than 15 kHz in frequency domain may be 30 kHz, 60 kHz, or 120 kHz in frequency domain. This is not limited in the embodiments.

Optionally, the mini-slot is an interval with a subcarrier spacing of 60 kHz in frequency domain and a duration of two symbols in time domain.

A meaning of the symbol is equivalent to an OFDM symbol or an SC-FDMA symbol. The symbol is an orthogonal frequency division multiple access OFDMA symbol in the LTE system with a 15 kHz subcarrier spacing, a single carrier frequency division multiple access SC-FDMA symbol, or a symbol in a communications system with a larger subcarrier spacing. This is not limited in the embodiments.

For ease of understanding, the following describes the embodiments of this application from the following aspects.

Referring to FIG. 1, an embodiment of this application is described in detail, and includes the following steps.

101. A terminal device transmits a scheduling request, where the scheduling request includes information about at least one first transport block.

In this embodiment, the terminal device transmits the scheduling request to a network device. First, the scheduling request is used to request the network device to transmit a first transport block. Second, the first transport block may be one transport block, or may be a plurality of transport blocks. The first transport block includes to-be-transmitted information in a buffer of the terminal device, or includes data information corresponding to a to-be-transmitted service. Finally, the information about the first transport block is used to indicate the first transport block. On one hand, a specific indication method may be: 1. indicating that the first transport block is a transport block whose transport block size is not greater than a first threshold, where the first threshold is a preset value, or a value corresponding to a preset transport block size, or a value corresponding to a transport block size configured by using higher layer signaling; or 2. indicating at least one of a size of the first transport block or a quantity of the first transport blocks. On the other hand, indicating at least one of a size of a transport block or a quantity of the first transport blocks, and that a size of the first transport block is a specific numeric value less than a first threshold. This is not limited herein.

It should be noted that, when the information about the first transport block indicates the first transport block, if the information about the first transport block indicates only the first threshold or the size of the transport block but does not indicate the quantity of the first transport blocks, after the network device receives the foregoing scheduling request, the quantity may be preset. For example, the quantity of the first transport blocks may be one or more by default, or may be configured by the network device by using higher layer signaling.

In addition, when the information about the at least one first transport block indicates the first transport block, the information may further indicate that the first transport block is a transport block greater than the first threshold, or indicate the size of the first transport block and that the size of the first transport block is a specific numeric value greater than the first threshold. This is not limited herein.

Optionally, before or when or after the terminal device transmits the scheduling request, and before the terminal device receives scheduling information, the terminal device may further transmit first notification information to the network device, where the first notification information is used to notify the network device that the terminal device has at least one of the following capability information: 1. the terminal device has a capability of supporting a time interval between a third time resource and a first time resource, where the first time resource is a time period of receiving the scheduling information by the terminal device, a second time resource is a time period of transmitting uplink transmission by the terminal device based on the scheduling information, and it may be understood that, a time interval between the third time resource and the first time resource may be a time interval between the scheduling information and the uplink transmission; 2. the terminal device has a capability of transmitting the at least one first transport block on the third time resource, where it may be understood that, the second time resource and the third time resource may correspond to different scheduling information or may correspond to indication information in different scheduling information, and if the terminal device has the capability of transmitting the at least one first transport block on the second time resource, the terminal device can receive the scheduling information or the indication information in the scheduling information, or else, the terminal device cannot receive the foregoing information; and 3. the terminal device has a capability of fast transmitting the at least one first transport block, where the at least one first transport block includes the size and/or the quantity of the first transport blocks. It may be understood that, the terminal device may start to perform a coding processing operation on the at least one first transport block before receiving the scheduling information. Specifically, the coding processing operation may be performed before, when, or after the scheduling request is transmitted, or may be performed at the same time as the terminal device transmits the scheduling request. This is not limited herein.

In addition, it should be further noted that, in the following embodiment, coding processing may be performed in advance on a transport block corresponding to fast transmission before the terminal device receives the scheduling information; but coding processing may not be performed in advance on a transport block corresponding to transmission, and coding processing is performed when or after the terminal device receives the scheduling request.

It should be further noted that, after the terminal device transmits the first notification information, the method further includes: the terminal device receives first configuration information transmitted by the network device, where the first configuration information is used to configure the terminal device to have at least one of the following capability information: 1. the terminal device has the capability of supporting the time interval between the third time resource and the first time resource; 2. the terminal device has the capability of transmitting the at least one first transport block on the third time resource; and 3. the terminal device has the capability of fast transmitting the at least one first transport block, where the at least one first transport block includes the size and/or the quantity of the first transport blocks. It should be noted that, the capability of fast transmitting the at least one first transport block may include the quantity of the first transport blocks that can be fast transmitted and/or the size of the first transport block that can be fast transmitted. For example, the terminal device has a capability of fast transmitting three 100-bit transport blocks, where the size of the first transport block is 100 bits, and the quantity of the first transport blocks is 3. It may be understood that, after the first notification information notifies the network device that the terminal device has at least one of the foregoing capability information, the network device enables, by using the first configuration information, the terminal device to start at least one of the at least one of the capability information; otherwise, if the first notification information notifies the network device that the terminal device does not have at least one of the foregoing capability information, because the terminal device does not have the capability, the network device does not need to transmit the first configuration information corresponding to the at least one of the capability information to enable the terminal device.

It should be further noted that, a transmission trigger condition may be further set for the terminal device to transmit the scheduling request. For example, when a size of the information in the buffer of the terminal device is greater than a second threshold, the terminal device transmits the scheduling request to the network device; or when a size of the information in the buffer of the terminal device is not greater than a second threshold, the terminal device does not transmit the scheduling request, where the second threshold is a value corresponding to a preset transport block size, or a preset value, or a value corresponding to a transport block size configured by using higher layer signaling. This is not limited herein.

It should be further noted that, the scheduling request may be an SR or an uplink control channel carrying an SR in an LTE-A system, or may be another channel carrying an SR or a signal having a scheduling request function in an NR system. For example, alternatively, the scheduling request may be an uplink data channel, an uplink control channel, or another uplink signal. The uplink data channel may be a channel carrying uplink data information, but the uplink data channel may also carry uplink control information. The uplink control channel may be a channel carrying uplink control information. The uplink signal may be a probe signal or a dedicated reference signal.

Optionally, after the terminal device transmits the scheduling request, the terminal device starts to perform corresponding coding processing based on the quantity of the first transport blocks requested in the scheduling request and the size of the first transport block to obtain the at least one first transport block. For example, if the scheduling request reports information about three transport blocks 100, after the terminal device transmits the scheduling request, the terminal device starts to encode the information in the buffer of the terminal device based on a preset coding scheme and perform coding processing in another processing manner to form three transport blocks corresponding to the three transport blocks 100. It should be noted that, coding processing includes coding and other operations related to coding. A specific operation is not limited herein. In addition, it should be noted that, the terminal device may further first start to perform coding processing on the at least one first transport block, and then transmit the scheduling request to the network device. This is not limited herein.

Figure 2:
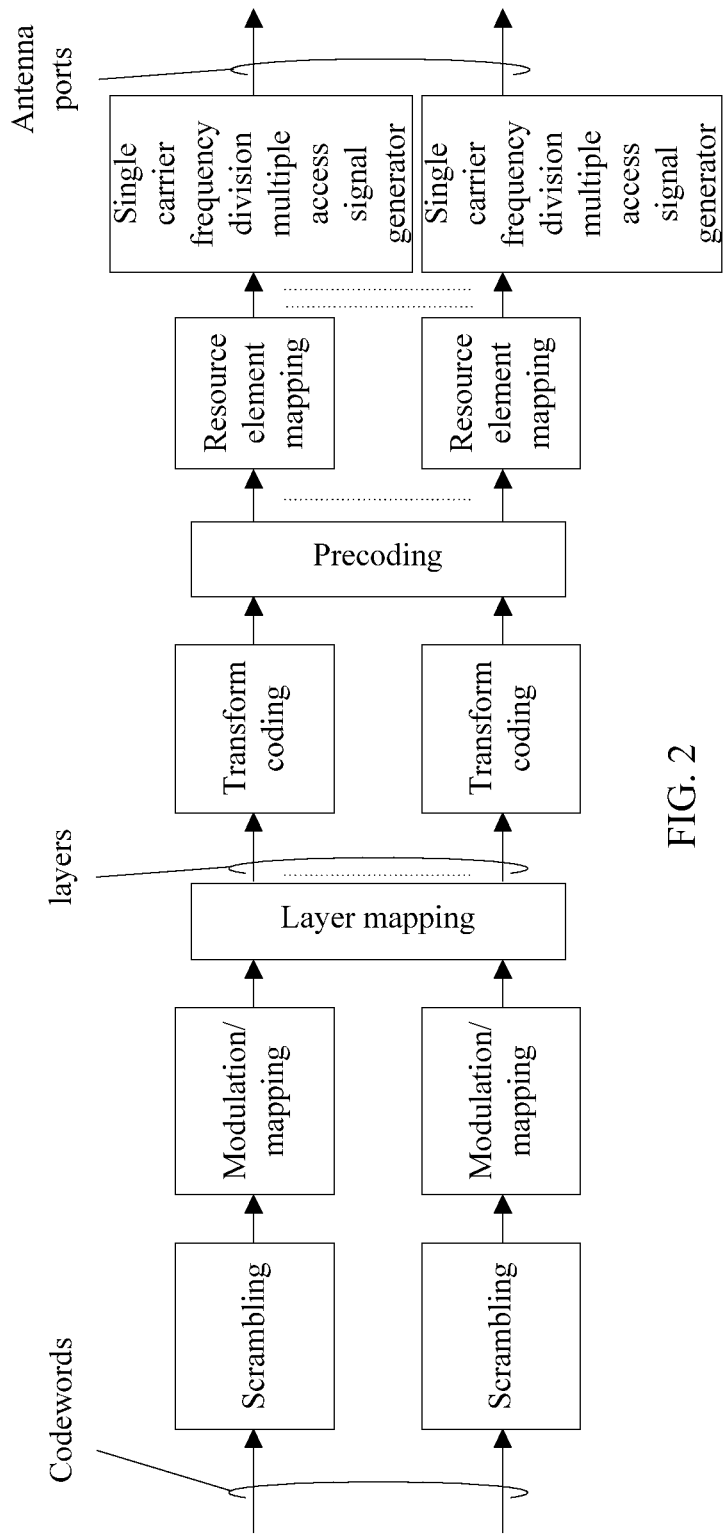
FIG. 2 is a schematic diagram of coding processing according to an embodiment of this application.

Optionally, as shown in FIG. 2, performing coding processing on the at least one first transport block by the terminal device may be encoding the at least one code block by using a preset bit rate and a Turbo Parallel Concatenated Convolutional Code (PCCC) or Low Density Parity Check Code (LDPC) or Convolutional Code (CC) or Tail Biting Convolutional Code (TBCC) coding scheme, or after encoding at least one code block by using a preset bit rate and a Turbo or PCCC or LDPC or CC or TBCC coding scheme, performing one or a combination of the following processing: scrambling, modulation, layer mapping, and precoding.

In an LTE-A system, a process of transmitting an uplink channel to a network device by a terminal device generally includes: the terminal device transmits a Scheduling Request (SR) to the network device; the network device receives the SR and generates an uplink scheduling grant, and the network device transmits the uplink scheduling grant; the terminal device receives the uplink scheduling grant and prepares information to be carried in the uplink channel; the terminal device transmits the uplink channel; and if the terminal device has not transmitted the information completely, the terminal device needs to further wait for a next scheduling grant for transmitting remaining information. The waiting time increases a transmission latency of the terminal device. Therefore, the foregoing transmission process cannot satisfy a requirement for correct short-time transmission of an Ultra-reliable and low latency communications (URLLC) service.

In this embodiment, because the scheduling request transmitted by the terminal device includes information about at least one transport block in the at least one first transport block, before receiving the scheduling information, the terminal device can start to perform coding processing on the at least one transport block in the at least one first transport block. Therefore, when the network device schedules the at least one transport block in the at least one first transmission, the terminal device can perform transmission on an earlier time resource, and fully use a time from reporting the scheduling request to receiving the scheduling information by the terminal device. Therefore, this embodiment of this application effectively reduces a data transmission latency of the terminal device.

102. The terminal device receives scheduling information on a first time resource.

In this embodiment, after the terminal device transmits the scheduling request, the network device makes a corresponding scheduling request response and transmits the corresponding scheduling request response message such as the scheduling information to the terminal device; and the terminal device receives the scheduling request response message such as the scheduling information on the first time resource. The scheduling information may be information indicating scheduling, or may be indication information indicating non-scheduling. This is not limited herein. The information indicating scheduling is used to instruct the terminal device to receive downlink information, or trigger the terminal device to transmit uplink information, or trigger retransmission. The information indicating scheduling includes one or more of resource allocation information, modulation and coding scheme information, HARQ process number information, and the like.

In addition, it should be further noted that, after the network device receives the scheduling request, first, the network device decodes the scheduling request to determine the information about the at least one first transport block that is included in the scheduling request; and then the network device determines information about a second transport block based on the information about the at least one first transport block in the scheduling request and based on a current occupation status of the system, or a priority of a user, or a priority of the service, or other influential factors such as a latency requirement of the service.

Optionally, before or when or after the network device receives the scheduling request, and before the terminal device receives the scheduling information, if the network device further receives the first notification information transmitted by the terminal device, the network device determines the information about the second transport block based on the information about the at least one first transport block in the scheduling request, the first notification information transmitted by the terminal device, and the current occupation status of the system, or the priority of the user, or the priority of the service, or the other influential factors such as the latency requirement of the service.

After the network device determines the information about the second transport block, the network device adds the information about the second transport block to the scheduling information, and transmits the scheduling information on the first time resource to the terminal device.

In addition, a manner of adding the information about the second transport block to the scheduling information may be as follows.

I. Set a modulation and coding scheme information field in the scheduling information, and use some bits or a bit status of the modulation and coding scheme information field to indicate the information about the second transport block. It may be understood that, alternatively some bits herein may be all bits.

Optionally, some bits of the modulation and coding scheme information field are used to indicate the information about the second transport block. Specifically, for example, assuming that the modulation and coding scheme information field is five bits, and that a mode information field or a time information field, for example, one bit, indicates the second transport block, when a bit status of the mode information field or the time information field is 0, it indicates that the second transport block is at least one transport block in the at least one first transport block; or when a bit status of the mode information field or the time information field is 1, it indicates that the second transport block is at least one transport block other than the at least one first transport block, or vice versa. If the quantity of the first transport blocks in the at least one first transmission is less than or equal to 8, and it is indicated that the second transport block is at least one transport block in the at least one first transport block, two bits of the modulation and coding scheme information field indicate modulation information of the second transport block, and three bits of the modulation and coding scheme information field indicate size information of the second transport block. Herein a quantity of bits of the modulation and coding scheme and the size information of the second transport block indicated by some bits are not limited. In addition, assuming that the modulation and coding scheme information field is three bits, if the quantity of the first transport blocks in the at least one first transmission is less than or equal to 4, and it is indicated that the second transport block is at least one transport block in the at least one first transport block, one bit of the modulation and coding scheme information field indicates modulation information of the second transport block, and two bits of the modulation and coding scheme information field indicate size information of the second transport block. If it is indicated that the second transport block is at least one transport block other than the at least one first transport block, information about the second transport block is indicated by using a modulation and coding scheme and the resource allocation information in the scheduling information. Specifically, the information about the second transport block may be indicated by using the modulation and coding scheme, frequency domain information in the resource allocation information, and a prestored correspondence table, where the prestored correspondence table is a table of a correspondence between the modulation and coding scheme, the frequency domain information in the resource allocation information, and the transport block size.

Optionally, the information about the second transport block is indicated by using the bit status of the modulation and coding scheme information field. Specifically, for example, assuming that the modulation and coding scheme information field is five bits, when the bit status is 10000 to 10111, it indicates that the second transport block is at least one transport block in the at least one first transport block; or when the bit status is another value, it indicates a modulation and coding scheme of the second transport block. In this case, the information about the second transport block is indicated by using the modulation and coding scheme and the resource allocation information in the scheduling information. Specifically, the information about the second transport block may be indicated by using the modulation and coding scheme, the frequency domain information in the resource allocation information, and the prestored correspondence table, where the prestored correspondence table is the table of the correspondence between the modulation and coding scheme, the frequency domain information in the resource allocation information, and the transport block size. It should be noted that, the bit status values 10000 to 10111 and a size of the modulation and coding scheme information field are not limited in this embodiment.

Further, the quantity of the transport blocks is indicated by using other bits a bit status of the modulation and coding scheme information field, or the quantity of the transport blocks is preset or is configured by the network device by using higher layer signaling or is configured by the network device by using higher layer signaling in a correspondence to the transport block size. In addition, for an indication manner of some bits or the bit status of the modulation and coding scheme information field, there are other indication methods. The foregoing example is only an optional indication manner. Alternatively, all or some bits of another information field or a bit status of another information field may be used to indicate information about a transport block. Other optional indication manners are not limited herein.

II. Indicate the information about the second transport block by using the modulation and coding scheme and the resource allocation information in the scheduling information, where a specific indication manner is the same as the indication manner described above, and is not described again herein.

III. Indicate the information about the second transport block based on bits in a first indication information field, where the first indication information field is preset in the scheduling information. Assuming that the first indication information field is two bits, when a bit status of the first indication information field is 00, it indicates that the second transport block is a transport block A in the at least one first transport block; when the bits of the first indication information field are 01, it indicates that the second transport block is a transport block B in the at least one first transport block; when the bits of the first indication information field are 11, it indicates that the second transport block is a transport block C in the at least one first transport block; or when the bits of the first indication information field are 10, it indicates that the second transport block is a transport block D other than the at least one first transport block. Herein the transport blocks A, B, C, and D may be preset, or may be configured by the network device by using higher layer signaling. A specific indication manner is not limited herein.

It should be noted that, the at least one transport block other than the at least one first transport block is at least one of transport blocks other than all the first transport blocks. For example, when the first transport blocks are transport blocks whose sizes are 100 bits, 256 bits, and 1024 bits, the at least one transport block other than the at least one first transport block is one or more transport blocks whose bit sizes are not 100 bits, 256 bits, and 1024 bits.

In addition to the three methods for indicating the second transport block, other indication methods may be available. The other indication methods are not limited, provided that a technical effect same as that of the three indication methods can be achieved.

Optionally, after the terminal device receives the scheduling information on the first time resource, the terminal device first decodes the scheduling information, and then determines the second transport block based on the information in the scheduling information.

A specific determining process of determining the second transport block by the terminal device from the scheduling information may be as follows.

I. The scheduling information includes the preset modulation and coding scheme information field. The terminal device reads some bits or the bit status of the modulation and coding scheme information field from the scheduling information, and therefore determines the second transport block according to a corresponding correspondence rule. It may be understood that, alternatively some bits herein may be all bits.

Optionally, the terminal device determines the second transport block by obtaining some bits of the modulation and coding scheme information field. Assuming that the modulation and coding scheme information field is five bits, and that a mode information field or a time information field, for example, one bit, indicates the second transport block, when a bit status of the mode information field or the time information field is 1, the terminal device determines that the second transport block is at least one transport block in the at least one first transport block; or when a bit status of the mode information field or the time information field is 0, the terminal device determines that the second transport block is at least one transport block other than the at least one first transport block, or vice versa. If the quantity of the first transport blocks in the at least one first transmission is less than or equal to 8, and the second transport block is at least one transport block in the at least one first transport block, the terminal device determines modulation information of the second transport block based on two bits of the modulation and coding scheme information field, and determines size information of the second transport block based on three bits of the modulation and coding scheme information field. Herein the quantity of bits of the modulation and coding scheme and the size information of the second transport block indicated by some bits are not limited. In addition, assuming that the modulation and coding scheme information field is three bits, if the quantity of the first transport blocks in the at least one first transmission is less than or equal to 4, and the second transport block is at least one transport block in the at least one first transport block, the terminal device determines modulation information of the second transport block based on one bit of the modulation and coding scheme information field, and determines size information of the second transport block based on two bits of the modulation and coding scheme information field. If the second transport block is at least one transport block other than the at least one first transport block, the terminal device determines the information about the second transport block based on the modulation and coding scheme and the resource allocation information in the scheduling information. Specifically, the terminal device may determine the information about the second transport block based on the modulation and coding scheme, the frequency domain information in the resource allocation information, and the prestored correspondence table, where the prestored correspondence table is the table of the correspondence between the modulation and coding scheme, the frequency domain information in the resource allocation information, and the transport block size.

Optionally, the terminal device determines the information about the second transport block based on the bit status of the modulation and coding scheme information field. Specifically, for example, assuming that the modulation and coding scheme information field is five bits, when the bit status is 10000 to 10111, the terminal device determines that the second transport block is at least one transport block in the at least one first transport block; or when the bit status is another value, the terminal device determines the modulation and coding scheme of the second transport block. In this case, the terminal device determines, based on the modulation and coding scheme and the resource allocation information in the scheduling information, information indicating the second transport block. Specifically, the information about the second transport block may be determined based on the modulation and coding scheme, the frequency domain information in the resource allocation information, and the prestored correspondence table, where the prestored correspondence table is the table of the correspondence between the modulation and coding scheme, the frequency domain information in the resource allocation information, and the transport block size. It should be noted that, the bit status values 10000 to 10111 and the size of the modulation and coding scheme information field are not limited in this embodiment.

II. The scheduling information includes the modulation and coding scheme and the resource allocation information. The second transport block is determined based on the modulation and coding scheme and the resource allocation information. Specifically, the information about the second transport block may be determined based on the modulation and coding scheme, the frequency domain information in the resource allocation information, and the prestored correspondence table, where the prestored correspondence table is the table of the correspondence between the modulation and coding scheme, the frequency domain information in the resource allocation information, and the transport block size. Then whether the second transport block matches at least one transport block in the at least one first transport block is determined. A matching process may be specifically: if a difference between a size of the second transport block and a size of any transport block in the at least one first transport block is less than or equal to a third threshold, determining that the matching succeeds, or else, determining that the matching fails. Herein the third threshold may be a preset value, or a value corresponding to a preset transport block size, or a value corresponding to a transport block size configured by the network device by using higher layer signaling. If the matching succeeds, it is determined that the second transport block is at least one transport block in the first transport blocks; if there are a plurality of second transport blocks, it is determined that the second transport blocks are a plurality of transport blocks in the first transport blocks; if there is only one second transport block, it is determined that the second transport block is a transport block in the first transport blocks; or if the second transport block matches a plurality of first transport blocks, it is determined that the second transport block is a first transport block with a smallest absolute difference. For example, if the first transport blocks are 250 bits and 280 bits, and the second transport block is 260 bits, and the third threshold is 50 bits, it is determined that the second transport block is 280 bits. If the matching fails, it is determined that the second transport block is at least one transport block other than the first transport block, and the second transport block is directly determined. For example, if the first transport blocks are 250 bits and 280 bits, and the second transport block is 500 bits, and the third threshold is 50 bits, the matching fails, and it is determined that the second transport block is 280 bits.

Optionally, if |the second transport block divided by any one of the at least one first transport block| is less than x, it is considered that the matching succeeds, where || is a modulo operation; or if |the second transport block divided by any one of the at least one first transport block| is greater than x, it is considered that the matching fails, where x is a positive rational number not greater than 2, and || is a modulo operation.

It should be noted that, the method for determining the second transport block is not unique, and other determining methods may also be available. This is not limited herein.

III. The scheduling information includes first indication information. The first indication information is used to indicate a scheduling mode or a target time resource. The determining method is as follows:

When the first indication information indicates the scheduling mode, if the indicated scheduling mode is a first mode, the terminal device determines that the second transport block is at least one transport block in the at least one first transport block. Then on one hand, if the quantity of the at least one first transport block is at least two, the terminal device determines, based on second indication information in the scheduling information, that the second transport block is one or more transport blocks in the at least one first transport block. Whether the second transport block is one or more transport blocks may depend on the preset second indication information. For example, if the quantity of the at least one first transport block is 2, a second indication information field includes at least one bit; or if the quantity of the at least one first transport block is 4, a second indication information field includes at least two bits. On the other hand, if the quantity of the at least one first transport block is one, the terminal device determines that the second transport block is a transport block in the at least one first transport block. It should be noted that, the first mode may be a fast mode. If the indicated scheduling mode is a second mode, the terminal device determines that the second transport block is at least one transport block other than the at least one first transport block. The terminal device may determine the second transport block based on the modulation and coding scheme and the resource allocation information or the second indication information field. Details are not described again herein. The second mode is a normal mode. It should be noted that, the fast mode indicates that a time from receiving the scheduling information to transmitting the uplink transmission corresponding to the scheduling information by the terminal device is relatively short; and the normal mode indicates that the time from receiving the scheduling information to transmitting the uplink transmission corresponding to the scheduling information by the terminal device is relatively long. For example, the fast mode is that the terminal device receives the scheduling information on a time resource n, and transmits, on a time resource n+k, the uplink transmission corresponding to the scheduling information; and the normal mode is that the terminal device receives the scheduling information on the time resource n, and transmits, on a time resource n+1, the uplink transmission corresponding to the scheduling information, where k≥0, and k and n are non-negative integers.

When the first indication information indicates the target time resource, if the indicated target time resource is the third time resource, the terminal device determines that the second transport block is at least one transport block in the at least one first transport block; and then the terminal device determines a quantity of the second transport blocks based on a preset quantity of third time resources or a quantity of third time resources indicated in the scheduling information, where the quantity of the second transport blocks is the same as the quantity of the third time resources. If the indicated target time resource is the second time resource, the terminal device determines that the second transport block is at least one transport block other than the at least one first transport block; and then the terminal device determines the quantity of the second transport blocks based on a preset quantity of second time resources or a quantity of third time resources indicated in the scheduling information, where the quantity of the second transport blocks is the same as the quantity of the second time resources, the third time resource corresponds to the first mode, and the second time resource corresponds to the second mode. It should be noted that, the first mode may be the fast mode, and the second mode is the normal mode. Details are the same as those in the foregoing manner, and are not described again herein.

The third time resource is earlier than the second time resource in time. To be specific, the third time resource is a $y^{th}$ symbol or slot or mini-slot before the second time resource. Durations of the second time resource and the third time resource may be the same or may be different.

It should be noted that, in addition to the foregoing three methods for determining the second transport block based on the scheduling information, other methods may be available. This is not limited herein.

103. The terminal device determines a target time resource based on the scheduling information.

In this embodiment, the target time resource includes the first time resource and the second time resource, and a time interval between the second time resource and the first time resource is greater than the time interval between the third time resource and the first time resource. For example, the first time resource is a time resource d, the second time resource is a time resource d+e, and the third time resource is a time resource d+j, where e>j≥0, and j, d, and e are non-negative integers.

In this embodiment, after the terminal device determines the second transport block, the terminal device determines the target time resource based on the second transport block. A specific correspondence is: if the difference between the size of the second transport block and the size of any transport block in the at least one first transport block is less than or equal to the third threshold, the terminal device determines that the second transport block matches at least one transport block in the at least one first transport block; otherwise, the terminal device determines that the second transport block does not match at least one transport block in the at least one first transport block; and if the matching succeeds, the terminal device determines that the third time resource is the target time resource; or if the matching fails, the terminal device determines that the second time resource is the target time resource. It may be understood that, the third time resource is earlier than the second time resource. Therefore, a time resource whose duration can be supported by the terminal device is preferentially selected as the third time resource.

Further, when the terminal device determines that the second transport block matches at least one transport block in the at least one first transport block, and the second transport block matches a plurality of first transport blocks, the terminal device may determine a plurality of third time resources based on the quantity of the second transport blocks.

104. The terminal device transmits a second transport block on the target time resource.

In this embodiment, after the terminal device determines the second transport block and the target time resource based on the scheduling information, the terminal device transmits, to the network device, the second transport block on the target time resource indicated in the scheduling information. A specific transmission process is as follows: The terminal device transmits at least one transport block in the at least one first transport block on the third time resource to the network device; or the terminal device transmits at least one transport block other than the at least one first transport block on the second time resource to the network device.

In this embodiment, because the scheduling request transmitted by the terminal device includes information about at least one transport block in the at least one first transport block, the network device can flexibly indicate, based on the scheduling request transmitted by the terminal device and by comprehensively considering network resource usage and using the scheduling information, the time resource on which the terminal device may transmit the uplink transmission, and/or the size of the transport block, and/or the quantity of the transport blocks. Therefore, flexibility of scheduling the terminal device by the network device is effectively improved in this embodiment of this application.

Figure 3:
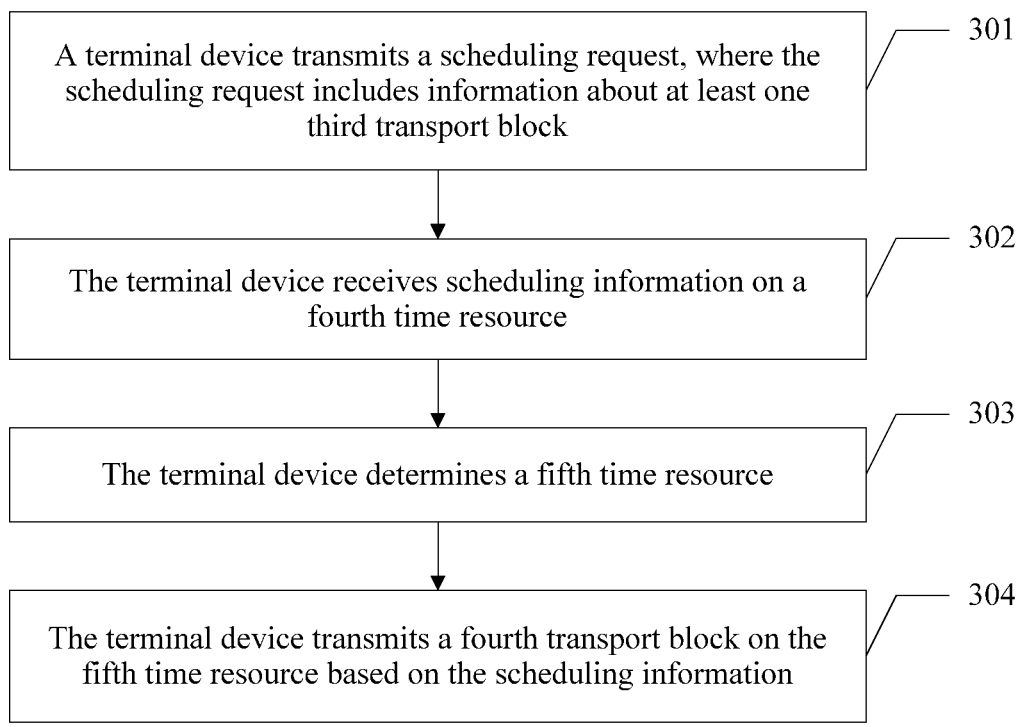
FIG. 3 is a schematic diagram of another embodiment of a data transmission method according to an embodiment of this application.

Referring to FIG. 3, an embodiment of this application is described in detail, and includes the following steps.

301. A terminal device transmits a scheduling request, where the scheduling request includes information about at least one third transport block.

In this embodiment, the terminal device transmits the scheduling request to a network device, where the scheduling request includes the information about the at least one third transport block, and the information about the at least one third transport block is used to indicate the at least one third transport block whose transport block size is greater than or equal to a first threshold, or used to indicate at least one of a size or a quantity of the at least one third transport block. In other words, the information about the at least one third transport block indicates one or more third transport blocks, and that sizes of the transport blocks are all greater than or equal to the first threshold, where the first threshold is a specific numeric value of a transport block size, or the first threshold may be a value corresponding to a preset transport block size, or a preset value, or a value corresponding to a transport block size configured by the network device by using higher layer signaling. The third transport block includes to-be-transmitted information in a buffer of the terminal device, or includes data corresponding to a to-be-transmitted service.

It should be noted that, a quantity of transport blocks indicated by the information about the at least one third transport block may be preset. For example, the quantity of the third transport blocks is one or more by default, or may be configured by the network device by using higher layer signaling. This is not limited herein.

Optionally, the information about the at least one third transport block may further indicate that the first transport block is a transport block whose size is less than the first threshold, or indicate the size and/or the quantity of the first transport blocks. This is not limited herein.

Optionally, before or when or after the terminal device transmits the scheduling request, and before the terminal device receives scheduling information, the terminal device may further transmit second notification information to the network device, where the second notification information is used to notify the network device that the terminal device has at least one of the following capability information: 1. the terminal device has a capability of supporting a time interval between a fifth time resource and a fourth time resource, where the fourth time resource is a time period of receiving the scheduling information by the terminal device, the fifth time resource is a time period of transmitting uplink transmission by the terminal device based on the scheduling information, and it may be understood that, a time interval between the fifth time resource and the fourth time resource is a time interval between the scheduling information and the uplink transmission; 2. the terminal device has a capability of transmitting the at least one third transport block on the second time resource, and it may be understood that, the fifth time resource and a sixth time resource correspond to different scheduling information, or may correspond to indication information in different scheduling information, and if the terminal device has the capability of transmitting the at least one third transport block on the fifth time resource, the terminal device can receive the scheduling information or the indication information in the scheduling information, or else, the terminal device cannot receive the foregoing information; and 3. the terminal device has a capability of transmitting the at least one third transport block, where the at least one third transport block includes the size and/or the quantity of the first transport blocks. It should be noted that, the capability of transmitting the at least one third transport block may include the quantity of the third transport blocks and/or the size of the third transport block that can be transmitted. For example, the terminal device has a capability of fast transmitting three 100-bit transport blocks, where the size of the third transport block is 100 bits, and the quantity of the third transport blocks is 3. It may be understood that, before receiving the scheduling information, the terminal device may start to perform a coding processing operation on the at least one third transport block. Specifically, the coding processing operation may be performed before, when, or after the scheduling request is transmitted, or may be performed at the same time as the terminal device transmits the scheduling request. This is not limited herein.

It should be further noted that, after the terminal device transmits the second notification information, the method further includes: the terminal device receives second configuration information transmitted by the network device, where the second configuration information is used to configure the terminal device to have at least one of the following capability information: 1. the terminal device has the capability of supporting the time interval between the fifth time resource and the fourth time resource; 2. the terminal device has the capability of transmitting the at least one third transport block on the fifth time resource; and 3. the terminal device has the capability of transmitting the at least one third transport block, where the at least one third transport block includes the size and/or the quantity of the third transport blocks. It may be understood that, after the second notification information notifies the network device that the terminal device has at least one of the foregoing capability information, the network device enables, by using the second configuration information, the terminal device to start at least one of the at least one of the capability information; otherwise, if the second notification information notifies the network device that the terminal device does not have at least one of the foregoing capability information, because the terminal device does not have the capability, the network device does not need to transmit the second configuration information corresponding to the at least one of the capability information to enable the terminal device.

It should be further noted that, a transmission trigger condition may be further set for the terminal device to transmit the scheduling request. For example, when a size of the information in the buffer of the terminal device is greater than a second threshold, the terminal device transmits the scheduling request to the network device; or when a size of the information in the buffer of the terminal device is not greater than a second threshold, the terminal device does not transmit the scheduling request, where the second threshold may be a value corresponding to a preset transport block size, or a preset value, or a value corresponding to a transport block size configured by the network device by using higher layer signaling. This is not limited herein.

It should be further noted that, the scheduling request may be an SR in an LTE-A system, or may be another channel in a 5th generation communications system. For example, alternatively, the scheduling request may be an uplink data channel, an uplink control channel, or another uplink signal. The uplink data channel may be a channel carrying uplink data information, but the uplink data channel may also carry uplink control information. The uplink control channel may be a channel carrying uplink control information. The uplink signal may be a probe signal or a dedicated reference signal.

Optionally, after the terminal device transmits the scheduling request, the terminal device starts to perform corresponding coding processing based on the quantity of the third transport blocks requested in the scheduling request and the size of the third transport block to obtain the at least one third transport block. For example, if the scheduling request reports three transport blocks 100, after the terminal device transmits the scheduling request, the terminal device starts to encode the information in the buffer of the terminal device based on a preset coding scheme and perform coding processing in another processing manner to form three transport blocks corresponding to the three transport blocks 100. It should be noted that, coding processing includes coding and other operations related to coding. A specific operation is not limited herein.

Optionally, as shown in FIG. 2, performing coding processing on the at least one first transport block by the terminal device may be encoding at least one code block by using a preset bit rate and a Turbo or PCCC or LDPC or CC or TBCC coding scheme, or after encoding at least one code block by using a preset bit rate and a Turbo or PCCC or LDPC or CC or TBCC coding scheme, performing one or a combination of the following processing: scrambling, modulation, layer mapping, and precoding.

302. The terminal device receives scheduling information on a fourth time resource.

In this embodiment, after the terminal device transmits the scheduling request, the network device makes a corresponding scheduling request response and transmits the corresponding scheduling request response message such as the scheduling information to the terminal device; and the terminal device receives the scheduling request response message such as the scheduling information on the first time resource.

In this embodiment, after the terminal device receives the scheduling request, the network device first decodes the scheduling request to obtain the information about the at least one third transport block from the decoded scheduling request; and then when the network device learns that the information about the at least one third transport block is used to indicate the transport block whose transport block size is greater than or equal to the first threshold, because a coding processing time is relatively long due to the relatively large transport block size of the third transport block, when there are sufficient time resources, the network device determines a fourth transport block as at least one transport block in the at least one third transport block reported in the scheduling information.

Optionally, before the network device receives the scheduling request, if the network device further receives the capability information reported by the terminal device, the network device determines, based on the information about the at least one first transport block in the scheduling request, the capability information reported by the terminal device, and a current occupation status of the system, or a priority of a user, or a priority of the service, or other influential factors such as a latency requirement of the service, that the fourth transport block is at least one transport block in the at least one third transport block.

Then after performing corresponding coding processing on information about the fourth transport block, the network device adds the information about the fourth transport block to the scheduling information, and transmits the scheduling information on the fourth time resource to the terminal device.

The method for adding the information about the fourth transport block to the scheduling information after performing coding processing on the information about the fourth transport block in step 302 is similar to the manner of adding the information about the second transport block to the scheduling information in step 102, and is not described again herein.

Finally it should be noted that, it is impossible that the fourth transport block determined by the network device in this step is another transport block other than the at least one third transport block.

Optionally, after the terminal device receives the scheduling information on the fourth time resource, the terminal device decodes the scheduling information to obtain the information about the fourth transport block in the scheduling information, and therefore determines that the fourth transport block is at least one transport block in the at least one third transport block.

The process of determining the fourth transport block from the scheduling information in this step is similar to the process of determining the second transport block from the scheduling information in step 102, and is not described again herein.

303. The terminal device determines that a target time resource is a fifth time resource.

In this embodiment, the target time resource includes the fifth time resource and the sixth time resource, and the time interval between the fifth time resource and the fourth time resource is greater than a time interval between the sixth time resource and the fourth time resource. For example, the fourth time resource is a time resource a, the fifth time resource is a time resource a+b, and the sixth time resource is a time resource a+c, where b>c≥0, and c, a, and b are non-negative integers.

The sixth time resource is earlier than the fifth time resource in time. To be specific, the sixth time resource is a $y^{th}$ symbol or slot or mini-slot before the fifth time resource. Durations of the fifth time resource and the sixth time resource may be the same or may be different.

In this embodiment, when the terminal device determines, based on the scheduling information, that the fourth transport block is at least one transport block in the at least one third transport block, the terminal device determines that the target time resource is the fifth time resource. It may be understood that, the terminal device uses the fifth time resource as the target time resource after selecting the target time resource.

In addition, the target time resource includes the fifth time resource and the sixth time resource, and the time interval between the fifth time resource and the fourth time resource is greater than the time interval between the sixth time resource and the fourth time resource. It should be noted that, because the information about the third transport block that is reported in the scheduling request indicates the transport block whose transport block size is relatively large, if the network device grants the scheduling request of the terminal device, the terminal device can only transmit the fourth transport block by using the fifth time resource, because a size of the fourth transport block is greater than or equal to the first threshold. Therefore, in the time interval between the sixth time resource and the fourth time resource, the terminal device cannot complete a coding processing operation on the fourth transport block, and cannot transmit the fourth transport block on the sixth time resource.

304. The terminal device transmits a fourth transport block on the fifth time resource.

In this embodiment, after the terminal device determines the fourth transport block based on the scheduling information, and determines that the target time resource is the fifth time resource, the terminal device transmits the fourth transport block on the fifth time resource to the network device.

In this embodiment, because the scheduling request transmitted by the terminal device includes information about at least one transport block in the at least one third transport block, the network device can flexibly indicate, based on the scheduling request transmitted by the terminal device and by comprehensively considering network resource usage and using the scheduling information, the time resource on which the terminal device may transmit the uplink transmission, and/or the size of the transport block, and/or the quantity of the transport blocks. The terminal device cannot transmit the corresponding transport block on the sixth time resource due to the size of the transport block transmitted by the terminal device, and therefore the network device can schedule only the fifth time resource for transmission. However, because the network device performs selection based on the transport block size, the network device can still schedule the terminal device flexibly. Therefore, flexibility of scheduling the terminal device by the network device is effectively improved in this embodiment of this application.

Figure 4:
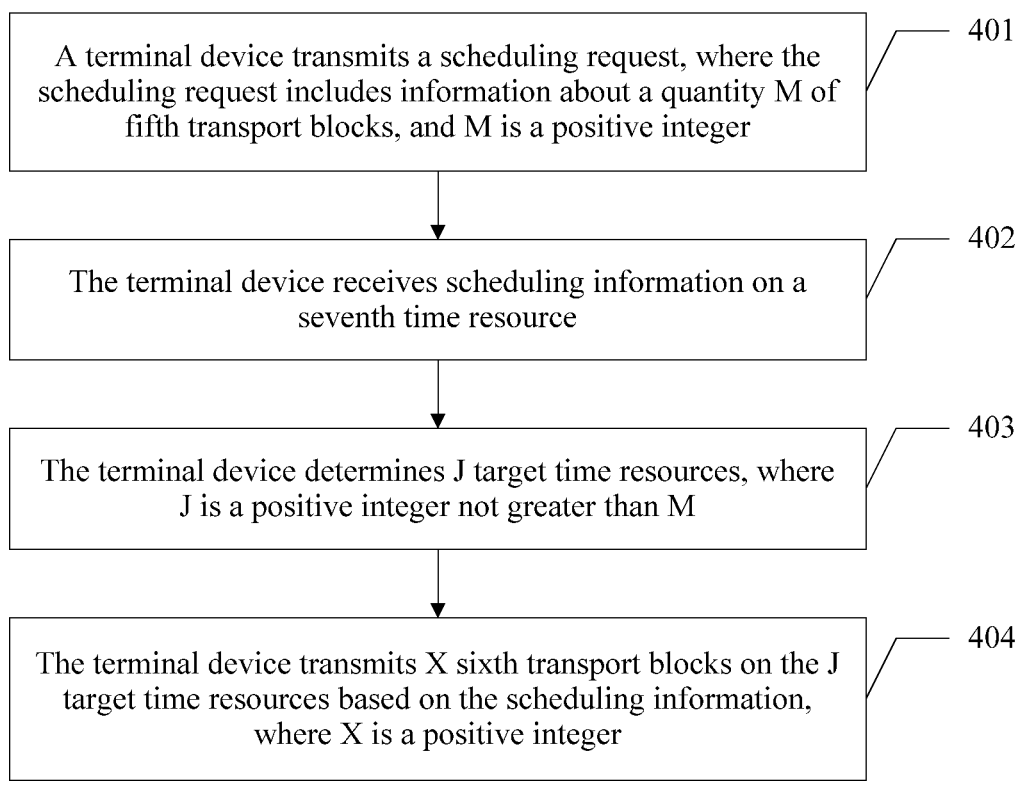
FIG. 4 is a schematic diagram of another embodiment of a data transmission method according to an embodiment of this application.

Referring to FIG. 4, an embodiment of this application is described in detail, and includes the following steps.

401. A terminal device transmits a scheduling request, where the scheduling request includes information about a quantity M of fifth transport blocks, and M is a positive integer.

In this embodiment, the terminal device transmits the scheduling request, where the scheduling request is used by the terminal device to request an uplink time resource from a network device and transmit to-be-transmitted information in a buffer of the terminal device or data information corresponding to a to-be-transmitted service, the scheduling information includes the information about the quantity M of the fifth transport blocks, M is a positive integer not less than 1, and the M fifth transport blocks may be a same transmission or different transmissions; and the terminal device encodes the information about the quantity M of the fifth transport blocks in the scheduling request.

It should be further noted that, the scheduling request may be an SR in an LTE-A system, or may be another channel in a 5th generation communications system. For example, alternatively, the scheduling request may be an uplink data channel, an uplink control channel, or another uplink signal. The uplink data channel may be a channel carrying uplink data information, but the uplink data channel may also carry uplink control information. The uplink control channel may be a channel carrying uplink control information. The uplink signal may be a probe signal or a dedicated reference signal.

In addition, the scheduling request may further include information about a quantity N of time resources, where N is a positive integer not less than 1, and the N time resources are used to transmit the M fifth transport blocks. This is not limited herein.

Before or when or after the terminal device transmits the scheduling request, and before the terminal device receives scheduling information, the terminal device may further transmit third notification information to the network device, where the third notification information is used to notify the network device that the terminal device has a capability of supporting the quantity M of the fifth transport blocks, and/or has a capability of fast transmitting at least one fifth transport block. It should be noted that, the capability of fast transmitting the at least one fifth transport block may include the quantity of the fifth transport blocks that can be fast transmitted and/or the size of the fifth transport block that can be fast transmitted. For example, the terminal device has a capability of fast transmitting three 100-bit transport blocks, where the size of the fifth transport block is 100 bits, and the quantity of the fifth transport blocks is 3.

It should be further noted that, a transmission trigger condition may be further set for the terminal device to transmit the scheduling request. For example, when a size of the information in the buffer of the terminal device is greater than a second threshold, the terminal device transmits the scheduling request to the network device; or when a size of the information in the buffer of the terminal device is not greater than a second threshold, the terminal device does not transmit the scheduling request, where the second threshold may be a value corresponding to a preset transport block size, or a preset value, or a value corresponding to a transport block size configured by the network device by using higher layer signaling. This is not limited herein.

Optionally, before the terminal device receives the scheduling information, the terminal device starts to perform coding processing on the M fifth transport blocks in the scheduling request, so that when a transport block of the terminal device scheduled by the network device by using the scheduling information is at least one of the M fifth transport blocks, a time from receiving the scheduling information to transmitting the uplink transport block corresponding to the scheduling information is shortened.

Optionally, as shown in FIG. 2, performing coding processing on the M fifth transport blocks by the terminal device may be encoding at least one code block by using a preset bit rate and a Turbo or PCCC or LDPC or CC or TBCC coding scheme, or after encoding at least one code block by using a preset bit rate and a Turbo or PCCC or LDPC or CC or TBCC coding scheme, performing at least one or a combination of the following processing: scrambling, modulation, layer mapping, and precoding.

In addition, the terminal device may further start to perform coding processing on the M fifth transport blocks in the scheduling request before the terminal device transmits the scheduling request, or after the terminal device transmits the scheduling request, or when the terminal device transmits the scheduling request. This is not limited herein.

402. The terminal device receives scheduling information on a seventh time resource.

In this embodiment, after the network device receives the scheduling request, the network device decodes the scheduling request to obtain the information about the quantity M of the fifth transport blocks, and then the network device determines a sixth transport block based on the information about the quantity M of the fifth transport blocks, and a current occupation status of the system, or a priority of a user, or a priority of the service, or other influential factors such as a latency requirement of the service, where the sixth transport block may be a fifth transport block or at least one transport block other than a fifth transport block.

In addition, if the terminal device reports the third notification information before the network device transmits the scheduling information, the network device may determine the sixth transport block by comprehensively considering the capability of the terminal device that is included in the third notification information. This is not limited herein.

The third notification information is used to notify the network device that the terminal device has at least one of the following capability information: 1. the terminal device has the capability of supporting the quantity M of the fifth transport blocks, where it may be understood that, the terminal device can support transmission of the M fifth transport blocks; and 2. the terminal device has the capability of fast transmitting the at least one fifth transport block, where the at least one fifth transport block includes a size and/or a quantity of the fifth transport blocks. It may be understood that, the terminal device may start to perform a coding processing operation on the at least one fifth transport block before receiving the scheduling information. The quantity of the fifth transport blocks is the quantity of the fifth transport blocks that the terminal device can fast transmit, and the size of the fifth transport block is the size of the fifth transport block that the terminal device can fast transmit. Specifically, the coding processing operation may be performed before, when, or after the scheduling request is transmitted, or may be performed at the same time as the terminal device transmits the scheduling request. This is not limited herein.

It should be further noted that, after the terminal device transmits the third notification information, the method further includes: the terminal device receives third configuration information transmitted by the network device, where the third configuration information is used to configure the terminal device to have at least one of the following capability information: 1. the terminal device has the capability of supporting the quantity M of the fifth transport blocks; and 2. the terminal device has the capability of fast transmitting the at least one fifth transport block, where the at least one fifth transport block includes the size and/or the quantity of the fifth transport blocks. It should be noted that, the capability of fast transmitting the at least one fifth transport block may include the quantity of the fifth transport blocks and/or the size of the fifth transport block that can be transmitted. For example, the terminal device has a capability of fast transmitting three 100-bit transport blocks, where the size of the fifth transport block is 100 bits, and the quantity of the fifth transport blocks is 3. It may be understood that, after the third notification information notifies the network device that the terminal device has at least one of the foregoing capability information, the network device enables, by using the third configuration information, the terminal device to start at least one of the at least one of the capability information; otherwise, if the third notification information notifies the network device that the terminal device does not have at least one of the foregoing capability information, because the terminal device does not have the capability, the network device does not need to transmit the third configuration information corresponding to the at least one of the capability information to enable the terminal device.

After the terminal device determines the sixth transport block, the terminal device transmits the scheduling information for scheduling the sixth transport block to the terminal device. The manner of adding the sixth transport block and information about a quantity thereof to the scheduling information is similar to the manner of adding the information about the second transport block to the scheduling information in step 102, and therefore is not described again herein.

It should be further noted that, the scheduling request may be an SR in the LTE-A system, or may be another channel in the 5th generation communications system. For example, alternatively, the scheduling request may be an uplink data channel, an uplink control channel, or another uplink signal. The uplink data channel may be a channel carrying uplink data information, but the uplink data channel may also carry uplink control information. The uplink control channel may be a channel carrying uplink control information. The uplink signal may be a probe signal or a dedicated reference signal.

403. The terminal device determines J target time resources, where J is a positive integer not greater than M.

In this embodiment, after the terminal device receives the scheduling information, the terminal device decodes the scheduling information to obtain the information about the sixth transport block, and therefore determines that the sixth transport block is a fifth transport block or at least one transport block other than a fifth transport block. The method for determining the sixth transport block in this step is similar to the method for determining the second transport block in step 103, and is not described again herein.

After the terminal device determines the sixth transport block, the terminal device determines a corresponding target time resource based on the sixth transport block, where the target time resource includes an eighth time resource and a ninth time resource; and when the terminal device determines that the sixth transport block is a fifth transport block, the terminal device determines that the target time resource is the eighth time resource; or when the terminal device determines that the sixth transport block is a transport block other than a fifth transport block, the terminal device determines that the target time resource is the ninth time resource. In addition, the terminal device determines the quantity J of the target time resources based on the scheduling information, where the quantity J of the target time resources corresponds to the quantity of the sixth transport blocks. The J target time resources are sufficient for transmitting the scheduled sixth transport blocks. It may be understood that, the quantity of the sixth transport blocks may be greater than or equal to J. Finally the terminal device determines the J target time resources, where J is a positive integer not greater than M and not less than 1.

In addition, it should be noted that, a time interval between an earliest target time resource in the J eighth time resources and the seventh time resource is greater than a time interval between an earliest target time resource in the J ninth time resources and the seventh time resource. For example, J=2, and a time interval between a first target time resource in the two eighth time resources and the seventh time resource is greater than a time interval between a first target time resource in the two ninth time resources and the first time resource.

It may be understood that, the earliest time resource in the ninth time resources is earlier than the earliest time resource in the eighth time resources. Therefore, a time resource whose duration can be supported by the terminal device is preferentially selected as a ninth time resource.

The earliest time resource in the ninth time resources is earlier than the earliest time resource in the eighth time resources in time. To be specific, the ninth time resource is a $y^{th}$ symbol or slot or mini-slot before the second time resource. Durations of the second time resource and the third time resource may be the same or may be different.

404. The terminal device transmits X sixth transport blocks on the J target time resources based on the scheduling information, where X is a positive integer.

In this embodiment, after the terminal device determines the J target time resources and the sixth transport blocks, the terminal device transmits the X sixth transport blocks on the J target time resources to the network device. A specific transmission process is as follows: The terminal device transmits X fifth transport blocks on the J eighth time resources, where X is less than or equal to M; or the terminal device transmits X transport blocks other than the fifth transport blocks on the J ninth time resources, where X is unrelated to values of J and M, and may be greater or less. This is not limited. Preferably, X is a positive integer not less than J.

In this embodiment, because the information about the quantity M of the fifth transport blocks is reported in the scheduling request, the network device schedules the J target time resources simultaneously for the terminal device for performing data transmission. In the data transmission method in this embodiment of this application, the network device may comprehensively consider the information in the scheduling request of the terminal device, so that the terminal device is scheduled to transmit a plurality of transport blocks on a plurality of time resources at a time. Therefore, flexibility of scheduling the terminal device by the network device is effectively improved in this embodiment of this application.

Figure 5:
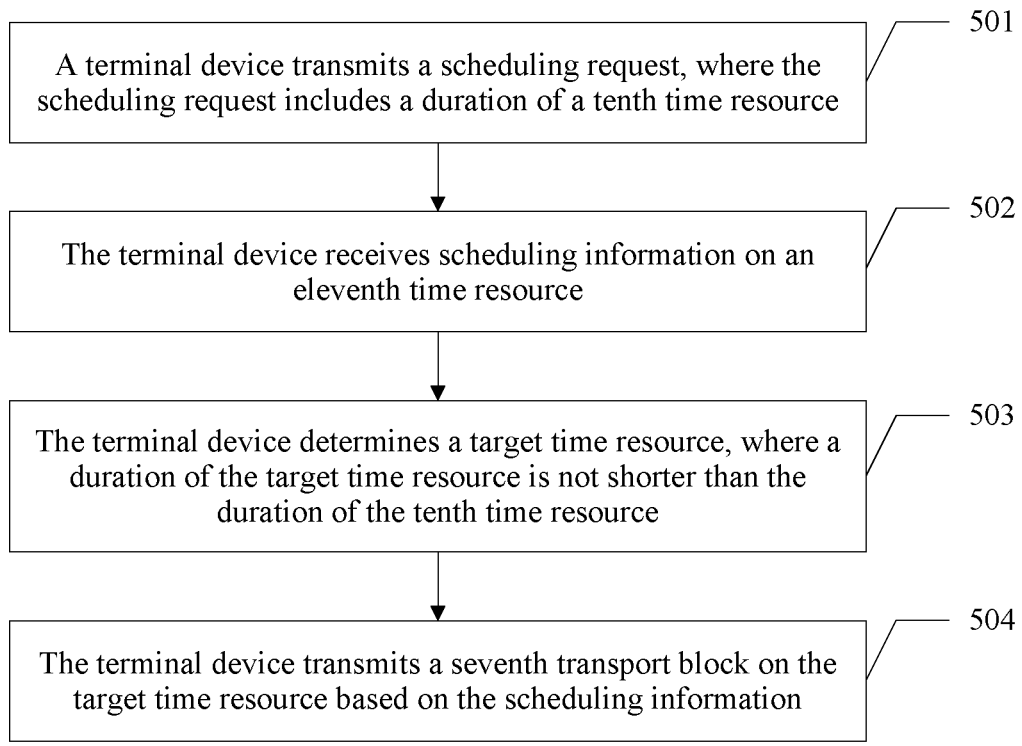
FIG. 5 is a schematic diagram of another embodiment of a data transmission method according to an embodiment of this application.

Referring to FIG. 5, an embodiment of this application is described in detail, and includes the following steps.

501. A terminal device transmits a scheduling request, where the scheduling request includes a duration of a tenth time resource.

In this embodiment, when requiring scheduling, the terminal device transmits the scheduling request to a network device to request scheduling of a time resource such as the tenth time resource, where the time resource has a corresponding duration. Time resources of different durations support different transmission durations of the terminal device. The durations of the time resources include a first duration and a second duration, where a duration of a time resource of the first duration is greater than a duration of a time resource of the second duration.

It may be understood that, the duration of the tenth time resource is a length of the tenth time resource in time, for example, one or more symbols, or one or more mini-slots, or one or more slots.

The terminal device transmits the scheduling request to the network device, where the scheduling request includes encoded information about the duration of the tenth time resource, and the duration of the tenth time resource may be the first duration or the second duration.

Optionally, before or when or after the terminal device transmits the scheduling request, and before the terminal device receives scheduling information, the terminal device may further transmit fourth notification information to the network device, where the fourth notification information is used to notify the network device that the terminal device has at least one of the following capability information: 1. the terminal device has a capability of supporting a duration greater than or equal to the duration of the tenth time resource, where the duration of the tenth time resource is the length of the tenth time resource in time and is a duration required by the terminal device to transmit uplink transmission, and therefore, to ensure that uplink transmission can be performed, the terminal device must have the capability of supporting a duration greater than or equal to the duration of the tenth time resource; and 2. the terminal device has a capability of fast transmission for a duration greater than or equal to the duration of the tenth time resource.

In addition, after the terminal device transmits the fourth notification information, the terminal device receives fourth configuration information transmitted by the network device, where the fourth configuration information is used to configure the terminal device to have at least one of the following capability information: 1. the terminal device has the capability of supporting a duration greater than or equal to the duration of the tenth time resource; and 2. the terminal device has the capability of fast transmission for a duration greater than or equal to the duration of the tenth time resource. It may be understood that, after the fourth notification information notifies the network device that the terminal device has at least one of the foregoing capability information, the network device enables, by using the fourth configuration information, the terminal device to start at least one of the at least one of the capability information; otherwise, if the fourth notification information notifies the network device that the terminal device does not have at least one of the foregoing capability information, because the terminal device does not have the capability, the network device does not need to transmit the fourth configuration information corresponding to the at least one of the capability information to enable the terminal device.

It should be further noted that, a transmission trigger condition may be further set for the terminal device to transmit the scheduling request. For example, when a size of information in a buffer of the terminal device is greater than a second threshold, the terminal device transmits the scheduling request to the network device; or when a size of information in a buffer of the terminal device is not greater than a second threshold, the terminal device does not transmit the scheduling request, where the second threshold may be a value corresponding to a preset transport block size, or a preset value, or a value corresponding to a transport block size configured by the network device by using higher layer signaling. This is not limited herein.

It should be further noted that, the scheduling request may be an SR in an LTE-A system, or may be another channel in a 5th generation communications system. For example, alternatively, the scheduling request may be an uplink data channel, an uplink control channel, or another uplink signal. The uplink data channel may be a channel carrying uplink data information, but the uplink data channel may also carry uplink control information. The uplink control channel may be a channel carrying uplink control information. The uplink signal may be a probe signal or a dedicated reference signal.

502. The terminal device receives scheduling information on an eleventh time resource.

Optionally, after the network device receives the scheduling request, the network device decodes the scheduling request to obtain the information about the duration of the tenth time resource, and determines that the duration of the tenth time resource includes at least the first duration or the second duration, where the first duration or the second duration may be several symbols, mini-slots, slots, or 1 ms. For example, the first duration is 1 ms, and the second duration is two symbols or three symbols. For example, the first duration is a slot, and the second duration is a mini-slot. A transmission time interval corresponding to the first duration is greater than a time interval corresponding to the second duration.

After the network device determines the duration of the tenth time resource, the network device determines a corresponding target time resource, where the target time resource includes a twelfth time resource and a thirteenth time resource, and a time interval between the twelfth time resource and the eleventh time resource is greater than a time interval between the thirteenth time resource and the eleventh time resource, a duration of the twelfth time resource is not shorter than the duration of the tenth time resource, a duration of the thirteenth time resource is equal to the duration of the tenth time resource, and a duration of the target time resource is not shorter than the duration of the tenth time resource. Finally, the network device adds information about the target time resource to the scheduling information, and transmits the scheduling information on the eleventh time resource to the terminal device.

It may be understood that, the thirteenth time resource is earlier than the twelfth time resource. Therefore, a time resource whose duration can be supported by the terminal device is preferentially selected as the thirteenth time resource.

503. The terminal device determines a target time resource based on the scheduling information, where a duration of the target time resource is not shorter than the duration of the tenth time resource.

In this embodiment, after the terminal device receives the scheduling information, the terminal device determines, based on the information about the target time resource that is included in the scheduling information, that the target time resource is the twelfth time resource or the thirteenth time resource.

504. The terminal device transmits a seventh transport block on the target time resource based on the scheduling information.

In this embodiment, the seventh transport block includes the information in the buffer of the terminal device or data information corresponding to a to-be-transmitted service. When a transport block size of the seventh transport block is not greater than a first threshold, the terminal device transmits the seventh transport block on the thirteenth time resource to the network device; or when a transport block size of the seventh transport block is greater than a first threshold, the terminal device transmits the seventh transport block on the twelfth time resource to the network device.

In this embodiment, the scheduling request transmitted by the terminal device includes a duration required by the terminal device to transmit data, that is, the duration of the tenth time resource. The network device can properly schedule the terminal device based on the duration of the tenth time resource. Therefore, time resources of different durations can be scheduled for uplink transmission in this embodiment of this application. Therefore, flexibility of scheduling the terminal device by the network device is effectively improved in this embodiment of this application.

Figure 6:
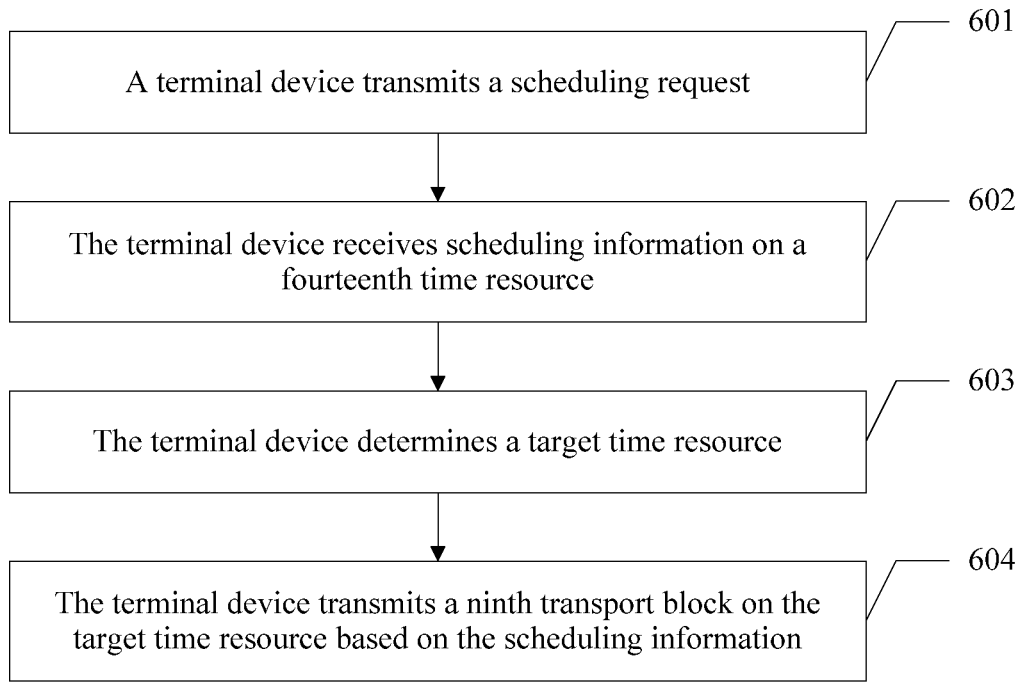
FIG. 6 is a schematic diagram of another embodiment of a data transmission method according to an embodiment of this application.

Referring to FIG. 6, an embodiment of this application is described in detail, and includes the following steps.

601. A terminal device transmits a scheduling request.

Optionally, a preset second threshold is set in the terminal device, where the second threshold may be a value corresponding to a preset transport block size, a preset value, or a value corresponding to a transport block size configured by a network device by using higher layer signaling. This is not limited herein.

A buffer of the terminal device includes to-be-transmitted information. When a size of a transport block to be scheduled for the terminal device is greater than the second threshold, the terminal device transmits the scheduling request to the network device; or when a size of a transport block to be scheduled for the terminal device is not greater than the second threshold, the terminal device does not transmit the scheduling request to the network device. The terminal device transmits the scheduling request used to request an uplink time resource from the network device for performing data transmission.

It should be noted that, when a size of the information in the buffer of the terminal device is greater than the second threshold, the terminal device cannot transmit the scheduling request. Therefore, the terminal device can only select to transmit data on a preset time resource without requiring scheduling information.

In addition, before the terminal device receives the scheduling information, the terminal device may further transmit fifth notification information to the network device, where the fifth notification information includes information about at least one of a size of a transport block that can be fast transmitted or a quantity of transport blocks that can be fast transmitted. This is not limited herein.

Optionally, before the terminal device receives the scheduling information, the terminal device starts to perform coding processing on at least one eighth transport block, where the at least one eighth transport block is a transport block that is preset or is configured by using higher layer signaling. It should be noted that, the terminal device may start to perform coding processing after, before, or when transmitting the scheduling request. A time relationship between starting to perform coding processing and transmitting the scheduling request is not limited. It should be noted that, coding processing includes coding and other operations related to coding. A specific operation is not limited herein.

602. The terminal device receives scheduling information on a fourteenth time resource.

Optionally, after the network device receives the scheduling request, the network device learns, from the scheduling request, time resource scheduling requested by the terminal device for performing uplink transmission. The network device transmits the scheduling information on the fourteenth time resource to the terminal device, where the scheduling information includes related indication information.

In addition, the method for performing coding processing on the indication information and adding the indication information to the scheduling information by the network device is similar to the manner in step 102, and is not described again herein.

Optionally, after the terminal device receives the scheduling information on the fourteenth time resource, the terminal device decodes the scheduling information to obtain the related indication information, and therefore determines a ninth transport block. A specific determining process is similar to the determining process in step 102, and is not described again herein.

The ninth transport block may be at least one transport block in the at least one eighth transport block, or at least one transport block other than the at least one eighth transport block. This is not limited herein.

603. The terminal device determines a target time resource.

In this embodiment, after the terminal device determines the ninth transport block, the terminal device determines the target time resource, where the target time resource includes a fifteenth time resource and a sixteenth time resource, and a time interval between the fifteenth time resource and the fourteenth time resource is greater than a time interval between the sixteenth time resource and the fourteenth time resource; and when the terminal device determines that the ninth transport block is at least one transport block in the at least one eighth transport block, the terminal device determines that the target time resource is the sixteenth time resource; or when the terminal device determines that the ninth transport block is at least one transport block other than the at least one eighth transport block, the terminal device determines that the target time resource is the fifteenth time resource.

The sixteenth time resource is earlier than the fifteenth time resource in time. To be specific, the sixth time resource is a $y^{th}$ symbol or slot or mini-slot before the fifteenth time resource. Durations of the fifteenth time resource and the sixteenth time resource may be the same or may be different.

604. The terminal device transmits a ninth transport block on the target time resource based on the scheduling information.

In this embodiment, that the terminal device transmits a ninth transport block on the target time resource to the network device after the terminal device determines the ninth transport block and the target time resource includes: when the terminal device determines that the ninth transport block is at least one transport block in the at least one eighth transport block, the terminal device transmits the at least one transport block in the at least one eighth transport block on the sixteenth time resource to the network device; or when the terminal device determines that the ninth transport block is at least one transport block other than the at least one eighth transport block, the terminal device transmits the at least one transport block other than the at least one eighth transport block on the fifteenth time resource to the network device.

In this embodiment, when the size of the information in the buffer of the terminal device is greater than the second threshold, the terminal device transmits the scheduling request; otherwise, the terminal device does not transmit the scheduling request. This can reduce scheduling request transmission. Therefore, according to the data transmission method in this embodiment of this application, a quantity of scheduling request transmission times can be effectively reduced, a function of controlling the quantity of scheduling request transmission times is implemented, and flexibility of scheduling the terminal device by the network device is effectively improved.

The data transmission methods in the embodiments of this application are described in detail in the foregoing several embodiments. In another implementation of an embodiment of this application, a terminal device transmits a scheduling request, where the scheduling request may include information about a quantity G of seventeenth time resources, and G is a positive integer; the terminal device receives scheduling information on an eighteenth time resource; the terminal device determines H target time resources, where H is a positive integer not greater than G; and the terminal device transmits Y tenth transport blocks on the H target time resources based on the scheduling information, where Y is a positive integer. Optionally, before the terminal device receives the scheduling information, the terminal device may start to perform a coding operation on at least one transport block in at least one tenth transport block.

Optionally, before the terminal device transmits the scheduling request, the terminal device may further transmit sixth notification information, where the sixth notification information is used to notify a network device that the terminal device has at least one of the following capability information: 1. the terminal device has a capability of supporting the quantity G of the seventeenth time resources; 2. the terminal device has a capability of fast transmitting the at least one tenth transport block; and 3. the terminal device has a capability of supporting a time interval between a twentieth time resource and the eighteenth time resource.

In addition, after the terminal device transmits the sixth notification information, the method further includes: the terminal device receives sixth configuration information transmitted by the network device, where the sixth configuration information is used to configure the terminal device to have at least one of the following capability information: 1. the terminal device has the capability of supporting the quantity G of the seventeenth time resources; 2. the terminal device has the capability of fast transmitting the at least one tenth transport block; and 3. the terminal device has the capability of supporting the time interval between the twentieth time resource and the eighteenth time resource. The at least one tenth transport block includes a size and/or a quantity of the tenth transport blocks. It should be noted that, the capability of fast transmitting the at least one tenth transport block may include the quantity of the tenth transport blocks and/or the size of the tenth transport block. For example, the terminal device has a capability of fast transmitting three 100-bit transport blocks, where the size of the tenth transport block is 100 bits, and the quantity of the tenth transport blocks is 3. It may be understood that, after the sixth notification information notifies the network device that the terminal device has at least one of the foregoing capability information, the network device enables, by using the sixth configuration information, the terminal device to start at least one of the at least one of the capability information; otherwise, if the sixth notification information notifies the network device that the terminal device does not have at least one of the foregoing capability information, because the terminal device does not have the capability, the network device does not need to transmit the sixth configuration information corresponding to the at least one of the capability information to enable the terminal device.

After the network device receives the scheduling request, the network device determines the tenth transport block based on the information about the quantity G of the seventeenth transport blocks, and a current occupation status of a system, or a priority of a user, or a priority of a service, or other influential factors such as a latency requirement of the service.

The target time resources include nineteenth time resources and twentieth time resources, where an earliest time resource in the twentieth time resources is earlier than an earliest time resource in the nineteenth time resources. To be specific, the twentieth time resource is a $y^{th}$ symbol or slot or mini-slot before the nineteenth time resource. Durations of the nineteenth time resource and the twentieth time resource may be the same or may be different. For example, H=2, and a time interval between a first target time resource in the two nineteenth time resources and the eighteenth time resource is greater than a time interval between a first target time resource in the two twentieth time resources and the eighteenth time resource.

The implementation of this embodiment is similar to the implementation of the embodiment corresponding to FIG. 4, and is not described again herein.

In this embodiment, the scheduling request may include the information about the quantity G of the seventeenth time resources, and the terminal device obtains the H target time resources based on the scheduling information. Therefore, the terminal device transmits the Y tenth transport blocks on the H target time resources. Therefore, in the data transmission method in this embodiment of this application, a method for one-time flexible scheduling of one or more target time resources, that is, time resources on which uplink transmissions are located, is provided.

In this embodiment, the scheduling request further includes a duration of the seventeenth time resource. For example, the scheduling request includes six seventeenth time resources whose durations are two or three symbols, or one seventeenth time resource whose duration is 1 ms.

The data transmission methods in the embodiments of this application are described in the foregoing embodiments. In addition, the foregoing several embodiments may be performed separately, or may be performed simultaneously together. For example, a scheduling request includes both information about at least one first transport block and information about a quantity M of at least one fifth transport block, where the fifth transport block is a first transport block. For another example, a scheduling request includes both information about at least one third transport block and information about a quantity M of at least one fifth transport block, where the fifth transport block is a third transport block. For another example, a scheduling request includes both information about a quantity G of seventeenth time resources and a duration of a tenth time resource, where the tenth time resource is at least one of the seventeenth time resources. For another example, scheduling request information includes information about at least one third transport block, information about a quantity M of at least one fifth transport block, and information about a quantity G of seventeenth time resources, where the fifth transport block is a first transport block, and a quantity of target time resources is less than or equal to G. For another example, scheduling request information includes information about at least one third transport block, information about a quantity M of at least one fifth transport block, and a duration of a tenth time resource, where the fifth transport block is a first transport block, and a target time resource is greater than or equal to the tenth time resource. For another example, scheduling request information includes information about at least one third transport block, information about a quantity M of at least one fifth transport block, a duration of a tenth time resource, and a quantity G of seventeenth time resources, where the fifth transport block is a first transport block, and the tenth time resource is at least one of the seventeenth time resources. For specific actions of the terminal device and the network device, refer to the embodiments corresponding to FIG. 1 and FIG. 4. Details are not described again herein.

The following describes a terminal device and a network device in the embodiments of this application from the following aspects.

I. A scheduling request includes information about at least one first transport block.

Figure 7:
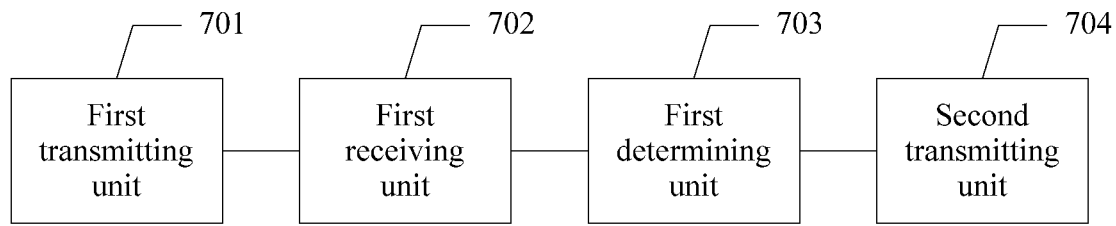
FIG. 7 is a schematic diagram of an embodiment of a terminal device according to an embodiment of this application.

Referring to FIG. 7, a terminal device in an embodiment of this application is described in detail, and includes: a first transmitting unit 701, configured to transmit a scheduling request, where the scheduling request includes information about at least one first transport block; a first receiving unit 702, configured to receive scheduling information on a first time resource; a first determining unit 703, configured to determine a target time resource, where the target time resource includes a second time resource or a third time resource, and a time interval between the second time resource and the first time resource is greater than a time interval between the third time resource and the first time resource; and a second transmitting unit 704, configured to transmit a second transport block on the target time resource based on the scheduling information, where the second transport block is at least one transport block in the at least one first transport block or is at least one transport block other than the at least one first transport block, the at least one first transport block corresponds to the third time resource, and the at least one transport block other than the at least one first transport block corresponds to the second time resource.

In this embodiment, in a scheduling process, the terminal device may report the information about the at least one first transport block; and after receiving the scheduling information, the terminal device transmits the second transport block on the target time resource indicated in the scheduling information, where when the second transport block is the at least one transport block in the at least one first transport block, the terminal device transmits the second transport block on the third time resource, or when the second transport block is the at least one transport block other than the at least one first transport block, the terminal device transmits the second transport block on the second time resource. Therefore, in the data transmission method in this embodiment of this application, the terminal device can use different time resources to transmit different transport blocks, and scheduling is relatively flexible.

Figure 8:
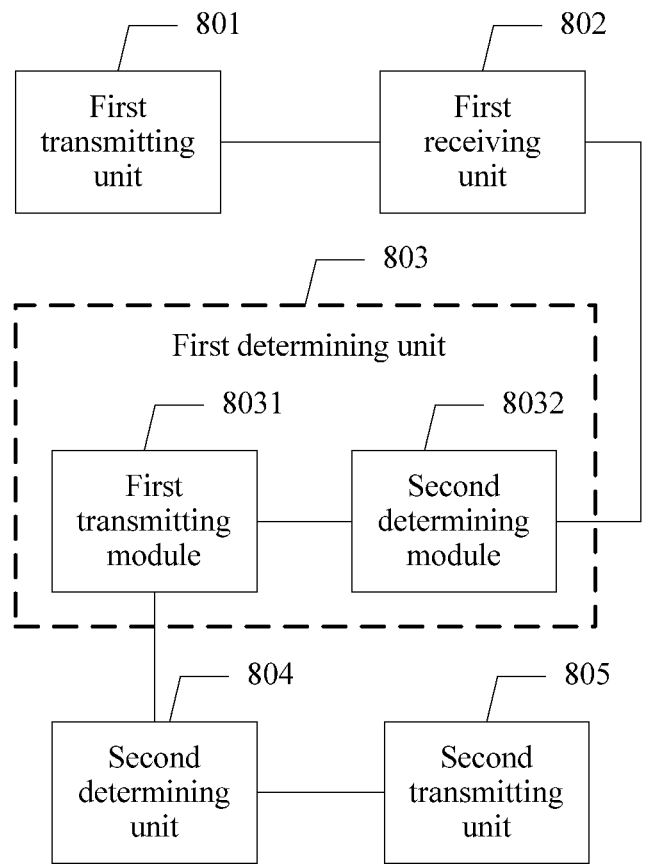
FIG. 8 is a schematic diagram of another embodiment of a terminal device according to an embodiment of this application.

As shown in FIG. 8, a first determining unit 803 includes a first determining module 8031 and a second determining module 8032; in addition, the terminal device further includes a second determining unit 804; a first transmitting unit 801 is configured to perform a function similar to that of the first transmitting unit 701, and is not described again herein; a first receiving unit 802 is configured to perform a function similar to that of the first receiving unit 702, and is not described again herein; the second determining unit 804 is configured to determine the second transport block based on the scheduling information; and the first determining module 8031 is configured to determine the target time resource based on a relationship between the second transport block and the at least one first transport block; or the second determining module 8032 is configured to determine the target time resource based on a relationship between the second transport block and the at least one transport block other than the at least one first transport block; and a second transmitting unit 805 is configured to perform a function similar to that of the second transmitting unit 704, and is not described again herein.

It should be noted that, the first determining unit and the second determining unit in this embodiment may be one determining unit, or may be two determining units. This is not limited herein.

The target time resource is determined as the second time resource or the third time resource. Therefore, the terminal device can perform transmission by using one time resource that is not limited.

Figure 9:
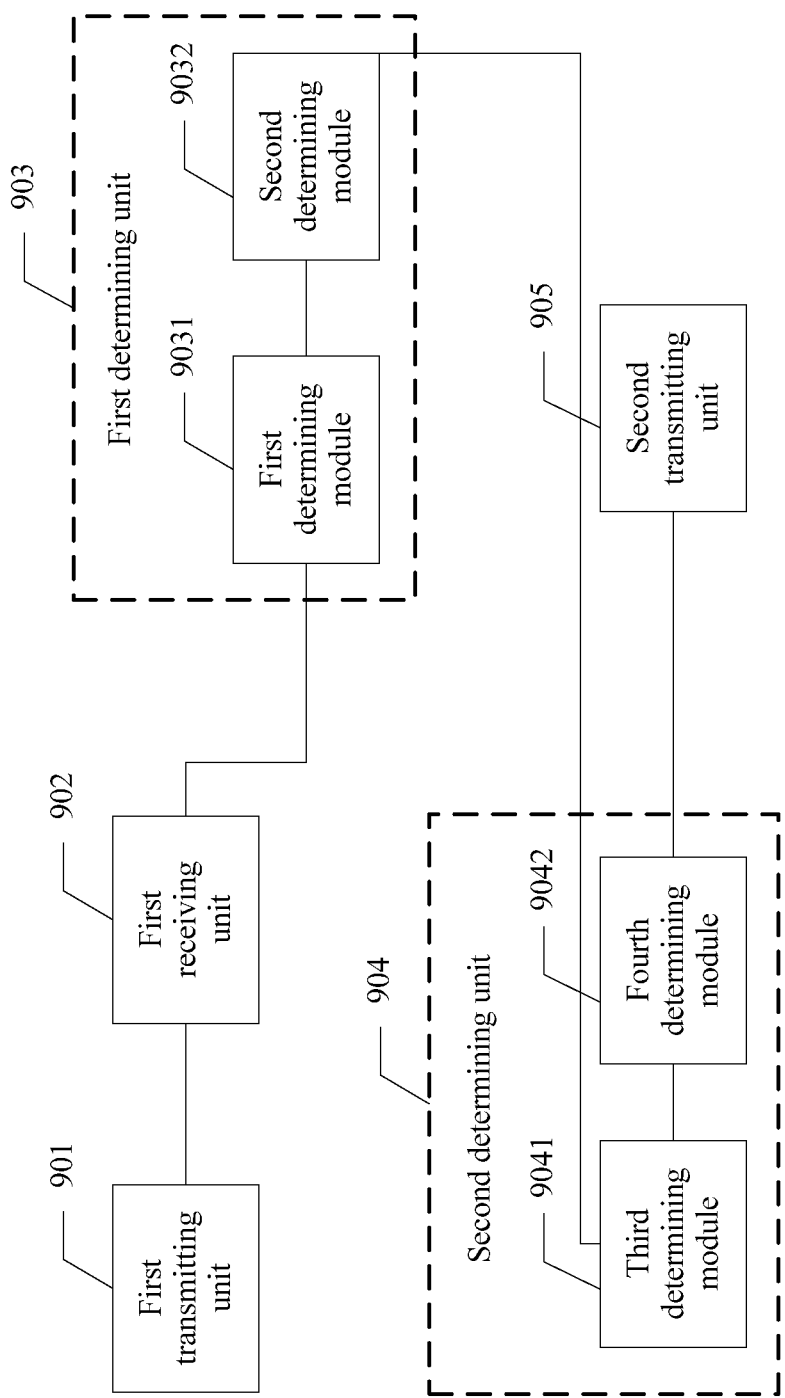
FIG. 9 is a schematic diagram of another embodiment of a terminal device according to an embodiment of this application.

As shown in FIG. 9, a second determining unit 903 includes a third determining module 9031 and a fourth determining module 9032; a first transmitting unit 901, a first receiving unit 902, a first determining module 9031, a second determining module 9032, and a second transmitting unit 905 respectively perform functions similar to those of the first transmitting unit 801, the first receiving unit 802, the first determining module 8031, the second determining module 8032, and the second transmitting unit 805, and are not described again herein; and the third determining module 9031 determines the second transport block based on some bits or a bit status of a modulation and coding scheme information field in the scheduling information; or the fourth determining module 9032 is configured to determine the second transport block based on a modulation and coding scheme and resource allocation information in the scheduling information.

In this embodiment, two manners of determining the second transport block based on the scheduling information are provided, so that scheduling flexibility is relatively high. An appropriate manner may be selected based on an actual situation to determine the second transport block.

Figure 10:
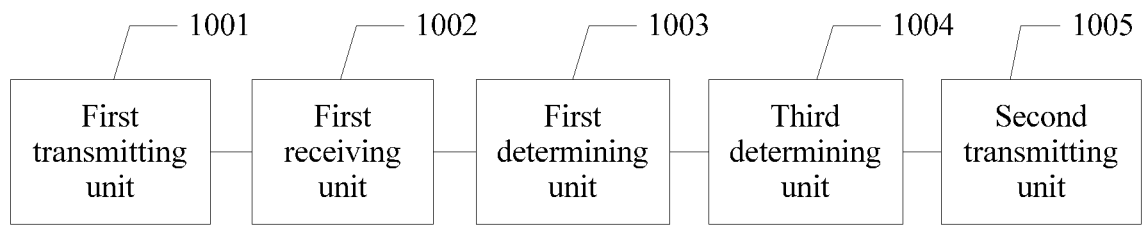
FIG. 10 is a schematic diagram of another embodiment of a terminal device according to an embodiment of this application.

As shown in FIG. 10, the terminal device further includes a third determining unit 1004; a first transmitting unit 1001, a first receiving unit 1002, a first determining unit 1003, and a second transmitting unit 1005 respectively perform functions similar to those of the first transmitting unit 701, the first receiving unit 702, the first determining unit 703, and the second transmitting unit 704, and are not described again herein; and the third determining unit 1004 is configured to determine the second transport block based on first indication information in the scheduling information, where the first indication information is used to indicate the target time resource or used to indicate a scheduling mode, the scheduling mode includes a first mode and a second mode, the first mode corresponds to the third time resource, and the second mode corresponds to the second time resource.

In this embodiment, a direct indication manner is provided. The target time resource can be directly determined, and there is no need to determine the second transport block. Therefore, a determining speed can be increased.

Figure 11:
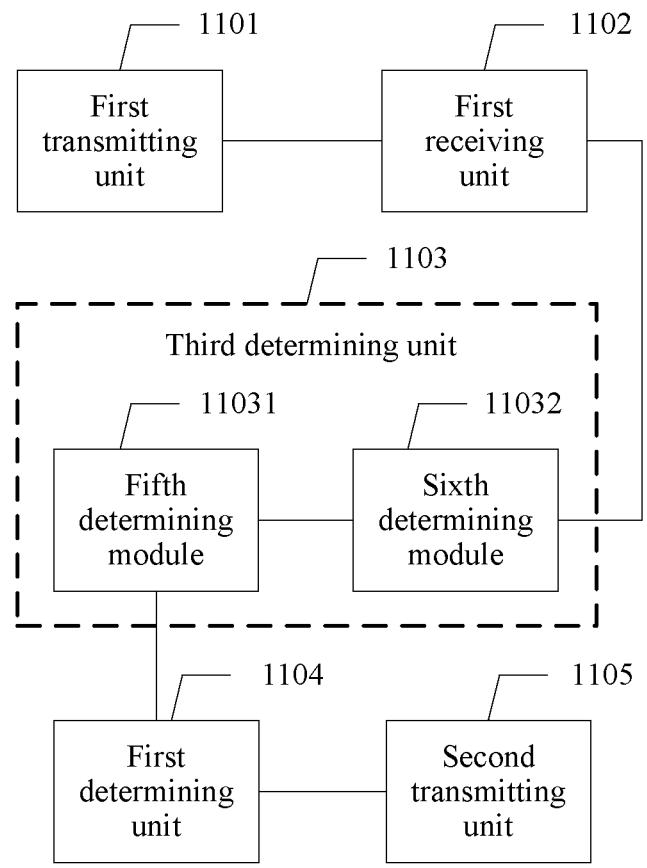
FIG. 11 is a schematic diagram of another embodiment of a terminal device according to an embodiment of this application.

As shown in FIG. 11, a third determining unit 1103 includes a fifth determining module 11031 and a sixth determining module 11032; a first transmitting unit 1101, a first receiving unit 1102, a first determining module 1104, and a second transmitting unit 1105 respectively perform functions similar to those of the first transmitting unit 1001, the first receiving unit 1002, the first determining unit 1003, and the second transmitting unit 1005, and are not described again herein; and the fifth determining module 11031 is configured to: when the first indication information indicates the first mode or the third time resource, determine that the second transport block is the at least one transport block in the at least one first transport block; or the sixth determining module 11032 is configured to: when the first indication information indicates the second mode or the second time resource, determine that the second transport block is the at least one transport block other than the at least one first transport block.

In this embodiment, specific indication content in the first indication information is described in detail, so that determining the second transport block by using the first indication information becomes clearer and more specific.

Figure 12:
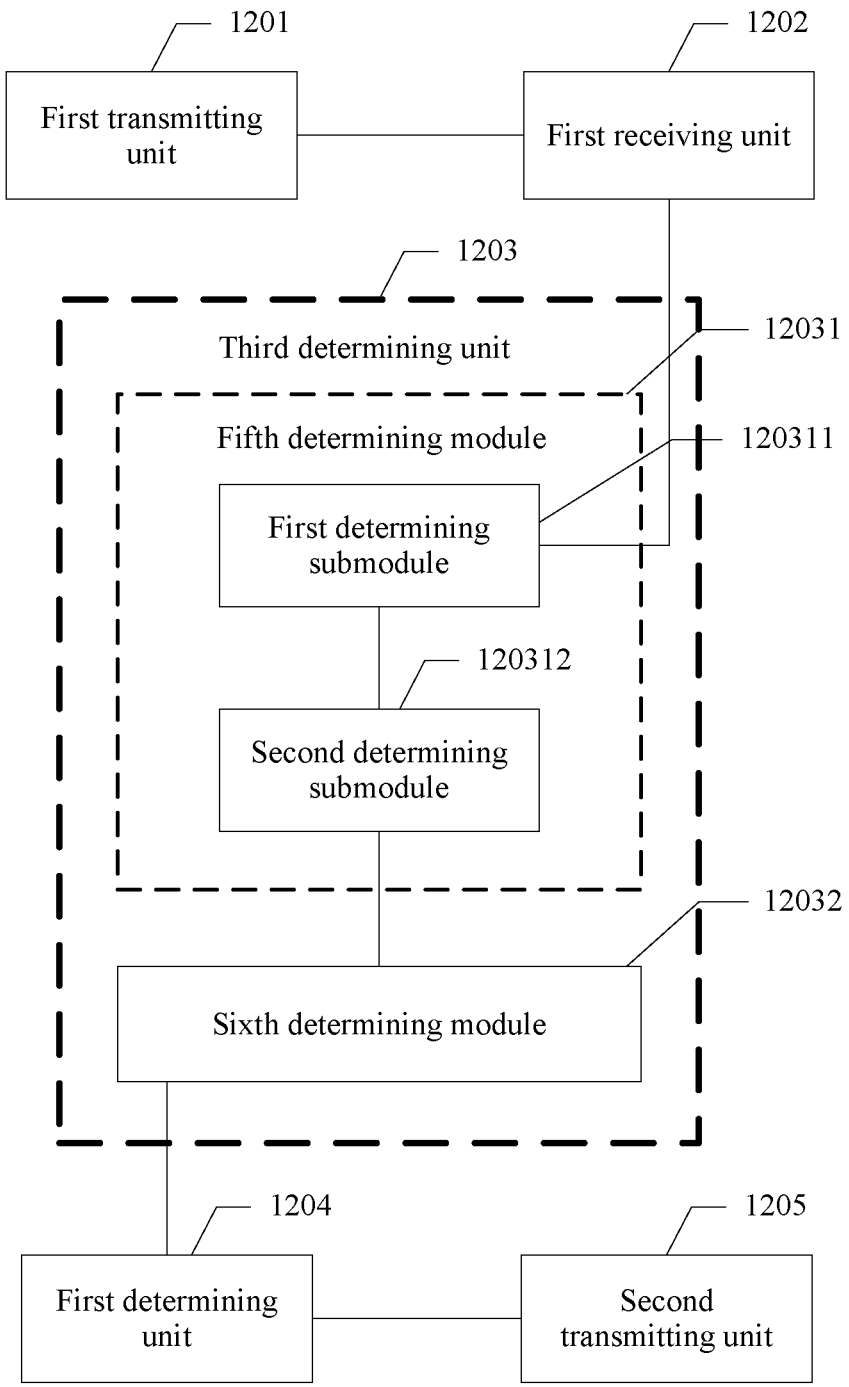
FIG. 12 is a schematic diagram of another embodiment of a terminal device according to an embodiment of this application.

As shown in FIG. 12, a fifth determining module 12031 includes a first determining submodule 120312 and a second determining submodule 120312; a first transmitting unit 1201, a first receiving unit 1202, a sixth determining module 12032, a first determining unit 1204, and a second transmitting unit 1205 respectively perform functions similar to those of the first transmitting unit 1101, the first receiving unit 1102, the sixth determining module 11032, the second determining unit 1104, and the second transmitting unit 1105, and are not described again herein; and the first determining submodule 120311 is configured to: when the at least one first transport block includes one transport block, determine that the second transport block is the transport block in the at least one first transport block; or the second determining submodule 120312 is configured to: when the at least one first transport block includes at least two transport blocks, determine the second transport block based on second indication information in the scheduling information.

In this embodiment, the specific second transport block is determined based on a quantity of transport blocks in the at least one transport block, so that the determining process has higher feasibility.

Figure 13:
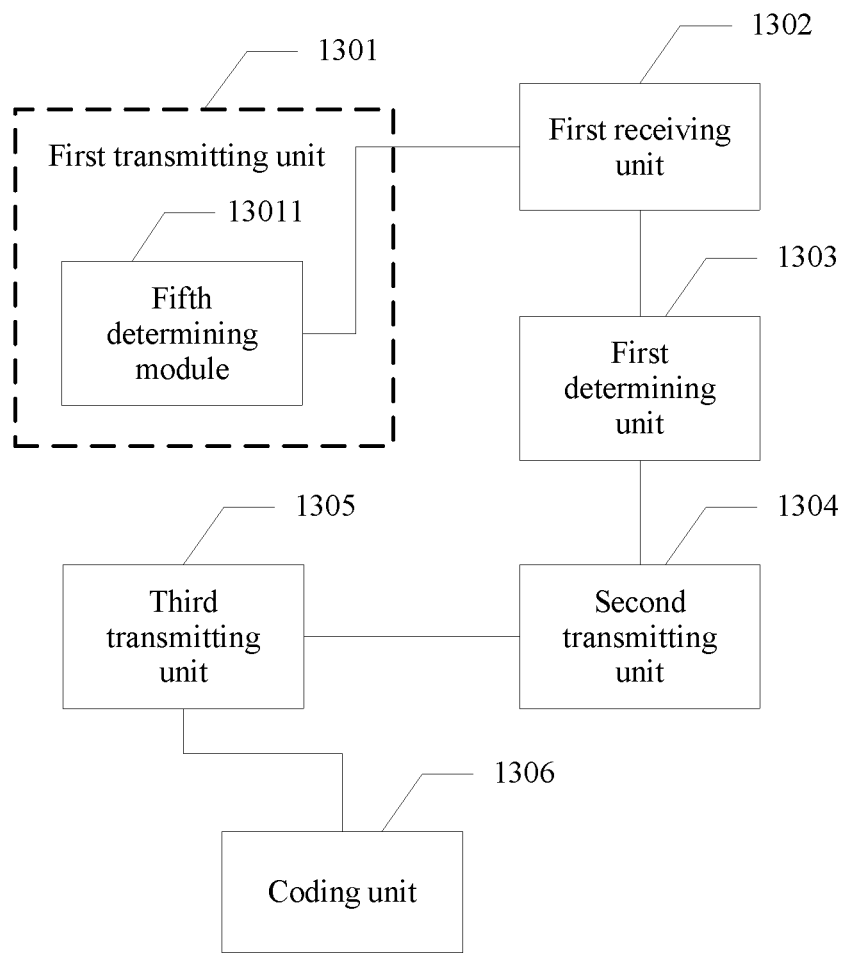
FIG. 13 is a schematic diagram of another embodiment of a terminal device according to an embodiment of this application.

In addition, as shown in FIG. 13, the terminal device further includes a coding processing unit 1306 and a third transmitting unit 1305, and a first transmitting unit 1301 includes a transmission module 13011; a first receiving unit 1302, a first determining unit 1303, and a second transmitting unit 1304 respectively perform functions similar to those of the first receiving unit 702, the first determining unit 703, and the second transmitting unit 704, and are not described again herein; the transmission module 13011 is configured to transmit the scheduling request if a size of information in a buffer of the terminal device is greater than a second threshold, where the second threshold may be a value corresponding to a preset transport block size, or a preset value, or a value corresponding to a transport block size configured by using higher layer signaling; and the third transmitting unit 1305 is configured to transmit first notification information, where the first notification information is used to notify a network device that the terminal device has at least one of the following capability information: the terminal device has a capability of supporting the time interval between the third time resource and the first time resource; the terminal device has a capability of transmitting the at least one first transport block on the third time resource; and the terminal device has a capability of fast transmitting the at least one first transport block.

The coding processing unit 1306 is configured to start to perform coding processing on the at least one first transport block.

In this embodiment, on one hand, the terminal device reports a fast transmission capability of the terminal device before transmitting the scheduling request. Therefore, the terminal device can be scheduled better, and scheduling failure caused by generation of scheduling not complying with a coding processing capability of the terminal device is avoided. On the other hand, coding processing is performed in advance on a transport block requested to be reported in the scheduling request. Therefore, time can be saved, and the terminal device makes preparations in advance.

Figure 14:
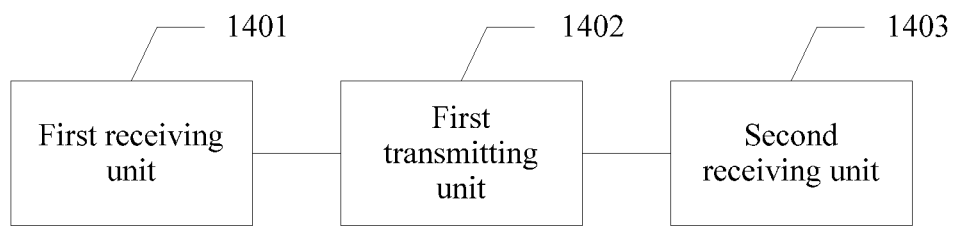
FIG. 14 is a schematic diagram of an embodiment of a network device according to an embodiment of this application.
Figure 15:
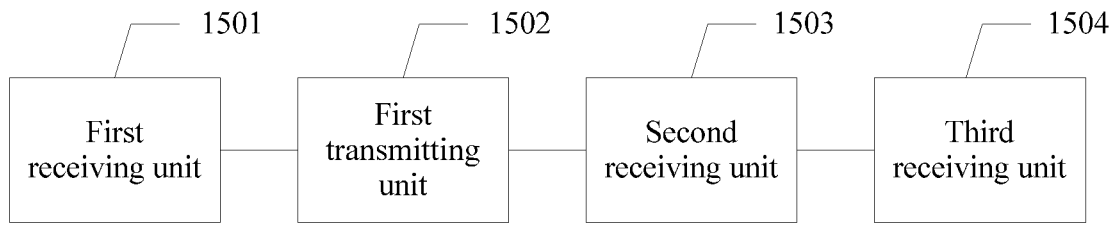
FIG. 15 is a schematic diagram of another embodiment of a network device according to an embodiment of this application.

Referring to FIG. 14, a network device in an embodiment of this application is described in detail, and includes: a first receiving unit 1401, configured to receive a scheduling request, where the scheduling request includes information about at least one first transport block; a first transmitting unit 1402, configured to transmit scheduling information on a first time resource; and a second receiving unit 1403, configured to receive a second transport block on a target time resource, where the target time resource includes a second time resource or a third time resource, a time interval between the second time resource and the first time resource is greater than a time interval between the third time resource and the first time resource, the second transport block is at least one transport block in the at least one first transport block or is at least one transport block other than the at least one first transport block, the at least one first transport block corresponds to the third time resource, and the at least one transport block other than the at least one first transport block corresponds to the second time resource.

In this embodiment, the scheduling request received by the network device includes the information about the at least one first transport block. After the network device transmits the scheduling request, when the network device receives the second transport block on the target time resource, the network device may receive the at least one transport block in the at least one first transport block on the third time resource, or may receive the at least one transport block other than the at least one first transport block on the second time resource. Scheduling is relatively flexible, and different time resources can be selected for scheduling based on different transport blocks. In addition, scheduling is more flexible and controllable because one of the third time resource and the second time resource is fast and the other is slow.

A first receiving unit 1501, a first transmitting unit 1502, and a second receiving unit 1503 respectively perform functions similar to those of the first receiving unit 1401, the first transmitting unit 1402, and the second receiving unit 1403, and are not described again herein; and a third receiving unit 1504 is configured to receive first notification information, where the first notification information is used to notify the network device that a terminal device has at least one of the following capability information: the terminal device has a capability of supporting the time interval between the third time resource and the first time resource; the terminal device has a capability of transmitting the at least one first transport block on the third time resource; and the terminal device has a capability of fast transmitting the at least one first transport block.

In this embodiment, the network device receives fast transmission capability information of the terminal device, and therefore can perform better scheduling based on the fast transmission capability of the terminal device.

II. A scheduling request includes information about at least one third transport block.

Figure 16:
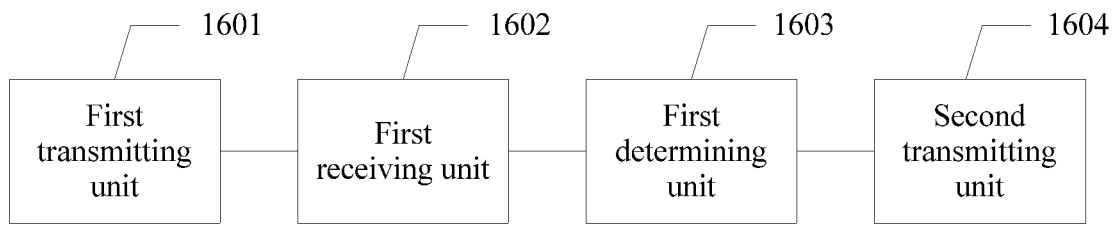
FIG. 16 is a schematic diagram of another embodiment of a terminal device according to an embodiment of this application.

Referring to FIG. 16, a terminal device in an embodiment of this application is described in detail, and includes: a first transmitting unit 1601, configured to transmit a scheduling request, where the scheduling request includes information about at least one third transport block; a first receiving unit 1602, configured to receive scheduling information on a fourth time resource; a first determining unit 1603, configured to determine a fifth time resource; and a second transmitting unit 1604, configured to transmit a fourth transport block on the fifth time resource based on the scheduling information, where the fourth transport block is at least one transport block in the at least one third transport block, a time interval between the fifth time resource and the fourth time resource is greater than a time interval between a sixth time resource and the fourth time resource, the at least one third transport block corresponds to the fifth time resource, and at least one transport block other than the at least one third transport block corresponds to the sixth time resource.

In this embodiment, the terminal device transmits the scheduling request including the information about the at least one third transport block; and after the terminal device receives the scheduling information on the fourth time resource, the terminal device transmits the fourth transport block on the fifth time resource indicated in the scheduling information, where the fourth transport block is one or more transport blocks in the at least one third transport block. It may be understood that, the scheduling information indicates the fifth time resource and does not indicate the sixth time resource, the fifth time resource corresponds to the at least one transport block in the at least one third transport block, and the scheduling request includes the information about the at least one third transport block. Therefore, in the data transmission method in this embodiment of this application, a scheduling mode with a relatively fixed time resource is provided.

Figure 17:
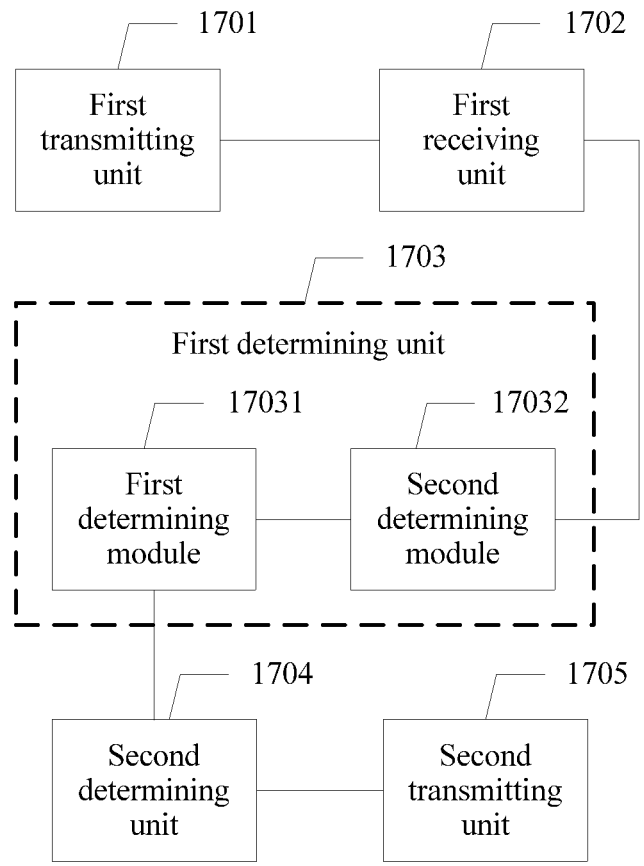
FIG. 17 is a schematic diagram of another embodiment of a terminal device according to an embodiment of this application.

As shown in FIG. 17, a first determining unit 1703 includes a first determining module 17031 and a second determining module 17032; in addition, the terminal device further includes a second determining unit 1704; a first transmitting unit 1701 is configured to perform a function similar to that of the first transmitting unit 1601, and is not described again herein; a first receiving unit 1702 is configured to perform a function similar to that of the first receiving unit 1602, and is not described again herein; the second determining unit 1704 is configured to determine the fourth transport block based on the scheduling information; and the first determining module 17031 is configured to determine the fifth time resource based on a relationship between the fourth transport block and the at least one third transport block; or the second determining module 17032 is configured to determine the fifth time resource based on a relationship between the fourth transport block and the at least one transport block other than the at least one third transport block; and a second transmitting unit 1705 is configured to perform a function similar to that of the second transmitting unit 1604, and is not described again herein.

It should be noted that, the first determining unit and the second determining unit in this embodiment may be one determining unit, or may be two determining units. This is not limited herein.

In this embodiment, the target time resource is determined as the fifth time resource rather than the sixth time resource, and this indicates that a preparation time required for transmitting the fourth transport block is relatively long.

Figure 18:
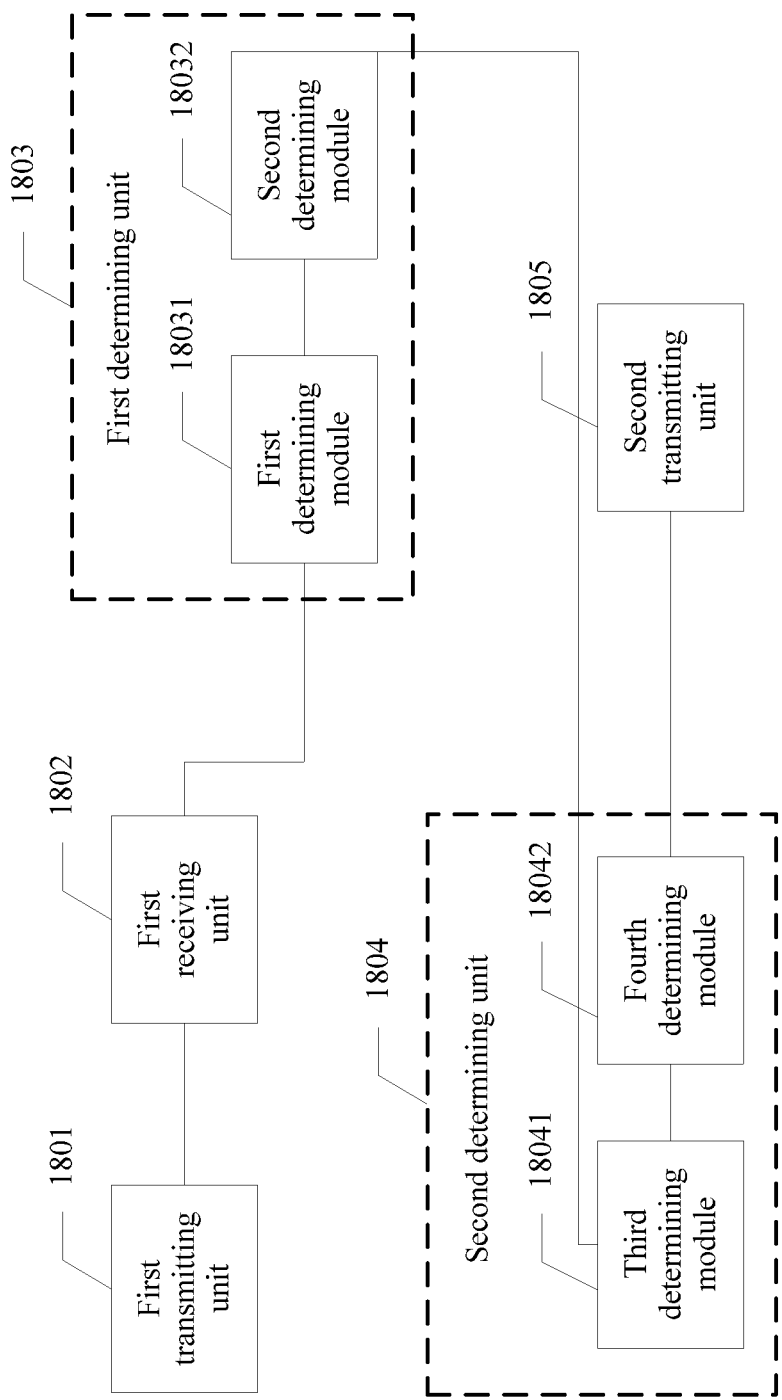
FIG. 18 is a schematic diagram of another embodiment of a terminal device according to an embodiment of this application.

As shown in FIG. 18, a second determining unit 1803 includes a third determining module 18031 and a fourth determining module 18032; a first transmitting unit 1801, a first receiving unit 1802, a first determining module 18031, a second determining module 18032, and a second transmitting unit 1805 respectively perform functions similar to those of the first transmitting unit 1701, the first receiving unit 1702, the first determining module 17031, the second determining module 17032, and the second transmitting unit 1705, and are not described again herein; and the third determining module 18031 is configured to determine the fourth transport block based on some bits or a bit status of a modulation and coding scheme information field in the scheduling information; or the fourth determining module 18032 is configured to determine the fourth transport block based on a modulation and coding scheme and resource allocation information in the scheduling information.

In this embodiment, two manners of determining the fourth transport block based on the scheduling information are provided, so that scheduling flexibility is relatively high. An appropriate manner may be selected based on an actual situation to determine the fourth transport block.

Figure 19:
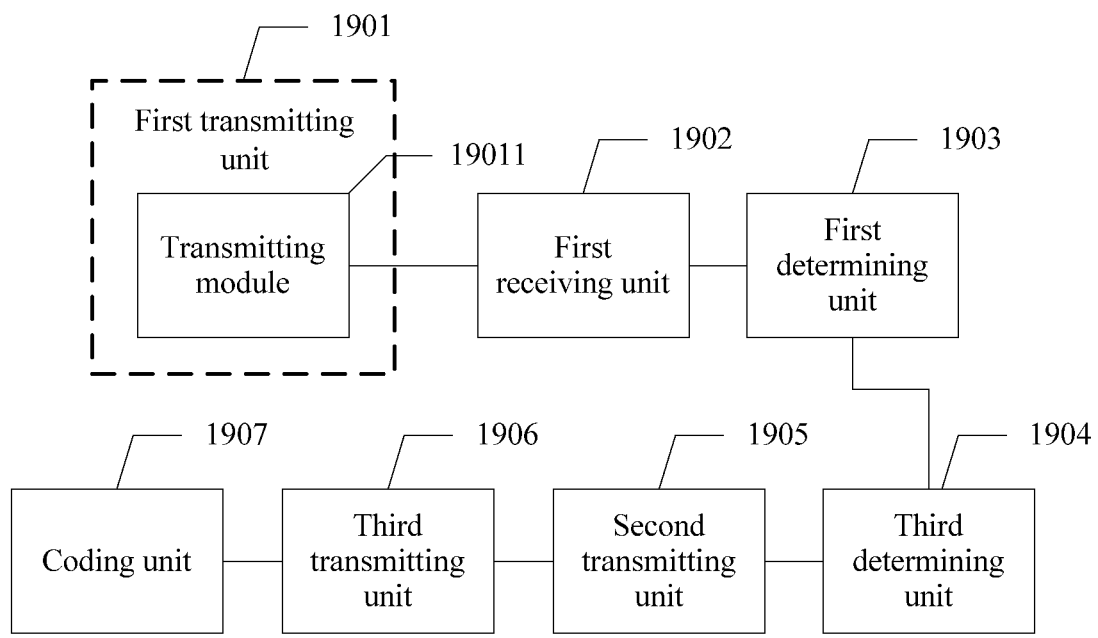
FIG. 19 is a schematic diagram of another embodiment of a terminal device according to an embodiment of this application.

As shown in FIG. 19, the terminal device further includes a third determining unit 1904, a third transmitting unit 1906, and a coding processing unit 1907; in addition, a first transmitting unit 1901 includes a transmission module 19011; a first receiving unit 1902, a first determining unit 1903, and a second transmitting unit 1905 respectively perform functions similar to those of the first transmitting unit 1601, the first receiving unit 1602, the first determining unit 1603, and the second transmitting unit 1604, and are not described again herein; the third determining unit 1904 is configured to determine the fourth transport block based on first indication information in the scheduling information, where the first indication information is used to indicate the fifth time resource or used to indicate a first mode, and the first mode corresponds to the fifth time resource; the third transmitting unit 1906 is configured to transmit second notification information, where the second notification information is used to notify a network device that the terminal device has at least one of the following capability information: the terminal device has a capability of supporting the time interval between the fifth time resource and the fourth time resource; the terminal device has a capability of transmitting the at least one third transport block on the fifth time resource; and the terminal device has a capability of transmitting the at least one third transport block; the coding processing unit 1907 is configured to start to perform coding processing on the at least one third transport block; and the transmission module 19011 is configured to transmit the scheduling request if a size of information in a buffer of the terminal device is greater than a second threshold, where the second threshold may be a value corresponding to a preset transport block size, or a preset value, or a value corresponding to a transport block size configured by the network device by using higher layer signaling.

In this embodiment, on one hand, the terminal device reports a fast transmission capability of the terminal device before transmitting the scheduling request. Therefore, the terminal device can be scheduled better, and scheduling failure caused by generation of scheduling not complying with a coding processing capability of the terminal device is avoided. On the other hand, coding processing is performed in advance on a transport block requested to be reported in the scheduling request. Therefore, time can be saved, and the terminal device makes preparations in advance. Finally, a preset scheduling request trigger is set, so that trigger requests transmitted by the terminal device are effectively reduced.

Figure 20:
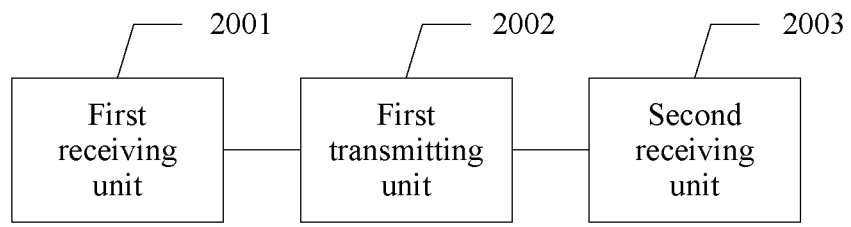
FIG. 20 is a schematic diagram of another embodiment of a network device according to an embodiment of this application.

Referring to FIG. 20, a network device in an embodiment of this application is described in detail, and includes: a first receiving unit 2001, configured to receive a scheduling request, where the scheduling information includes information about at least one third transport block; a first transmitting unit 2002, configured to transmit scheduling information on a fourth time resource; and a second receiving unit 2003, configured to receive a fourth transport block on a fifth time resource based on the scheduling information, where the fourth transport block is at least one transport block in the at least one third transport block, a time interval between the fifth time resource and the fourth time resource is greater than a time interval between a sixth time resource and the fourth time resource, the at least one third transport block corresponds to the fifth time resource, and at least one transport block other than the at least one third transport block corresponds to the sixth time resource.

In this embodiment, the network device receives the scheduling request including the information about the at least one third transport block; and after the network device transmits the scheduling information on the fourth time resource, the network device receives the fourth transport block on the fifth time resource, where the fourth transport block is one or more transport blocks in the at least one third transport block. It may be understood that, the scheduling information indicates the fifth time resource and does not indicate the sixth time resource, the fifth time resource corresponds to the at least one transport block in the at least one third transport block, and the scheduling request includes the information about the at least one third transport block. Therefore, in the data transmission method in this embodiment of this application, a scheduling mode with a relatively fixed time resource is provided.

Figure 21:
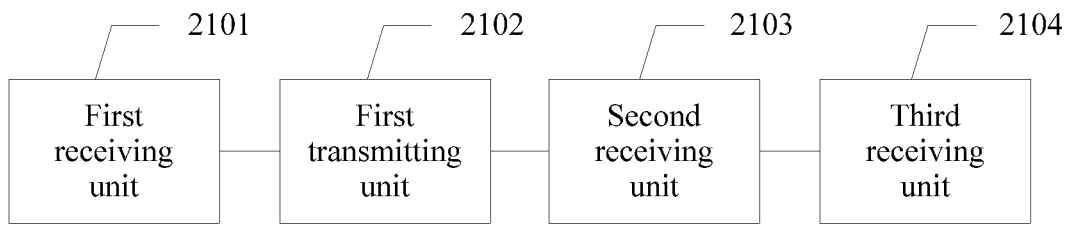
FIG. 21 is a schematic diagram of another embodiment of a network device according to an embodiment of this application.

As shown in FIG. 21, a first receiving unit 2101, a first transmitting unit 2102, and a second receiving unit 2103 are respectively configured to perform functions similar to those of the first receiving unit 2001, the first transmitting unit 2002, and the second receiving unit 2003, and are not described again herein; and a third receiving unit 2104 is configured to receive second notification information, where the second notification information is used to notify the network device that a terminal device has at least one of the following capability information: the terminal device has a capability of supporting the time interval between the fifth time resource and the fourth time resource; the terminal device has a capability of transmitting the at least one third transport block on the fifth time resource; and the terminal device has a capability of transmitting the at least one third transport block.

In this embodiment, the terminal device reports a fast transmission capability of the terminal device before transmitting the scheduling request. Therefore, the terminal device can be scheduled better, and scheduling failure caused by generation of scheduling not complying with a coding processing capability of the terminal device is avoided.

III. A scheduling request includes information about a quantity M of fifth transport blocks.

Figure 22:
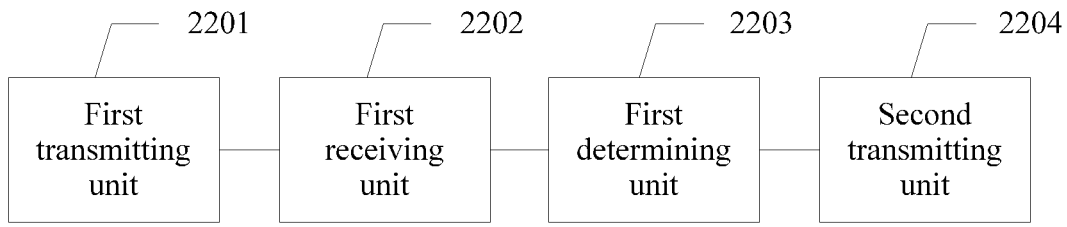
FIG. 22 is a schematic diagram of another embodiment of a terminal device according to an embodiment of this application.

Referring to FIG. 22, a terminal device in an embodiment of this application is described in detail, and includes: a first transmitting unit 2201, configured to transmit a scheduling request, where the scheduling request includes information about a quantity M of fifth transport blocks, and M is a positive integer; a first receiving unit 2202, configured to receive scheduling information on a seventh time resource; a first determining unit 2203, configured to determine J target time resources, where J is a positive integer not greater than M; and a second transmitting unit 2204, configured to transmit X sixth transport blocks on the J target time resources based on the scheduling information, where X is a positive integer.

In this embodiment, when the scheduling request may include the information about the quantity M of the fifth transport blocks, the terminal device obtains the J target time resources based on the scheduling information. Therefore, the terminal device transmits the X sixth transport blocks on the J target time resources. Therefore, in the data transmission method in this embodiment of this application, a scheduling method capable of scheduling one or more fifth transport blocks at a time is provided.

Figure 23:
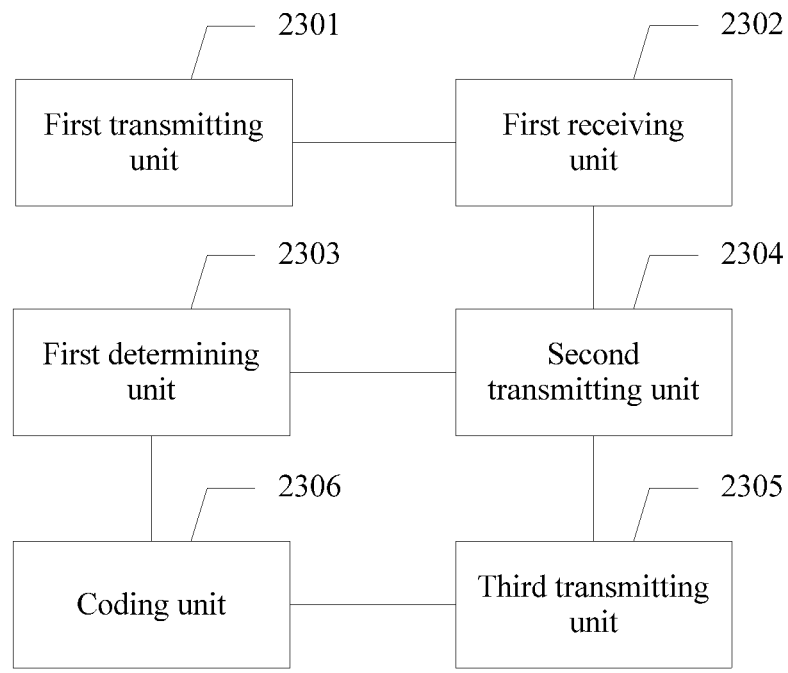
FIG. 23 is a schematic diagram of another embodiment of a terminal device according to an embodiment of this application.

As shown in FIG. 23, the terminal device further includes a third transmitting unit 2305 and a coding processing unit 2306; a first transmitting unit 2301, a first receiving unit 2302, a first determining unit 2303, and a second transmitting unit 2304 are respectively configured to perform functions similar to those of the first transmitting unit 2201, the first receiving unit 2202, the first determining unit 2203, and the second transmitting unit 2204, and are not described again herein; and the third transmitting unit 2305 is configured to transmit third notification information, where the third notification information is used to notify a network device that the terminal device has at least one of the following capability information: the terminal device has a capability of supporting the quantity M of the fifth transport blocks; and the terminal device has a capability of fast transmitting the at least one fifth transport block.

In this embodiment, on one hand, the terminal device reports fast transmission capability information, so that better scheduling can be performed based on the fast transmission capability of the terminal device; on the other hand, coding processing is performed in advance on a transport block requested to be reported in the scheduling request. Therefore, time can be saved, and the terminal device makes preparations in advance.

Figure 24:
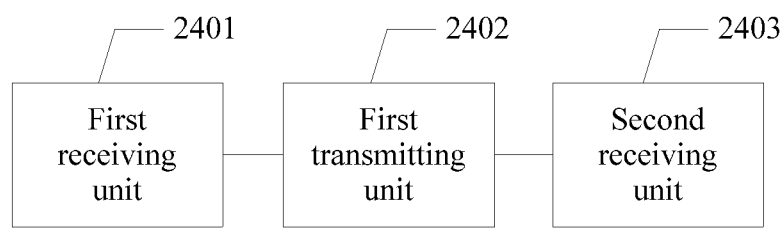
FIG. 24 is a schematic diagram of another embodiment of a network device according to an embodiment of this application.

Referring to FIG. 24, a network device in an embodiment of this application is described in detail, and includes: a first receiving unit 2401, configured to receive a scheduling request, where the scheduling request includes information about a quantity M of fifth transport blocks, and M is a positive integer; a first transmitting unit 2402, configured to transmit scheduling information on a seventh time resource; and a second receiving unit 2403, configured to receive X sixth transport blocks on the J target time resources based on the scheduling information, where J is a positive integer not greater than M, and X is a positive integer.

In this embodiment, when the scheduling request may include the information about the quantity M of the fifth transport blocks, the network device performs corresponding scheduling. Therefore, the network device receives the J sixth transport blocks on the J target time resources. Therefore, in the data transmission method in this embodiment of this application, a scheduling method capable of scheduling one or more fifth transport blocks at a time is provided.

Figure 25:
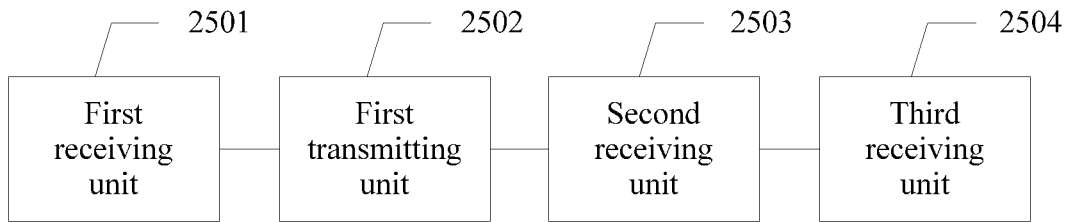
FIG. 25 is a schematic diagram of another embodiment of a network device according to an embodiment of this application.

As shown in FIG. 25, a first receiving unit 2501, a first transmitting unit 2502, and a second receiving unit 2503 are respectively configured to perform functions similar to those of the first receiving unit 2401, the first transmitting unit 2402, and the second receiving unit 2403, and are not described again herein; and a third receiving unit 2504 is configured to receive third notification information, where the third notification information is used to notify the network device that a terminal device has at least one of the following capability information: the terminal device has a capability of supporting the quantity M of the fifth transport blocks; and the terminal device has a capability of fast transmitting the at least one fifth transport block.

In this embodiment, the terminal device reports fast transmission capability information, so that better scheduling can be performed based on the fast transmission capability of the terminal device.

IV. A scheduling request includes information about a duration of a tenth time resource.

Figure 26:
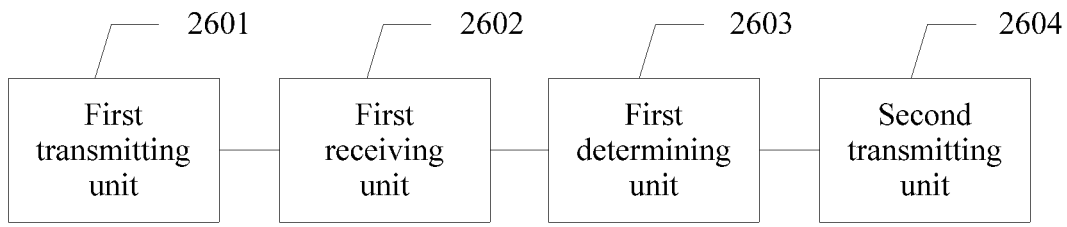
FIG. 26 is a schematic diagram of another embodiment of a terminal device according to an embodiment of this application.

Referring to FIG. 26, a terminal device in an embodiment of this application is described in detail, and includes: a first transmitting unit 2601, configured to transmit a scheduling request, where the scheduling request includes a duration of a tenth time resource; a first receiving unit 2602, configured to receive scheduling information on an eleventh time resource; a first determining unit 2603, configured to determine a target time resource, where a duration of the target time resource is not shorter than the duration of the tenth time resource; and a second transmitting unit 2604, configured to transmit a seventh transport block on the target time resource based on the scheduling information.

In this embodiment, when the scheduling request includes the duration of the tenth time resource, the terminal device obtains the target time resource based on the scheduling information. Therefore, the terminal device transmits the seventh transport block on the target time resource. Therefore, in the data transmission method in this embodiment of this application, a scheduling method for performing scheduling based on the duration of the time resource requested in the scheduling request is provided.

Figure 27:
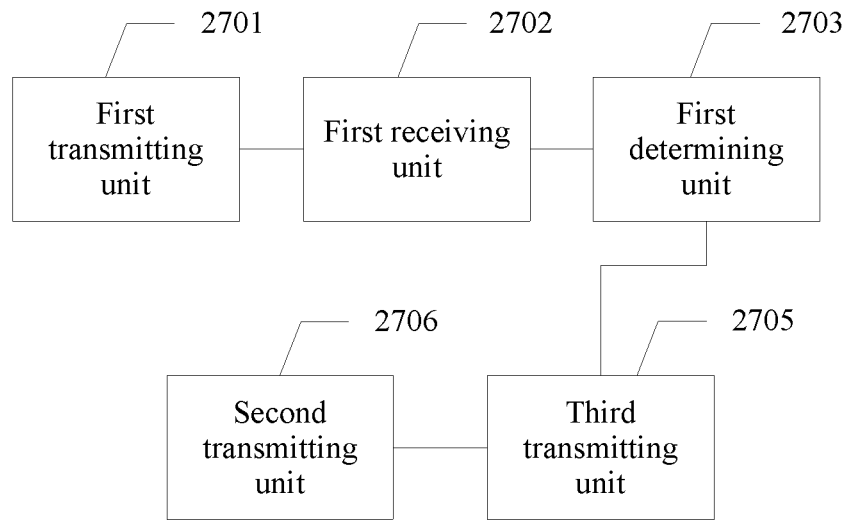
FIG. 27 is a schematic diagram of another embodiment of a terminal device according to an embodiment of this application.

As shown in FIG. 27, the terminal device further includes a third transmitting unit 2705; a first transmitting unit 2701, a first receiving unit 2702, a first determining unit 2703, and a second transmitting unit 2704 are respectively configured to perform functions similar to those of the first transmitting unit 2601, the first receiving unit 2602, the first determining unit 2603, and the second transmitting unit 2604, and are not described again herein; and the third transmitting unit 2705 is configured to transmit fourth notification information, where the fourth notification information is used to notify a network device that the terminal device has at least one of the following capability information: the terminal device has a capability of supporting a duration greater than or equal to the duration of the tenth time resource; and the terminal device has a capability of fast transmission for a duration greater than or equal to the duration of the tenth time resource.

In this embodiment, the terminal device reports fast transmission capability information, so that better scheduling can be performed based on the fast transmission capability of the terminal device.

Figure 28:
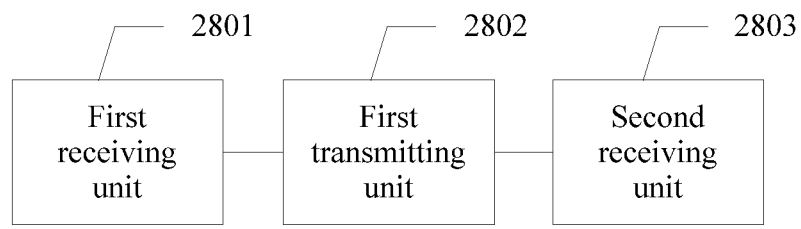
FIG. 28 is a schematic diagram of another embodiment of a network device according to an embodiment of this application.

Referring to FIG. 28, a network device in an embodiment of this application is described in detail, and includes: a first receiving unit 2801, configured to receive a scheduling request, where the scheduling request includes a duration of a tenth time resource; a first transmitting unit 2802, configured to transmit scheduling information on an eleventh time resource; and a second receiving unit 2803, configured to receive a seventh transport block on the target time resource based on the scheduling information.

In this embodiment, when the scheduling request includes the duration of the tenth time resource, the network device transmits the scheduling information based on the duration of the tenth time resource in the scheduling request. Therefore, the network device receives the seventh transport block on the target time resource. Therefore, in the data transmission method in this embodiment of this application, a scheduling method for performing scheduling based on the duration of the time resource requested in the scheduling request is provided.

Figure 29:
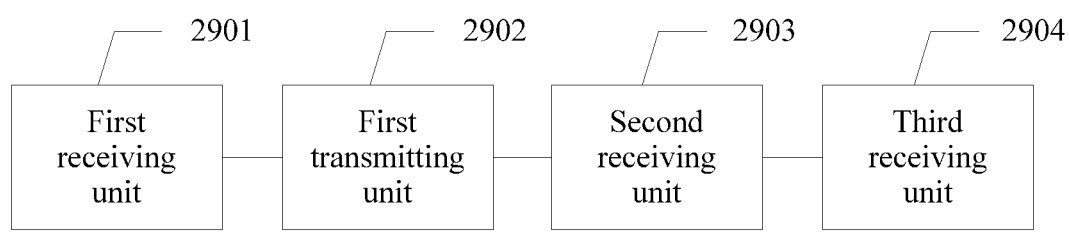
FIG. 29 is a schematic diagram of another embodiment of a network device according to an embodiment of this application.

As shown in FIG. 29, the network device further includes a third receiving unit 2904; a first receiving unit 2901, a first transmitting unit 2902, and a second receiving unit 2903 respectively perform functions similar to those of the first receiving unit 2801, the first transmitting unit 2802, and the second receiving unit 2803, and are not described again herein; and the third receiving unit 2904 is configured to receive fourth notification information, where the fourth notification information is used to notify the network device that a terminal device has at least one of the following capability information: the terminal device has a capability of supporting a duration greater than or equal to the duration of the tenth time resource; and the terminal device has a capability of fast transmission for a duration greater than or equal to the duration of the tenth time resource.

In this embodiment, the network device receives fast transmission capability information of the terminal device, and therefore can perform better scheduling based on the fast transmission capability of the terminal device.

In the foregoing embodiments, the terminal device and the network device corresponding to virtual apparatuses in the embodiments of this application are described. The following describes a terminal device and a network device corresponding to physical apparatuses in the embodiments of this application from the following aspects.

I. A scheduling request includes information about at least one first transport block.

Figure 30:
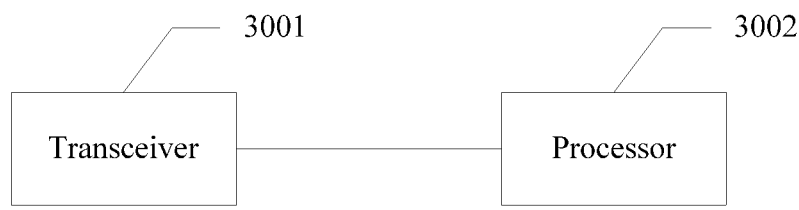
FIG. 30 is a schematic diagram of another embodiment of a terminal device according to an embodiment of this application.

Referring to FIG. 30, a terminal device in an embodiment of this application is described in detail. The terminal device includes a transceiver 3001 and a processor 3002, where a communication connection exists between the transceiver 3001 and the processor 3002; the transceiver 3001 is configured to transmit a scheduling request, where the scheduling request includes information about at least one first transport block; the transceiver 3001 is configured to receive scheduling information on a first time resource; the processor 3002 is configured to determine a target time resource, where the target time resource includes a second time resource or a third time resource, and a time interval between the second time resource and the first time resource is greater than a time interval between the third time resource and the first time resource; and the transceiver 3001 is configured to transmit a second transport block on the target time resource based on the scheduling information, where the second transport block is at least one transport block in the at least one first transport block or is at least one transport block other than the at least one first transport block, the at least one first transport block corresponds to the third time resource, and the at least one transport block other than the at least one first transport block corresponds to the second time resource.

The information about the at least one first transmission is used to indicate that a size of the at least one first transport block is not greater than a first threshold, where the first threshold is a value corresponding to a preset transport block size, or a preset value, or a value corresponding to a transport block size configured by using higher layer signaling; or the information about the at least one first transport block is used to indicate a size and/or a quantity of the at least one first transport block.

Optionally, before the processor 3002 determines the target time resource, the processor 3002 is further configured to determine the second transport block based on the scheduling information. In this case, that the processor 3002 determines the target time resource includes: determining the target time resource based on a relationship between the second transport block and the at least one first transport block; or determining the target time resource based on a relationship between the second transport block and the at least one transport block other than the at least one first transport block.

Optionally, that the processor 3002 determines the second transport block based on the scheduling information includes: determining the second transport block based on some bits or a bit status of a modulation and coding scheme information field in the scheduling information; or determining the second transport block based on a modulation and coding scheme and resource allocation information in the scheduling information.

Optionally, the processor 3002 determines the second transport block based on first indication information in the scheduling information, where when the first indication information indicates that the target time resource is the third time resource or indicates that a scheduling mode is a first mode, the processor 3002 determines that the second transport block is the at least one transport block in the at least one first transport block; or when the first indication information indicates that the target time resource is the second time resource or indicates that a scheduling mode is a second mode, the processor 3002 determines that the second transport block is the at least one transport block other than the at least one first transport block; in addition, it should be noted that, the first mode is a fast scheduling mode, and the second mode is a normal scheduling mode.

Optionally, before the transceiver 3001 receives the scheduling information on the first time resource, this embodiment may further include: the transceiver 3001 transmits first notification information, where the first notification information is used to notify a network device that the terminal device has at least one of the following capability information: 1. the terminal device has a capability of supporting the time interval between the third time resource and the first time resource; 2. the terminal device has a capability of transmitting the at least one first transport block on the third time resource; and 3. the terminal device has a capability of fast transmitting the at least one first transport block. It should be further noted that, after the transceiver 3001 transmits the first notification information, the transceiver 3001 may further receive first configuration information. A function of the first configuration information is similar to a function of the first configuration information in the embodiment corresponding to FIG. 1, and is not described again herein.

Optionally, before the transceiver 3001 receives the scheduling information on the first time resource, this embodiment may further include: the processor 3002 starts to encode the at least one first transport block.

Optionally, that the transceiver 3001 transmits the scheduling request may further include: if a size of information in a buffer of the processor 3002 is greater than a second threshold, the transceiver 3001 transmits the scheduling request, where the second threshold is a value corresponding to a preset transport block size, or a preset value, or a value corresponding to a transport block size configured by using higher layer signaling; in addition, it should be noted that, the buffer may be placed in the processor 3002, or may be a separate memory, and is not limited herein.

Figure 31A:
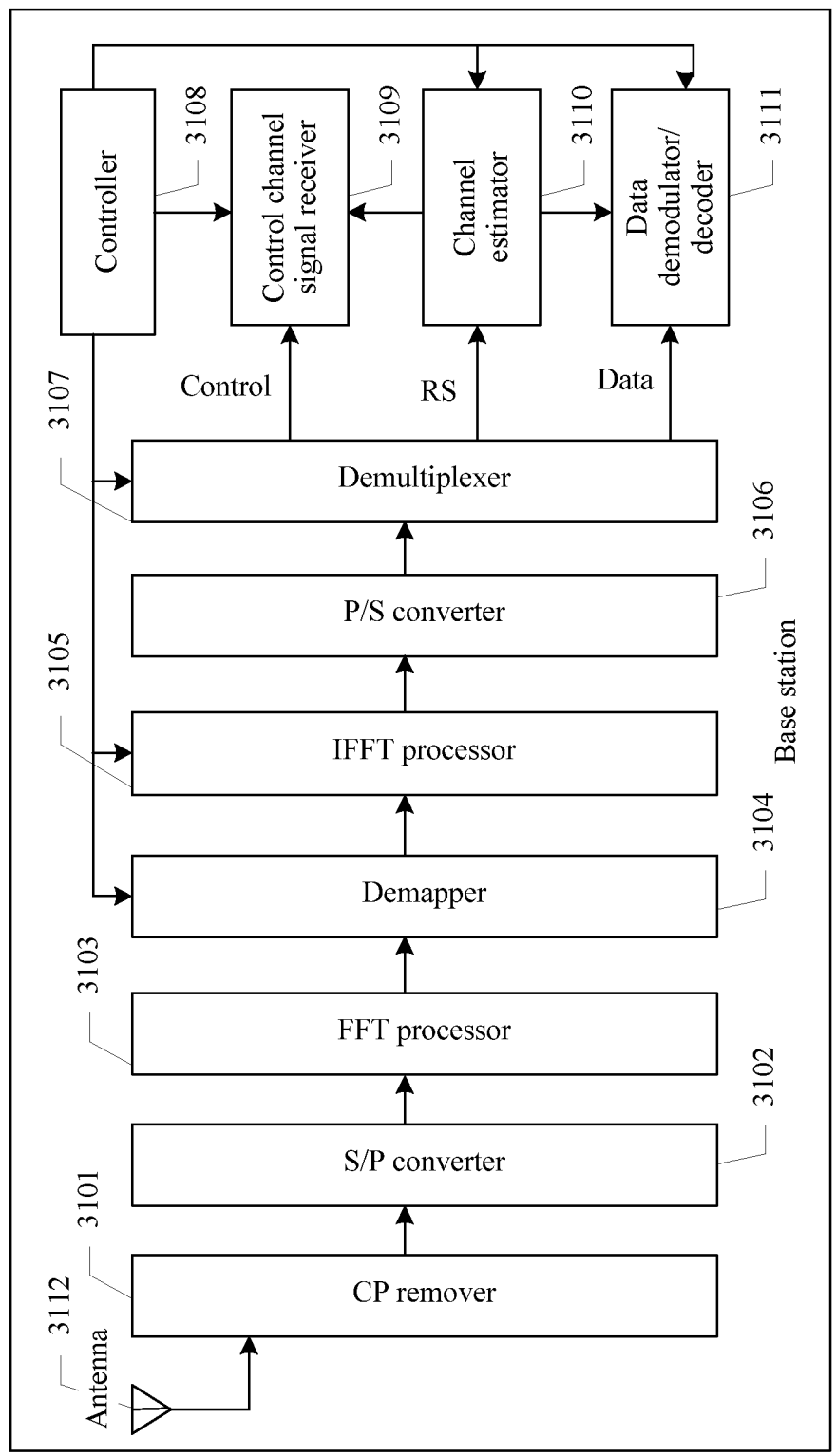
FIG. 31(a) is a schematic diagram of another embodiment of a network device according to an embodiment of this application.

The methods disclosed by the foregoing embodiments of this application may be applied to the processor 3002 or implemented by the processor 3002. The processor 3002 controls an operation of the terminal device. The processor 3002 may also be referred to as a central processing unit (English full name: Central Processing Unit, CPU for short), or the processor 3002 may be an integrated circuit chip having a signal processing capability. In an implementation process, steps in the foregoing methods can be implemented by using a hardware integrated logic circuit in the processor 3002, or by using instructions in a form of software. The processor 3002 may be a general purpose processor, a digital signal processor (English full name: Digital Signal Processor, DSP for short), an application-specific integrated circuit (English full name: Application-Specific Integrated Circuit, ASIC for short), a field-programmable gate array (English full name: Field-Programmable Gate Array, FPGA for short) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. It should be noted that, for descriptions about the terminal device in this embodiment of this application, reference may be made to the embodiment corresponding to FIG. 1. Details are not described again herein. Referring to FIG. 31(a), a network device in an embodiment of this application is described in detail, and includes:

As shown in FIG. 31(a), the network device includes an antenna 3112, a cyclic prefix (CP) remover 3101, a serial-to-parallel (S/P) converter 3102, a fast Fourier transform (FFT) processor 3103, a demapper 3104, an inverse fast Fourier transform (IFFT) processor 3105, a parallel-to-serial (P/S) converter 3106, a demultiplexer (DEMUX) 3107, a controller 3108, a control channel signal receiver 3109, a channel estimator 3110, and a data demodulator/decoder 3111.

The controller 3108 provides overall control. The controller 3108 also generates control signals required by the demultiplexer (DEMUX) 3107, the fast Fourier transform (FFT) processor 3103, the demapper 3104, the control channel signal receiver 3109, the channel estimator 3110, and the data demodulator/decoder 3111. A signal related to UL control information and data is provided to the control channel signal receiver 3109 and the data demodulator/decoder 3111. A control channel signal indicating a sequence index and a time domain cyclic shift value is provided to the channel estimator 3110. The sequence index and the time domain cyclic shift value are used to generate a pilot sequence allocated to a terminal device.

Based on timing information received from the controller 3108, the demultiplexer (DEMUX) 3107 demultiplexes a control channel signal, a data signal, and a pilot signal from a signal received from the serial-to-parallel (S/P) converter 3102. The demapper 3104 extracts the signals from a frequency resource based on the timing information received from the controller 3108 and frequency allocation information.

When receiving a signal including control information from the terminal device through the antenna 3112, the cyclic prefix (CP) remover 3101 removes a CP from the received signal. The serial-to-parallel (S/P) converter 3102 converts the signal without the CP into a parallel signal, and the fast Fourier transform (FFT) processor 3103 processes the parallel signal by using FFT. After being demapped in the demapper 3104, an FFT signal is converted in the inverse fast Fourier transform (IFFT) processor 3105 into a time signal. An input/output size of the inverse fast Fourier transform (IFFT) processor 3105 changes based on the control signal received from the controller 3108. The serial-to-parallel (S/P) converter 3102 serializes the IFFT signal, and the demultiplexer (DEMUX) 3107 demultiplexes a control channel signal, a pilot signal, and a data signal from a serial signal.

The channel estimator 3110 obtains channel estimation based on the pilot signal received from the demultiplexer (DEMUX) 3107. The control channel signal receiver 3109 performs, through channel estimation, channel compensation on the control channel signal received from the demultiplexer (DEMUX) 3107, and obtains the control information transmitted by the terminal device. The data demodulator/decoder 3111 performs, through channel estimation, channel compensation on the data signal received from the demultiplexer (DEMUX) 3107, and obtains, based on the control information, data transmitted by the terminal device.

Figure 31B:
FIG. 31(b) is a schematic diagram of another embodiment of a network device according to an embodiment of this application.

In addition, referring to FIG. 31(b), a network device is described in detail. The network device includes a transceiver 3120 and a processor 3130, where a communication connection exists between the transceiver 3120 and the processor 3130; the transceiver 3120 is configured to receive a scheduling request, where the scheduling request includes information about at least one first transport block; the transceiver 3120 is configured to transmit scheduling information on a first time resource; and the transceiver 3120 is configured to receive a second transport block on a target time resource, where the target time resource includes a second time resource or a third time resource, a time interval between the second time resource and the first time resource is greater than a time interval between the third time resource and the first time resource, the second transport block is at least one transport block in the at least one first transport block or is at least one transport block other than the at least one first transport block, the at least one first transport block corresponds to the third time resource, and the at least one transport block other than the at least one first transport block corresponds to the second time resource.

After the transceiver 3120 transmits the scheduling information on the first time resource, this embodiment further includes: the processor 3130 determines, based on the scheduling information, that the target time resource is the second time resource or the third time resource.

In addition, the information about the at least one first transmission is used to indicate that a size of the at least one first transport block is not greater than a first threshold, where the first threshold is a value corresponding to a preset transport block size, or a preset value, or a value corresponding to a transport block size configured by using higher layer signaling; or the information about the at least one first transport block is used to indicate a size and/or a quantity of the at least one first transport block.

Optionally, the scheduling information includes a modulation and coding scheme information field, and some bits or a bit status of the modulation and coding scheme information field are/is used to indicate the second transport block; or the scheduling information includes a modulation and coding scheme and resource allocation information, and the modulation and coding scheme and the resource allocation information are used to indicate the second transport block.

Optionally, the scheduling information includes first indication information, the first indication information is used to indicate the target time resource or used to indicate a scheduling mode, the scheduling mode includes a first mode and a second mode, the first mode corresponds to the third time resource, and the second mode corresponds to the second time resource; and when the first indication information indicates that the target time resource is the third time resource or indicates that the scheduling mode is the first mode, the processor 3130 determines that the target time resource is the third time resource; or when the first indication information indicates that the target time resource is the second time resource or indicates that the scheduling mode is the second mode, the processor 3130 determines that the target time resource is the second time resource.

Optionally, before the transceiver 3120 transmits the scheduling information on the first time resource, this embodiment may further include: the transceiver 3120 receives first notification information, where the first notification information is used to notify the network device that a terminal device has at least one of the following capability information: 1. the terminal device has a capability of supporting the time interval between the third time resource and the first time resource; 2. the terminal device has a capability of transmitting the at least one first transport block on the third time resource; and 3. the terminal device has a capability of fast transmitting the at least one first transport block.

It should be noted that, functions implemented by the network device in this embodiment of this application correspond to functions implemented by the terminal device in the embodiment corresponding to FIG. 30, and are not described again herein.

It should be further noted that, for descriptions about the network device in this embodiment of this application, reference may be made to the embodiment corresponding to FIG. 1. Details are not described again herein.

II. A scheduling request includes information about at least one third transport block.

Figure 32:
FIG. 32 is a schematic diagram of another embodiment of a terminal device according to an embodiment of this application.

Referring to FIG. 32, a terminal device in an embodiment of this application is described in detail. The terminal device includes a transceiver 3201 and a processor 3202, where a communication connection exists between the transceiver 3201 and the processor 3202; the transceiver 3201 is configured to transmit a scheduling request, where the scheduling request includes information about at least one third transport block; the transceiver 3201 is configured to receive scheduling information on a fourth time resource; the processor 3202 is configured to determine a fifth time resource; and the transceiver 3201 is configured to transmit a fourth transport block on a fifth time resource based on the scheduling information, where the fourth transport block is at least one transport block in the at least one third transport block, a time interval between the fifth time resource and the fourth time resource is greater than a time interval between a sixth time resource and the fourth time resource, the at least one third transport block corresponds to the fifth time resource, and at least one transport block other than the at least one third transport block corresponds to the sixth time resource.

The information about the at least one third transport block is used to indicate that a size of the at least one third transport block is not greater than a first threshold, where the first threshold is a value corresponding to a preset transport block size, or a preset value, or a value corresponding to a transport block size configured by using higher layer signaling; or the information about the at least one third transport block is used to indicate a size and/or a quantity of the at least one third transport block.

Optionally, before the transceiver 3201 transmits the fourth transport block on the fifth time resource based on the scheduling information, this embodiment may further include: the processor 3202 determines the fourth transport block based on the scheduling information. In this case, that the processor 3202 determines the fifth time resource includes: determining the fifth time resource based on a relationship between the fourth transport block and the at least one third transport block; or determining the fifth time resource based on a relationship between the fourth transport block and the at least one transport block other than the at least one third transport block. It may be understood that, the processor selects the time resource, but because the scheduling request indicates the size of the third transport block, the processor 3202 determines the fifth time resource rather than the sixth time resource.

Optionally, that the processor 3202 determines the fourth transport block based on the scheduling information may include: determining the fourth transport block based on some bits or a bit status of a modulation and coding scheme information field in the scheduling information; or determining the fourth transport block based on a modulation and coding scheme and resource allocation information in the scheduling information.

Optionally, the processor 3202 may further determine the fourth transport block based on first indication information in the scheduling information, where the first indication information is used to indicate the fifth time resource or used to indicate a first mode, and the first mode corresponds to the fifth time resource.

Optionally, before the transceiver 3201 receives the scheduling information on the fourth time resource, this embodiment may further include: the transceiver 3201 transmits second notification information, where the second notification information is used to notify a network device that the terminal device has at least one of the following capability information: 1. the terminal device has a capability of supporting the time interval between the fifth time resource and the fourth time resource; 2. the terminal device has a capability of transmitting the at least one third transport block on the fifth time resource; and 3. the terminal device has a capability of transmitting the at least one third transport block. It should be noted that, after the transceiver 3202 transmits the second notification information, the transceiver 3202 further receives second configuration information. A function of the second configuration information is similar to a function of the second configuration information in the embodiment corresponding to FIG. 3, and is not described again herein.

Optionally, before the processor 3202 receives the scheduling request on the fourth time resource, this embodiment may further include: the processor 3202 starts to perform coding processing on the at least one third transport block.

Optionally, that the transceiver 3201 transmits the scheduling request may further include: if a size of information in a buffer of the processor 3202 is greater than a second threshold, the transceiver 3201 transmits the scheduling request, where the second threshold is a value corresponding to a preset transport block size, or a preset value, or a value corresponding to a transport block size configured by using higher layer signaling; in addition, it should be noted that, the buffer may be placed in the processor 3202, or may be a separate memory, and is not limited herein.

Figure 33A:
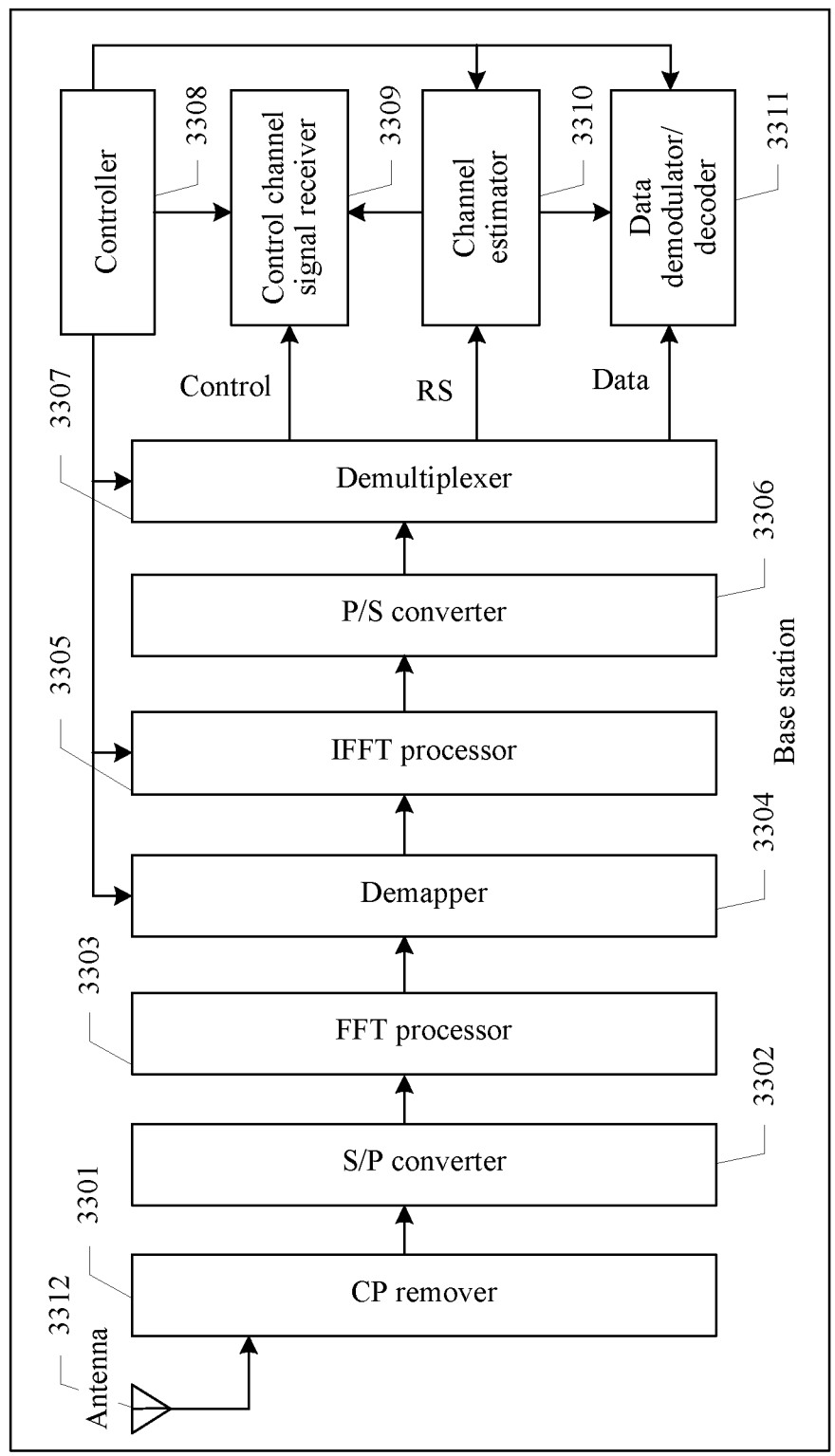
FIG. 33(a) is a schematic diagram of another embodiment of a network device according to an embodiment of this application.
Figure 33B:
FIG. 33(b) is a schematic diagram of another embodiment of a network device according to an embodiment of this application.

The methods disclosed by the foregoing embodiments of this application may be applied to the processor 3202 or implemented by the processor 3202. The processor 3202 controls an operation of the terminal device. The processor 3202 may also be referred to as a central processing unit (English full name: Central Processing Unit, CPU for short), or the processor 3202 may be an integrated circuit chip having a signal processing capability. In an implementation process, steps in the foregoing methods can be implemented by using a hardware integrated logic circuit in the processor 3202, or by using instructions in a form of software. The processor 3202 may be a general purpose processor, a Digital Signal Processor (DSP), an Application-Specific Integrated Circuit (ASIC), a Field Programmable Gate Array (FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. It should be noted that, for descriptions about the terminal device in this embodiment of this application, reference may be made to the embodiment corresponding to FIG. 3. Details are not described again herein. Referring to FIG. 33, a network device in an embodiment of this application is described in detail, and includes: As shown in FIG. 33(*a*), the network device includes an antenna 3312, a cyclic prefix (CP) remover 3301, a serial-to-parallel (S/P) converter 3302, a fast Fourier transform (FFT) processor 3303, a demapper 3304, an inverse fast Fourier transform (IFFT) processor 3305, a parallel-to-serial (P/S) converter 3306, a demultiplexer (DEMUX) 3307, a controller 3308, a control channel signal receiver 3309, a channel estimator 3310, and a data demodulator/decoder 3311.

The controller 3308 provides overall control. The controller 3308 also generates control signals required by the demultiplexer (DEMUX) 3307, the fast Fourier transform (FFT) processor 3303, the demapper 3304, the control channel signal receiver 3309, the channel estimator 3310, and the data demodulator/decoder 3311. A signal related to UL control information and data is provided to the control channel signal receiver 3309 and the data demodulator/decoder 3311. A control channel signal indicating a sequence index and a time domain cyclic shift value is provided to the channel estimator 3310. The sequence index and the time domain cyclic shift value are used to generate a pilot sequence allocated to a terminal device.

Based on timing information received from the controller 3308, the demultiplexer (DEMUX) 3307 demultiplexes a control channel signal, a data signal, and a pilot signal from a signal received from the serial-to-parallel (S/P) converter 3302. The demapper 3304 extracts the signals from a frequency resource based on the timing information received from the controller 3308 and frequency allocation information.

When receiving a signal including control information from the terminal device through the antenna 3312, the cyclic prefix (CP) remover 3301 removes a CP from the received signal. The serial-to-parallel (S/P) converter 3302 converts the signal without the CP into a parallel signal, and the fast Fourier transform (FFT) processor 3303 processes the parallel signal by using FFT. After being demapped in the demapper 3304, an FFT signal is converted in the inverse fast Fourier transform (IFFT) processor 3305 into a time signal. An input/output size of the inverse fast Fourier transform (IFFT) processor 3305 changes based on the control signal received from the controller 3308. The serial-to-parallel (S/P) converter 3302 serializes the IFFT signal, and the demultiplexer (DEMUX) 3307 demultiplexes a control channel signal, a pilot signal, and a data signal from a serial signal.

The channel estimator 3310 obtains channel estimation based on the pilot signal received from the demultiplexer (DEMUX) 3307. The control channel signal receiver 3309 performs, through channel estimation, channel compensation on the control channel signal received from the demultiplexer (DEMUX) 3307, and obtains the control information transmitted by the terminal device. The data demodulator/decoder 3311 performs, through channel estimation, channel compensation on the data signal received from the demultiplexer (DEMUX) 3307, and obtains, based on the control information, data transmitted by the terminal device.

In addition, referring to FIG. 33(*b*), a network device is described in detail. The network device includes a transceiver 3320 and a processor 3330, where a communication connection exists between the transceiver 3320 and the processor 3330; the receiver 3320 is configured to receive a scheduling request, where the scheduling information includes information about at least one third transport block; the receiver 3320 is configured to transmit scheduling information on a fourth time resource; and the receiver 3320 is configured to receive a fourth transport block on a fifth time resource based on the scheduling information, where the fourth transport block is at least one transport block in the at least one third transport block, a time interval between the fifth time resource and the fourth time resource is greater than a time interval between a sixth time resource and the fourth time resource, the at least one third transport block corresponds to the fifth time resource, and at least one transport block other than the at least one third transport block corresponds to the sixth time resource.

After the receiver 3320 transmits the scheduling information on the fourth time resource, this embodiment further includes: the processor 3330 determines, based on the scheduling information, that a target time resource is the fifth time resource.

In addition, the information about the at least one third transport block is used to indicate that a size of the at least one third transport block is not greater than a first threshold, where the first threshold is a value corresponding to a preset transport block size, or a preset value, or a value corresponding to a transport block size configured by using higher layer signaling; or the information about the at least one third transport block is used to indicate a size and/or a quantity of the at least one third transport block.

Optionally, the scheduling information includes a modulation and coding scheme information field, and some bits or a bit status of the modulation and coding scheme information field are/is used to indicate the fourth transport block; or the scheduling information includes a modulation and coding scheme and resource allocation information, and the modulation and coding scheme and the resource allocation information are used to indicate the fourth transport block.

Optionally, the scheduling information includes first indication information, the first indication information is used to indicate the fifth time resource or used to indicate a first mode, and the first mode corresponds to the fifth time resource.

Optionally, before the receiver 3320 transmits the scheduling information on the fourth time resource, this embodiment may further include: the receiver 3320 receives second notification information, where the second notification information is used to notify the network device that a terminal device has at least one of the following capability information: 1. the terminal device has a capability of supporting the time interval between the fifth time resource and the fourth time resource; 2. the terminal device has a capability of transmitting the at least one third transport block on the fifth time resource; and 3. the terminal device has a capability of transmitting the at least one third transport block.

It should be noted that, functions implemented by the network device in this embodiment of this application correspond to functions implemented by the terminal device in the embodiment corresponding to FIG. 32, and are not described again herein.

It should be further noted that, for descriptions about the network device in this embodiment of this application, reference may be made to the embodiment corresponding to FIG. 3. Details are not described again herein.

III. A scheduling request includes information about a quantity M of fifth transport blocks.

Figure 34:
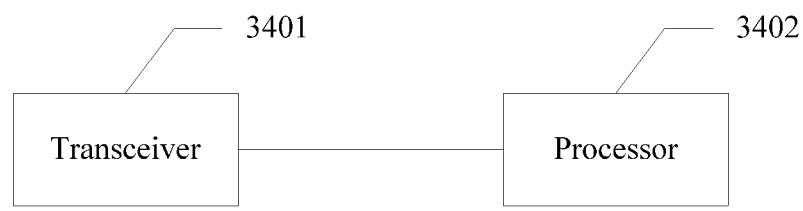
FIG. 34 is a schematic diagram of another embodiment of a terminal device according to an embodiment of this application.

Referring to FIG. 34, a terminal device in an embodiment of this application is described in detail. The terminal device includes a transceiver 3401 and a processor 3402, where a communication connection exists between the transceiver 3401 and the processor 3402; the transceiver 3401 is configured to transmit a scheduling request, where the scheduling request includes information about a quantity M of fifth transport blocks, and M is a positive integer; the transceiver 3401 is configured to receive scheduling information on a seventh time resource; the processor 3402 is configured to determine J target time resources, where J is a positive integer not greater than M; and the transceiver 3401 is configured to transmit X sixth transport blocks on the J target time resources based on the scheduling information, where X is a positive integer.

The J target time resources are J eighth time resources or J ninth time resources, and a time interval between an earliest time resource in the J eighth time resources and the seventh time resource is greater than a time interval between an earliest time resource in the J ninth time resources and the seventh time resource.

In addition, the sixth transport blocks are the fifth transport blocks or are at least one transport block other than the fifth transport blocks, the fifth transport blocks correspond to the J ninth time resources, and the at least one transport block other than the fifth transport blocks corresponds to the J eighth time resources.

Optionally, before the transceiver 3401 receives the scheduling information on the seventh time resource, this embodiment may further include: the transceiver 3401 transmits third notification information, where the third notification information is used to notify a network device that the terminal device has at least one of the following capability information: 1. the terminal device has a capability of supporting the quantity M of the fifth transport blocks; and 2. the terminal device has a capability of fast transmitting at least one fifth transport block. It should be noted that, after the transceiver 3401 transmits the third notification information, the transceiver 3401 further receives third configuration information. A function of the third configuration information is similar to a function of the third configuration information in the embodiment corresponding to FIG. 4, and is not described again herein.

Optionally, before the processor 3402 receives the scheduling request on the seventh time resource, this embodiment may further include: the processor 3402 starts to perform coding processing on at least one third transport block.

The methods disclosed by the foregoing embodiments of this application may be applied to the processor 3402 or implemented by the processor 3402. The processor 3402 controls an operation of the terminal device. The processor 3402 may also be referred to as a central processing unit (English full name: Central Processing Unit, CPU for short), or the processor 3402 may be an integrated circuit chip having a signal processing capability. In an implementation process, steps in the foregoing methods can be implemented by using a hardware integrated logic circuit in the processor 3402, or by using instructions in a form of software. The processor 3430 may be a general purpose processor, a Digital Signal Processor (DSP), an Application-Specific Integrated Circuit (ASIC), a Field Programmable Gate Array (FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register.

It should be noted that, for descriptions about the terminal device in this embodiment of this application, reference may be made to the embodiment corresponding to FIG. 4. Details are not described again herein.

Figure 35A:
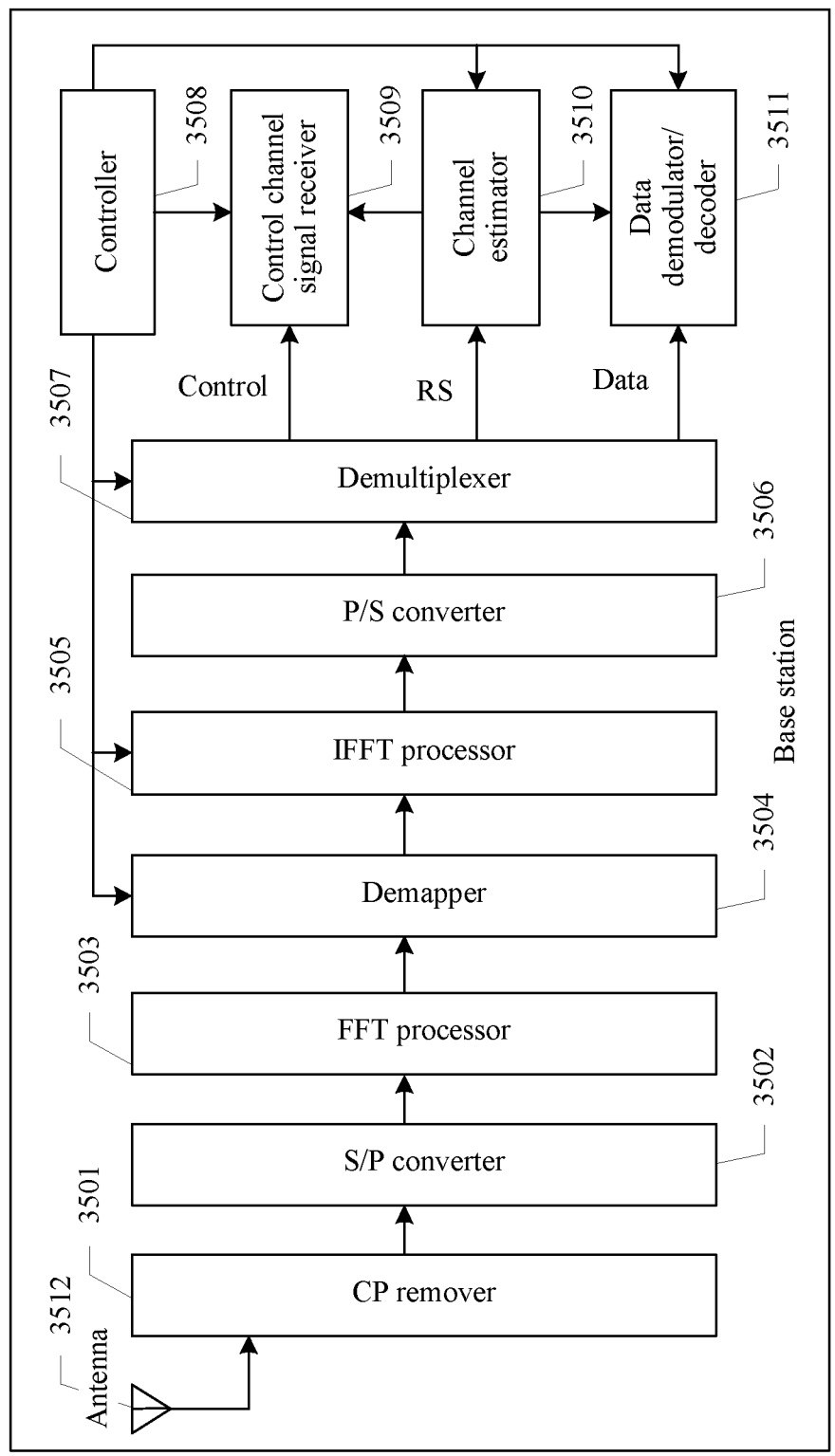
FIG. 35(a) is a schematic diagram of another embodiment of a network device according to an embodiment of this application.

Referring to FIG. 35(a), a network device in an embodiment of this application is described in detail, and includes:

As shown in FIG. 35(a), the network device includes an antenna 3512, a cyclic prefix (CP) remover 3501, a serial-to-parallel (S/P) converter 3502, a fast Fourier transform (FFT) processor 3503, a demapper 3504, an inverse fast Fourier transform (IFFT) processor 3505, a parallel-to-serial (P/S) converter 3506, a demultiplexer (DEMUX) 3507, a controller 3508, a control channel signal receiver 3509, a channel estimator 3510, and a data demodulator/decoder 3511.

The controller 3508 provides overall control. The controller 3508 also generates control signals required by the demultiplexer (DEMUX) 3507, the fast Fourier transform (FFT) processor 3503, the demapper 3504, the control channel signal receiver 3509, the channel estimator 3510, and the data demodulator/decoder 3511. A signal related to UL control information and data is provided to the control channel signal receiver 3509 and the data demodulator/decoder 3511. A control channel signal indicating a sequence index and a time domain cyclic shift value is provided to the channel estimator 3510. The sequence index and the time domain cyclic shift value are used to generate a pilot sequence allocated to a terminal device.

Based on timing information received from the controller 3508, the demultiplexer (DEMUX) 3507 demultiplexes a control channel signal, a data signal, and a pilot signal from a signal received from the serial-to-parallel (S/P) converter 3502. The demapper 3504 extracts the signals from a frequency resource based on the timing information received from the controller 3508 and frequency allocation information.

When receiving a signal including control information from the terminal device through the antenna 3512, the cyclic prefix (CP) remover 3501 removes a CP from the received signal. The serial-to-parallel (S/P) converter 3502 converts the signal without the CP into a parallel signal, and the fast Fourier transform (FFT) processor 3503 processes the parallel signal by using FFT. After being demapped in the demapper 3504, an FFT signal is converted in the inverse fast Fourier transform (IFFT) processor 3505 into a time signal. An input/output size of the inverse fast Fourier transform (IFFT) processor 3505 changes based on the control signal received from the controller 3508. The serial-to-parallel (S/P) converter 3502 serializes the IFFT signal, and the demultiplexer (DEMUX) 3507 demultiplexes a control channel signal, a pilot signal, and a data signal from a serial signal.

The channel estimator 3510 obtains channel estimation based on the pilot signal received from the demultiplexer (DEMUX) 3507. The control channel signal receiver 3509 performs, through channel estimation, channel compensation on the control channel signal received from the demultiplexer (DEMUX) 3507, and obtains the control information transmitted by the terminal device. The data demodulator/decoder 3511 performs, through channel estimation, channel compensation on the data signal received from the demultiplexer (DEMUX) 3507, and obtains, based on the control information, data transmitted by the terminal device.

Figure 35B:
FIG. 35(b) is a schematic diagram of another embodiment of a network device according to an embodiment of this application.

In addition, referring to FIG. 35(b), a network device is described in detail. The network device includes a transceiver 3520 and a processor 3530, where a communication connection exists between the transceiver 3520 and the processor 3530; the transceiver 3520 is configured to receive a scheduling request, where the scheduling request includes information about a quantity M of fifth transport blocks, and M is a positive integer; the transceiver 3520 is configured to transmit scheduling information on a seventh time resource; and the transceiver 3520 is configured to receive X sixth transport blocks on J target time resources based on the scheduling information, where J is a positive integer not greater than M, and X is a positive integer.

The J target time resources are J eighth time resources or J ninth time resources, and a time interval between an earliest time resource in the J eighth time resources and the seventh time resource is greater than a time interval between an earliest time resource in the J ninth time resources and the seventh time resource.

In addition, the sixth transport blocks are the fifth transport blocks or are at least one transport block other than the fifth transport blocks, the fifth transport blocks correspond to the J ninth time resources, and the at least one transport block other than the fifth transport blocks corresponds to the J eighth time resources.

Optionally, before a terminal device transmits the scheduling information on the seventh time resource, this embodiment may further include: the network device receives third notification information, where the third notification information is used to notify the network device that a terminal device has at least one of the following capability information: 1. the terminal device has a capability of supporting the quantity M of the fifth transport blocks; and 2. the terminal device has a capability of fast transmitting at least one fifth transport block.

It should be noted that, functions implemented by the network device in this embodiment of this application correspond to functions implemented by the terminal device in the embodiment corresponding to FIG. 34, and are not described again herein.

It should be further noted that, for descriptions about the network device in this embodiment of this application, reference may be made to the embodiment corresponding to FIG. 4. Details are not described again herein.

IV. A scheduling request includes information about a duration of a tenth time resource.

Figure 36:
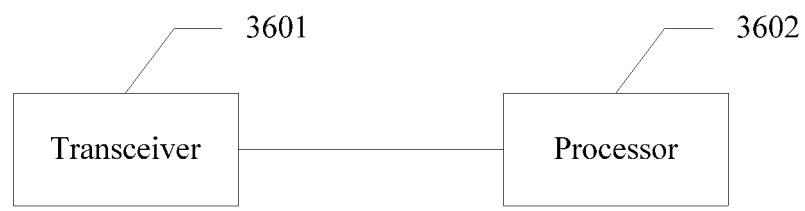
FIG. 36 is a schematic diagram of another embodiment of a terminal device according to an embodiment of this application.

Referring to FIG. 36, a terminal device in an embodiment of this application is described in detail. The terminal device includes a transceiver 3601 and a processor 3602, where a communication connection exists between the transceiver 3601 and the processor 3602; the transceiver 3601 is configured to transmit a scheduling request, where the scheduling request includes a duration of a tenth time resource; the transceiver 3601 is configured to receive scheduling information on an eleventh time resource; the processor 3602 is configured to determine a target time resource, where a duration of the target time resource is not shorter than the duration of the tenth time resource; and the transceiver 3601 is configured to transmit a seventh transport block on the target time resource based on the scheduling information.

The target time resource is a twelfth time resource or a thirteenth time resource, and a time interval between the twelfth time resource and the eleventh time resource is greater than a time interval between the thirteenth time resource and the eleventh time resource.

In addition, a duration of the twelfth time resource is not shorter than the duration of the tenth time resource, and a duration of the thirteenth time resource is equal to the duration of the tenth time resource.

Optionally, before the transceiver 3601 receives the scheduling information on the eleventh time resource, this embodiment may further include: the transceiver 3601 transmits fourth notification information, where the fourth notification information is used to notify a network device that the terminal device has at least one of the following capability information: 1. the terminal device has a capability of supporting a duration greater than or equal to the duration of the tenth time resource; and 2. the terminal device has a capability of fast transmission for a duration greater than or equal to the duration of the tenth time resource. It should be noted that, after the transceiver 3601 transmits the fourth notification information, the transceiver 3601 further receives fourth configuration information. A function of the fourth configuration information is similar to a function of the fourth configuration information in the embodiment corresponding to FIG. 5, and is not described again herein.

The methods disclosed by the foregoing embodiments of this application may be applied to the processor 3602 or implemented by the processor 3602. The processor 3602 controls an operation of the terminal device. The processor 3602 may also be referred to as a central processing unit (CPU), or the processor 3602 may be an integrated circuit chip having a signal processing capability. In an implementation process, steps in the foregoing methods can be implemented by using a hardware integrated logic circuit in the processor 3602, or by using instructions in a form of software. The processor 3602 may be a general purpose processor, a Digital Signal Processor (DSP), an Application-Specific Integrated Circuit (ASIC), a Field Programmable Gate Array (FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register.

It should be noted that, for descriptions about the terminal device in this embodiment of this application, reference may be made to the embodiment corresponding to FIG. 5. Details are not described again herein.

Figure 37A:
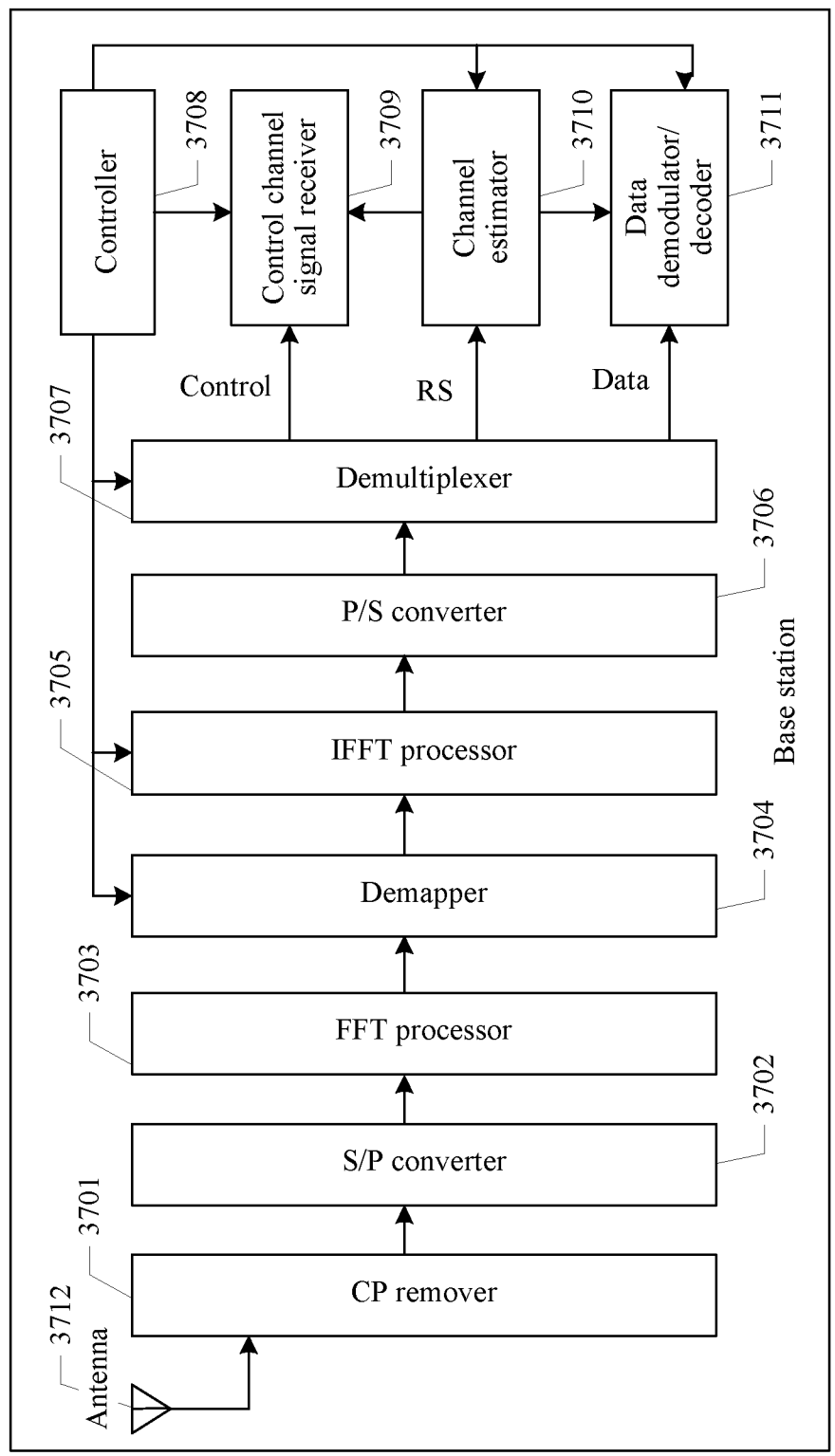
FIG. 37(a) is a schematic diagram of another embodiment of a network device according to an embodiment of this application.
Figure 37B:
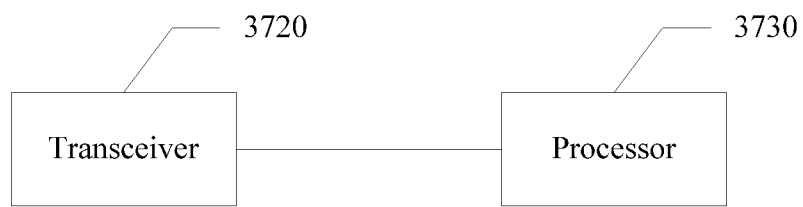
FIG. 37(b) is a schematic diagram of another embodiment of a network device according to an embodiment of this application.

Referring to FIG. 37(*a*), a network device in an embodiment of this application is described in detail, and includes:

As shown in FIG. 37(*a*), the network device includes an antenna 3712, a cyclic prefix (CP) remover 3701, a serial-to-parallel (S/P) converter 3702, a fast Fourier transform (FFT) processor 3703, a demapper 3704, an inverse fast Fourier transform (IFFT) processor 3705, a parallel-to-serial (P/S) converter 3706, a demultiplexer (DEMUX) 3707, a controller 3708, a control channel signal receiver 3709, a channel estimator 3710, and a data demodulator/decoder 3711.

The controller 3708 provides overall control. The controller 3708 also generates control signals required by the demultiplexer (DEMUX) 3707, the fast Fourier transform (FFT) processor 3703, the demapper 3704, the control channel signal receiver 3709, the channel estimator 3710, and the data demodulator/decoder 3711. A signal related to UL control information and data is provided to the control channel signal receiver 3709 and the data demodulator/decoder 3711. A control channel signal indicating a sequence index and a time domain cyclic shift value is provided to the channel estimator 3710. The sequence index and the time domain cyclic shift value are used to generate a pilot sequence allocated to a terminal device.

Based on timing information received from the controller 3708, the demultiplexer (DEMUX) 3707 demultiplexes a control channel signal, a data signal, and a pilot signal from a signal received from the serial-to-parallel (S/P) converter 3702. The demapper 3704 extracts the signals from a frequency resource based on the timing information received from the controller 3708 and frequency allocation information.

When receiving a signal including control information from the terminal device through the antenna 3712, the cyclic prefix (CP) remover 3701 removes a CP from the received signal. The serial-to-parallel (S/P) converter 3702 converts the signal without the CP into a parallel signal, and the fast Fourier transform (FFT) processor 3703 processes the parallel signal by using FFT. After being demapped in the demapper 3704, an FFT signal is converted in the inverse fast Fourier transform (IFFT) processor 3705 into a time signal. An input/output size of the inverse fast Fourier transform (IFFT) processor 3705 changes based on the control signal received from the controller 3708. The serial-to-parallel (S/P) converter 3702 serializes the IFFT signal, and the demultiplexer (DEMUX) 3707 demultiplexes a control channel signal, a pilot signal, and a data signal from a serial signal.

The channel estimator 3710 obtains channel estimation based on the pilot signal received from the demultiplexer (DEMUX) 3707. The control channel signal receiver 3709 performs, through channel estimation, channel compensation on the control channel signal received from the demultiplexer (DEMUX) 3707, and obtains the control information transmitted by the terminal device. The data demodulator/decoder 3711 performs, through channel estimation, channel compensation on the data signal received from the demultiplexer (DEMUX) 3707, and obtains, based on the control information, data transmitted by the terminal device.

In addition, referring to FIG. 37(*b*), a network device is described in detail. The network device includes a transceiver 3720 and a processor 3730, where a communication connection exists between the transceiver 3720 and the processor 3730; the transceiver 3720 is configured to receive a scheduling request, where the scheduling request includes a duration of a tenth time resource; the transceiver 3720 is configured to transmit scheduling information on an eleventh time resource; and the transceiver 3720 is configured to receive a seventh transport block on a target time resource based on the scheduling information.

After the transceiver 3720 transmits the scheduling information on the eleventh time resource, this embodiment further includes: the processor 3730 determines, based on the scheduling information, that the target time resource is a twelfth time resource or a thirteenth time resource. A time interval between the twelfth time resource and the eleventh time resource is greater than a time interval between the thirteenth time resource and the eleventh time resource.

In addition, a duration of the twelfth time resource is not shorter than the duration of the tenth time resource, and a duration of the thirteenth time resource is equal to the duration of the tenth time resource.

Optionally, before the transceiver 3720 transmits the scheduling information on the eleventh time resource, this embodiment may further include: the transceiver 3720 receives fourth notification information, where the fourth notification information is used to notify the network device that a terminal device has at least one of the following capability information: 1. the terminal device has a capability of supporting a duration greater than or equal to the duration of the tenth time resource; and 2. the terminal device has a capability of fast transmission for a duration greater than or equal to the duration of the tenth time resource.

It should be noted that, functions implemented by the network device in this embodiment of this application correspond to functions implemented by the terminal device in the embodiment corresponding to FIG. 36, and are not described again herein.

It should be further noted that, for descriptions about the network device in this embodiment of this application, reference may be made to the embodiment corresponding to FIG. 5. Details are not described again herein.

It may be clearly understood by persons skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed:
1. A data transmission method, comprising:
   transmitting, by a terminal device, a scheduling request, wherein the scheduling request comprises information about at least one first transport block;
   receiving, by the terminal device, scheduling information on a first time resource;
   determining, by the terminal device, a target time resource, wherein the target time resource comprises a second time resource or a third time resource, and a time interval between the second time resource and the first time resource is greater than a time interval between the third time resource and the first time resource; and
   transmitting, by the terminal device, a second transport block on the target time resource based on the scheduling information, wherein the second transport block is at least one transport block in the at least one first transport block or is at least one transport block other than the at least one first transport block, wherein the at least one first transport block corresponds to the third time resource, and wherein the at least one transport block other than the at least one first transport block corresponds to the second time resource.

2. The data transmission method according to claim 1, wherein the information about the at least one first transport block is used to indicate that a size of the at least one first transport block is not greater than a first threshold, wherein the first threshold is a value corresponding to a preset transport block size, or a preset value, or a value corresponding to a transport block size configured by using higher layer signaling; or
   the information about the at least one first transport block is used to indicate a size and/or a quantity of the at least one first transport block.

3. The data transmission method according to claim 1, wherein the determining, by the terminal device, a target time resource comprises:
   determining, by the terminal device, the second transport block based on the scheduling information; and
   determining, by the terminal device, the target time resource based on a relationship between the second transport block and the at least one first transport block; or determining, by the terminal device, the target time resource based on a relationship between the second transport block and the at least one transport block other than the at least one first transport block.

4. The data transmission method according to claim 3, wherein the determining, by the terminal device, the second transport block based on the scheduling information comprises:
   determining, by the terminal device, the second transport block based on some bits or a bit status of a modulation and coding scheme information field in the scheduling information; or
   determining, by the terminal device, the second transport block based on a modulation and coding scheme and resource allocation information in the scheduling information.

5. The data transmission method according to claim 1, wherein before transmitting, by the terminal device, a second transport block on the target time resource based on the scheduling information, further comprising:
   determining, by the terminal device, the second transport block based on first indication information in the scheduling information, wherein the first indication information is used to indicate the target time resource or used to indicate a scheduling mode, the scheduling mode comprises a first mode and a second mode, the first mode corresponds to the third time resource, and the second mode corresponds to the second time resource.

6. The data transmission method according to claim 5, wherein determining, by the terminal device, the second transport block based on first indication information in the scheduling information comprises:
   when the first indication information indicates the first mode or the third time resource, determining, by the terminal device, that the second transport block is the at least one transport block in the at least one first transport block; or
   when the first indication information indicates the second mode or the second time resource, determining, by the terminal device, that the second transport block is the at least one transport block other than the at least one first transport block.

7. The data transmission method according to claim 6, wherein determining, by the terminal device, that the second transport block is the at least one transport block in the at least one first transport block comprises:
   when the at least one first transport block comprises one transport block, determining, by the terminal device, that the second transport block is the transport block in the at least one first transport block; or
   when the at least one first transport block comprises at least two transport blocks, determining, by the terminal device, the second transport block based on second indication information in the scheduling information.

8. The data transmission method according to claim 1, wherein before receiving, by the terminal device, scheduling information on a first time resource, further comprising:
   transmitting, by the terminal device, first notification information, wherein the first notification information is used to notify a network device that the terminal device has at least one of the following capability information:
   the terminal device has a capability of supporting the time interval between the third time resource and the first time resource;
   the terminal device has a capability of transmitting the at least one first transport block on the third time resource; and
   the terminal device has a capability of fast transmitting the at least one first transport block.

9. The data transmission method according to claim 1, wherein transmitting, by a terminal device, a scheduling request comprises:
   if a size of information in a buffer of the terminal device is greater than a second threshold, transmitting, by the terminal device, the scheduling request, wherein the second threshold is a value corresponding to a preset transport block size, or a preset value, or a value corresponding to a transport block size configured by using higher layer signaling.

10. A data transmission method, comprising:
   transmitting, by a terminal device, a scheduling request, wherein the scheduling request comprises information about at least one third transport block;
   receiving, by the terminal device, scheduling information on a fourth time resource;
   determining, by the terminal device, a fifth time resource; and
   transmitting, by the terminal device, a fourth transport block on the fifth time resource based on the scheduling information, wherein the fourth transport block is at least one transport block in the at least one third transport block, a time interval between the fifth time resource and the fourth time resource is greater than a time interval between a sixth time resource and the fourth time resource, the at least one transport block in the at least one third transport block corresponds to the fifth time resource, and at least one transport block other than the at least one third transport block corresponds to the sixth time resource.

11. The data transmission method according to claim 10, wherein the information about the at least one third transport block is used to indicate that a size of the at least one third transport block is not greater than a first threshold, wherein the first threshold is a value corresponding to a preset transport block size, or a preset value, or a value corresponding to a transport block size configured by using higher layer signaling; or the information about the at least one third transport block is used to indicate a size and/or a quantity of the at least one third transport block.

12. The data transmission method according to claim 10, wherein determining, by the terminal device, a fifth time resource comprises:
   determining, by the terminal device, the fourth transport block based on the scheduling information; and
   determining, by the terminal device, the fifth time resource based on a relationship between the fourth transport block and the at least one third transport block; or determining, by the terminal device, the fifth time resource based on a relationship between the fourth transport block and the at least one transport block other than the at least one third transport block.

13. The data transmission method according to claim 12, wherein determining, by the terminal device, the fourth transport block based on the scheduling information comprises:
   determining, by the terminal device, the fourth transport block based on some bits or a bit status of a modulation and coding scheme information field in the scheduling information; or
   determining, by the terminal device, the fourth transport block based on a modulation and coding scheme and resource allocation information in the scheduling information.

14. The data transmission method according to claim 10, further comprising:

before receiving, by the terminal device, the scheduling information on a fourth time resource, starting, by the terminal device, to perform coding processing on the at least one third transport block.

15. A terminal device, comprising:
- a first transmitter, configured to transmit a scheduling request, wherein the scheduling request comprises information about at least one first transport block;
- a first receiver, configured to receive scheduling information on a first time resource;
- a processor;
- a computer-readable storage medium storing a program to be executed by the processor, the program including instructions for:
  - determining a target time resource, wherein the target time resource comprises a second time resource or a third time resource, and a time interval between the second time resource and the first time resource is greater than a time interval between the third time resource and the first time resource; and
- a second transmitter, configured to transmit a second transport block on the target time resource based on the scheduling information, wherein the second transport block is at least one transport block in the at least one first transport block or is at least one transport block other than the at least one first transport block, wherein the at least one first transport block corresponds to the third time resource, and wherein the at least one transport block other than the at least one first transport block corresponds to the second time resource.

16. The terminal device according to claim 15, wherein the information about the at least one first transport block is used to indicate that a size of the at least one first transport block is not greater than a first threshold, wherein the first threshold is a value corresponding to a preset transport block size, or a preset value, or a value corresponding to a transport block size configured by using higher layer signaling; or
  the information about the at least one first transport block is used to indicate a size and/or a quantity of the at least one first transport block.

17. The terminal device according to claim 15, wherein program includes further instructions for:
  determining the second transport block based on the scheduling information; and
  determining the target time resource based on a relationship between the second transport block and the at least one first transport block; or a second determining module, configured to determine the target time resource based on a relationship between the second transport block and the at least one transport block other than the at least one first transport block.

18. The terminal device according to claim 17, wherein program includes further instructions for:
  determining the second transport block based on some bits or a bit status of a modulation and coding scheme information field in the scheduling information; or
  determining the second transport block based on a modulation and coding scheme and resource allocation information in the scheduling information.

19. The terminal device according to claim 15, wherein the program includes further instructions for:
  determining the second transport block based on first indication information in the scheduling information, wherein the first indication information is used to indicate the target time resource or used to indicate a scheduling mode, the scheduling mode comprises a first mode and a second mode, the first mode corresponds to the third time resource, and the second mode corresponds to the second time resource.

20. The terminal device according to claim 19, wherein the program includes further instructions for:
  when the first indication information indicates the first mode or the third time resource, determining that the second transport block is the at least one transport block in the at least one first transport block; or
  when the first indication information indicates the second mode or the second time resource, determining that the second transport block is the at least one transport block other than the at least one first transport block.

* * * * *